(12) United States Patent
Robertson et al.

(10) Patent No.: US 12,673,637 B2
(45) Date of Patent: Jul. 7, 2026

(54) SYSTEM, METHOD AND APPARATUS FOR MOBILE FOB OR KEY BRIDGE, VERSATILE SMART KEY, AND SMART DEVICE INTERFACE

(71) Applicant: IKeyless, LLC, Louisville, KY (US)

(72) Inventors: Douglas Lawrence Robertson, Louisville, KY (US); Adam Lee Pizer, Louisville, KY (US); Florian Luaire, Louisville, KY (US); Pradnya Deokar, Louisville, KY (US)

(73) Assignee: IKEYLESS, LLC, Louisville, KY (US)

( * ) Notice: Subject to any disclaimer, the term of this patent is extended or adjusted under 35 U.S.C. 154(b) by 298 days.

(21) Appl. No.: 18/314,800

(22) Filed: May 9, 2023

(65) Prior Publication Data

US 2024/0067125 A1 Feb. 29, 2024

Related U.S. Application Data

(60) Provisional application No. 63/364,366, filed on May 9, 2022.

(51) Int. Cl.
B60R 25/24 (2013.01)
B60R 25/01 (2013.01)
(Continued)

(52) U.S. Cl.
CPC .............. B60R 25/24 (2013.01); B60R 25/01 (2013.01); B60R 25/209 (2013.01);
(Continued)

(58) Field of Classification Search
CPC ....... B60R 25/24; B60R 25/01; B60R 25/209; B60R 2325/101; B60R 2325/103; B60R 2325/205; E05F 15/77; E05Y 2400/8515; E05Y 2400/8505; E05Y 2400/851; E05Y 2900/531; E05Y 2900/55; E05B 81/56
See application file for complete search history.

(56) References Cited

U.S. PATENT DOCUMENTS 9,845,071 B1 * 12/2017 Krishnan ............. G07C 9/0069
10,124,768 B1 * 11/2018 Bocca ..................... B60R 25/24
(Continued)

*Primary Examiner* — Thomas D Alunkal
(74) *Attorney, Agent, or Firm* — Gray Ice Higdon

(57) ABSTRACT

A universal smart key (USK) provides advanced proximity, location, distance or ranging capabilities and communicates with vehicles and smart phones to perform a set of vehicle-related operations and replicates OEM key and may include one or more of Bluetooth, BLE, UWB, NFC and other communications capabilities for determining location, proximity, range, distance of a user possessing the USK relative to vehicle location. A mobile (key) fob bridge (MFB) connected with vehicle communications and/or immobilizer control system and provides proximity, location, distance or ranging capabilities and communicates with vehicle and smart phones to perform a set of operations and may be located within a vehicle and communicate with smart key to provide a passive keyless entry system. The MFB may include Bluetooth, BLE, UWB, NFC and other communications capabilities for determining location, proximity, range, distance of a user possessing a smart key relative to the MFB device, and/or vehicle location(s).

23 Claims, 31 Drawing Sheets

(51) Int. Cl.
| | |
|---|---|
| *B60R 25/20* | (2013.01) |
| *E05B 81/56* | (2014.01) |
| *E05F 15/77* | (2015.01) |

(52) U.S. Cl.
CPC ... *B60R 2325/101* (2013.01); *B60R 2325/103* (2013.01); *B60R 2325/205* (2013.01); *E05B 81/56* (2013.01); *E05F 15/77* (2015.01); *E05Y 2400/8505* (2024.05); *E05Y 2400/851* (2024.05); *E05Y 2400/8515* (2024.05); *E05Y 2900/531* (2013.01); *E05Y 2900/55* (2013.01)

(56) References Cited

U.S. PATENT DOCUMENTS

| | | | |
|---|---|---|---|
| 11,485,320 B2* | 11/2022 | Qiao | B60R 25/24 |
| 11,524,656 B2* | 12/2022 | Yorke | B60R 25/24 |
| 2005/0248436 A1* | 11/2005 | Hohmann | B60R 25/24 |
| | | | 340/12.23 |
| 2009/0096575 A1* | 4/2009 | Tieman | G07C 9/00309 |
| | | | 340/5.62 |
| 2021/0402955 A1* | 12/2021 | Ahmed | B60R 25/01 |
| 2022/0180679 A1* | 6/2022 | Wisnia | G07C 9/00571 |

* cited by examiner (PRIOR ART)

FIG. 4                    FIG. 5

Vehicle Zones

MFB DEVICE CALIBRATING

MFB DEVICE LOCK/UNLOCK

MFB DEVICE LOCK/UNLOCK

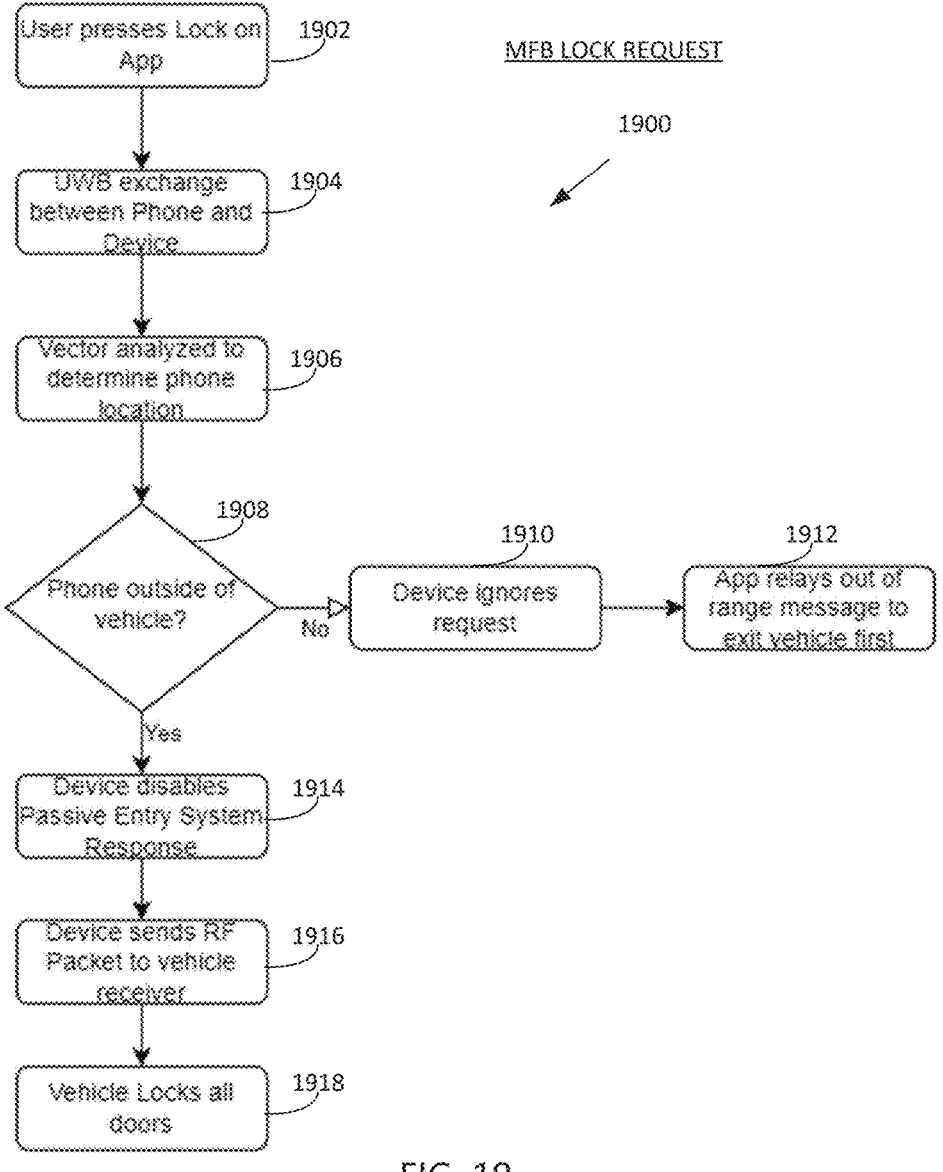

MFB LOCK REQUEST

1900

User presses Lock on App — 1902

UWB exchange between Phone and Device — 1904

Vector analyzed to determine phone location — 1906

1908 Phone outside of vehicle?

No → Device ignores request — 1910 → App relays out of range message to exit vehicle first — 1912

Yes ↓

Device disables Passive Entry System Response — 1914

Device sends RF Packet to vehicle receiver — 1916

Vehicle Locks all doors — 1918

FIG. 19

Action or logic on phone | Action or logic on MFB

Action or logic on phone and MFB | Pairing actions between USK module and vehicle Flowchart key

FIG. 20

Vehicle Type & Pairing

MFB Vehicle RSSI Lookup/Vehicle Zone Calibration Table

| Year | Make | Model | Vehicle Type | Vehicle Zone | Vehicle Zone Description | Assigned 3D Mesh | Vehicle RSSI Table | | |
|------|------|-------|--------------|--------------|--------------------------|------------------|--------|--------|--------|
| | | | | | | | RSSI x | RSSI y | RSSI z |
| 2016 | Dodge | Ram | Truck | Zone 1 | Near Vehicle | Zone 1 3D Mesh | x1,1 | y1,1 | z1,1 |
| 2016 | Dodge | Ram | Truck | Zone 2 | Outside, Near Driver Door | Zone 2 3D Mesh | x1,2 | y1,2 | z1,2 |
| 2016 | Dodge | Ram | Truck | Zone 3 | Outside, At Trunk | Zone 3 3D Mesh | x1,3 | y1,3 | z1,3 |
| 2016 | Dodge | Ram | Truck | Zone 4 | Inside, In Trunk | N/A | x1,4 | y1,4 | z1,4 |
| 2016 | Dodge | Ram | Truck | Zone 5 | Outside, Near Passenger Door | Zone 5 3D Mesh | x1,5 | y1,5 | z1,5 |
| 2016 | Dodge | Ram | Truck | Zone 6 | Inside, In Cabin | Zone 6 3D Mesh | x1,6 | y1,6 | z1,6 |
| 2012 | Ford | Edge | Hatchback | Zone 1 | Near Vehicle | Zone 1 3D Mesh | x2,1 | y2,1 | z2,1 |
| 2012 | Ford | Edge | Hatchback | Zone 2 | Outside, Near Driver Door | Zone 2 3D Mesh | x2,2 | y2,2 | z2,2 |
| 2012 | Ford | Edge | Hatchback | Zone 3 | Outside, At Trunk | Zone 3 3D Mesh | x2,3 | y2,3 | z2,3 |
| 2012 | Ford | Edge | Hatchback | Zone 4 | Inside, In Trunk | N/A | x2,4 | y2,4 | z2,4 |
| 2012 | Ford | Edge | Hatchback | Zone 5 | Outside, Near Passenger Door | Zone 5 3D Mesh | x2,5 | y2,5 | z2,5 |
| 2012 | Ford | Edge | Hatchback | Zone 6 | Inside, In Cabin | Zone 6 3D Mesh | x2,6 | y2,6 | z2,6 |
| 2009 | Nissan | Maxima | With Trunk | Zone 1 | Near Vehicle | Zone 1 3D Mesh | x3,1 | y3,1 | z3,1 |
| 2009 | Nissan | Maxima | With Trunk | Zone 2 | Outside, Near Driver Door | Zone 2 3D Mesh | x3,2 | y3,2 | z3,2 |
| 2009 | Nissan | Maxima | With Trunk | Zone 3 | Outside, At Trunk | Zone 3 3D Mesh | x3,3 | y3,3 | z3,3 |
| 2009 | Nissan | Maxima | With Trunk | Zone 4 | Inside, In Trunk | Zone 4 3D Mesh | x3,4 | y3,4 | z3,4 |
| 2009 | Nissan | Maxima | With Trunk | Zone 5 | Outside, Near Passenger Door | Zone 5 3D Mesh | x3,5 | y3,5 | z3,5 |
| 2009 | Nissan | Maxima | With Trunk | Zone 6 | Inside, In Cabin | Zone 6 3D Mesh | x3,6 | y3,6 | z3,6 |

FIG. 23

Vehicle Zone Creation & Calibration, Part 1

To Vehicle Zone Creation & Calibration, Part 2

To Vehicle Zone Creation & Calibration, Part 3

To Vehicle Zone Creation & Calibration, Part 4

SYSTEM, METHOD AND APPARATUS FOR MOBILE FOB OR KEY BRIDGE, VERSATILE SMART KEY, AND SMART DEVICE INTERFACE

CLAIM OF PRIORITY AND INCORPORATION BY REFERENCE

The present application claims priority to and incorporates by reference in the entirety the following patent application: U.S. Patent. App. 63/364,366, filed May 12, 2022, and entitled SYSTEM, METHOD AND APPARATUS FOR MOBILE FOB OR KEY BRIDGE, VERSATILE SMART KEY, AND SMART DEVICE INTERFACE (Robertson et al.). The present application incorporates by reference in the entirety the following patents or patent applications: U.S. patent application Ser. No. 16/780,805, filed Feb. 3, 2020, and entitled METHOD AND APPARATUS FOR IMPLEMENTING MULTI-VENDOR ROLLING CODE KEYLESS ENTRY SYSTEMS (Johnson et al.), which issued as U.S. Pat. No. 11,120,654 on Sep. 14, 2021; U.S. patent application Ser. No. 16/153,573, filed Oct. 5, 2018, and entitled METHOD AND APPARATUS FOR IMPLEMENTING MULTI-VENDOR ROLLING CODE KEYLESS ENTRY SYSTEMS (Johnson et al.), which issued as U.S. Pat. No. 10,553,060 on Feb. 4, 2020; U.S. patent application Ser. No. 14/165,922, filed Jan. 28, 2014, and entitled METHOD AND APPARATUS FOR IMPLE-MENTING MULTI-VENDOR ROLLING CODE KEY-LESS ENTRY SYSTEMS (Johnson et al.), which issued as U.S. Pat. No. 10,115,255 on Oct. 30, 2018; and U.S. patent application Ser. No. 17/447,571, filed Sep. 13, 2021, and entitled SYSTEM, METHOD AND APPARATUS FOR MULTI-VENDOR ROLLING CODE KEYLESS ENTRY AND FOR IDENTIFYING AND STORING KEY INFOR-MATION AND CREATING DUPLICATE KEYS AND REMOTE ENTRY DEVICES (Johnson et al.), each of which are hereby incorporated by reference herein in their entirety.

The present application further incorporates by reference the following patents or patent applications: U.S. patent application Ser. No. 16/153,602, filed Oct. 5, 2018, and entitled SYSTEMS AND METHODS FOR CREATING KEY BACKUPS BY IDENTIFYING AND STORING UNIQUE KEY INFORMATION IN A KEY BANK AND FOR REPLICATING UNIQUE KEYS FROM KEY BANK BACKUPS (Johnson et al.), which issued as U.S. Pat. No. 11,127,230 on Sep. 14, 2021, which is hereby incorporated by reference herein in its entirety.

FIELD OF INVENTION

The present invention generally relates to one or more radio frequency ("RF") devices adapted to provide enhanced features and capabilities, e.g., keyless entry and remote start, and interfaces with versatile smart key and smart devices such as smart phones, to multiple makes and models of vehicles. Additional inventive aspects may include replicat-ing RF frequency and data associated with manufacturer original equipment ("OEM") keyless entry remote devices. RF devices may be used as beacons to provide proximity, spatial, directional, and location data to compatible receiv-ing devices in connection with proximity or locational "awareness" of devices relative to one or more locations associated with a vehicle.

BACKGROUND OF THE INVENTION

There exists today a number of known communications protocols or platforms, e.g., UWB (Ultra-Wideband), RFID (Radio-Frequency Identification), Bluetooth (BR/EDR pro-tocol), BLE (Bluetooth Low Energy—Bluetooth Smart), NFC (Near Field Communication), Wi-Fi, and cellular (e.g., LTE) that provide highly effective communications between appropriately and compatibly equipped devices. Profes-sional and standards setting bodies, including IEEE (Insti-tute of Electrical and Electronics Engineers) and Bluetooth Special Interest Group (SIG), as well as universally avail-able resources, including Wikipedia, provide open access to technical specifications and implementation information for each of these known platforms.

Many of these platforms are employed using IC (Inte-grated Chip) or microchip and antenna components and may involve use of SDR (Software-Defined Radio) and/or other embedded techniques. These platforms have been adapted to provide proximity or location-based services including loca-tion-based automation. Cellular platforms may be used to complement GPS location accuracy and may be adapted to provide Connected Vehicle ("CV") functions, which include long-distance functionality like remote access features (e.g., locking/unlocking doors, opening trunks, alarming, or start-ing the engine on a vehicle), device configuration, retrieval of locally stored information (e.g., telemetry data), and software updates. Each of the above-referenced protocols and platforms has advantages and disadvantages when com-pared with one another. For example, cellular has the greatest range with limited location accuracy while Wi-Fi and Bluetooth offer greater range when compared with UWB. However, while cellular, Wi-Fi and Bluetooth/BLE have been adapted to provide location services, UWB has clear advantages over RFID, Bluetooth/BLE, cellular, and Wi-Fi in connection with applications requiring highly pre-cise real-time location discovery and ranging services in a short-range use environment to scan, detect and determine spatial location and movements of detected or responding objects. An array of detectable objects may be deployed in support of the location-based services. Once connected, data may be communicated between devices.

Ranging refers to the enhanced capability of not only monitoring or detecting proximity or presence of a beacon or device but also determining a distance or range associated with the signal. For example, distances may be categorized as immediate, near, or far and automated actions may be predicated on a respective distance category. In connection with development of location services technology, the IEEE standards setting organization formed IEEE 802.15 as a working group to specify WPAN-related standards for use in unified commercial deployment.

One important feature of such systems is the desire to provide secure transmissions and communications to avoid interception by unauthorized devices in proximity to the communications exchange. The platforms may use AES (Advanced Encryption Standard) encryption/decryption and application layer security. Applications may also employ known Public Key Infrastructure (PKI) and Public-Key Encryption (PKE) cryptography, or asymmetric cryptogra-phy. PKI is a platform that effectively binds public keys with identities through use of registration and issuance of digital certificates, such as issued by a known Certificate Authority (CA). PKI involves established policies and procedures required to create, manage, distribute, use, store and revoke digital certificates and manage PKE. PKE is a cryptographic system using pairs of keys, where each key-pair consists of a public key (which may be known to others) and a private key (which may not be known by anyone except the owner). ITU (International Telecommunication Union) established the X.400 and X.500 protocols related to electronic delivery services and including the X.509 cryptography standard on which public key certificates are based. The generation of such key pairs depends on cryptographic algorithms which are based on mathematical problems termed one-way functions. Effective security requires keeping the private key private; the public key can be openly distributed without compromising security.

BLE (Bluetooth 4.0-4.2, Bluetooth Smart) is a WPAN (Wireless Personal Area Network)-based solution that may be used in connection with proximity sensing and that is versatile in working with a range of smartphone applications. In connection with proximity sensing, BLE provides a PXP or proximity profile that serves as a proximity monitor to detect whether a proximity reporter is within a close range using the RSSI feature. RSSI (Received Signal Strength Indicator) represents a measurement of the power of a received radio signal. Device proximity, although not precise distance, may be determined using a radio receiver's RSSI value. Many smartphones support BLE communications and communicate with BLE-enabled devices. For example, iBeacon is a BLE platform established as a low energy solution to promote transmitters and/or transceivers to "broadcast" an identifier for detection of nearby devices such as smartphones having interoperable operating systems or APIs or applications running thereon. Upon coming within range of or proximity to an iBeacon-capable device, a responsive set of actions may be automatically triggered. Many common mobile operating systems including iOS, Android 4.3 and later, Windows Phone and BlackBerry, as well as macOS, Linux, Windows 8 and later, natively support BLE.

Packetization of data utilized in BLE-based systems involves use of a BLE protocol stack and/or links to functional layers relating to the controller, the host, and application profiles and services. The controller portion is comprised of several layers including BLE PHY (PHYsical layer) and LL (Link Layer or data link layer), and the controller-side host controller interface (HCI). The Host portion is comprised of several layers including, L2CAP (Logical Link Control & Adaptation Protocol—adaptation protocol layer), GAP (Generic Access Profile—specifies roles, modes, and procedures of a device), ATT (Attribute Protocol—transfers attribute data between clients and servers), GATT (Generic Attribute Protocol—encapsulates the ATT and is responsible for coordinating the exchange of profiles in a Bluetooth LE link), and SMP (Security Manager Protocol—applies security algorithms to encrypt and decrypt data packets). The App (Application Layer) layer is the direct user interface defining profiles that afford interoperability between various applications. The Bluetooth core specification enables vendors to define proprietary profiles for use cases not defined by SIG profiles. The BLE connection or handshake establishment procedure involves three phases—discovery phase, connecting phase and connected phase. A connection involves two devices, one a master and one a slave with GAP and GATT serving respective central, client and peripheral roles in the process. Interfaces are integrated on microcontrollers and cover the data link layer, with the physical layer implemented externally. A common asynchronous interface used in BLE applications is a BLE UART interface that simulates a UART (Universal Asynchronous Receiver Transmitter) or USART (Universal Synchronous/Asynchronous Receiver Transmitter) or Serial Communication Interface (SCI) at the Link Layer or data link layer.

Using the appropriate stack protocol and designated layer, data is packetized with payload, identification, and other information and packaged as a signal for communication and delivery to a receiving or destination device at both the source host and destination host.

Bluetooth 5.0-5.1, the successor specification to Bluetooth 4.2, has greater range and message capacity and faster communication speed, is used in IoT and Beacon applications, and all devices communicate over BLE. Bluetooth SIG specification version 5.1 advances Bluetooth direction finding capabilities and is implemented by a methodology known as Angle of Arrival (AoA) and Angle of Departure (AoD). This method enables devices to find another device more accurately than prior BLE-based versions utilizing beaconing capabilities for location finding using RSSI to estimate distance.

UWB is an IEEE 802.15.4a/z standard-based platform for secure, highly accurate real-time short-range location-based applications. UWB is a radio-based communication technology for short range applications and are typically integrated and embodied in microchip and antenna form. UWB measures distance and location with great accuracy—typically within a few centimeters. UWB calculates the time taken for radio signals to travel between devices to provide an essentially real-time and highly stable communication platform. UWB can be used to capture highly accurate spatial and directional data to support space or location-sensitive uses where precise location of a device/person is important to performance of desired functions. The UWB Forum was an industry organization formed to promote interoperable UWB wireless computer networking products and led to the formation of the UWB Alliance including numerous automotive companies.

Additional research and development are underway by several industry groups. For example, the FiRa (Fine Ranging) Consortium led by Samsung, Xiaomi, NXP, Sony, Bosch and others, is working to expand the UWB technology and ecosystem based on the existing IEEE 802.15.4/4x standard for low-data-rate wireless communication. FiRa leverages the IEEE 802.15.4 standard, which defines the characteristics of the UWB wireless interface to develop standards for the protocol stack, security keys, and other requirements to develop a secure interface for specific application segments.

UWB is used in many applications including IoT (Internet of Things), automotive applications, and in connection with smart devices such as smart phones. For example, in automotive applications smart keys or other remote key fobs, or the like, and vehicle-based equipment may come equipped with UWB transceivers to communicate or otherwise respond to the presence of UWB equipped devices. For instance, a vehicle may automatically lock and/or unlock doors as a person possessing a UWB-enhance device approaches or nears the vehicle and is detected by the vehicle-based UWB component based on proximity of the person. One problem is that older vehicles, when made, did not include UWB and other near-field capabilities.

More and more smartphones include UWB-enhanced capabilities for providing secure services, transmitting data and spatial and directional awareness on personal devices, e.g., AirDrop on iOS 13.1 on the iPhone 11 having the U1 chip, and similar features on Android-based personal smart devices such as made by Samsung, Huawei and others.

More and more vehicles include cellular-enhanced capabilities for providing secure services, transmitting data (e.g., CV applications) and spatial and directional awareness, e.g., via triangulation between cellular towers and cellular-equipped smart devices. Examples of such systems include OnStar, FordPass, and Nissan Connect.

While newer automotive vehicles include cellular, BLE and UWB capabilities, the majority of older vehicles do not have cellular/BLE/UWB-enabled components and are not capable of offering the enhanced features available in newer vehicles. What is needed is a system and method for providing one or more UWB and/or Bluetooth-enabled components or array of components (including beacons or antennas) at one or more locations in a vehicle (vehicle-installed RF device) serving as a beacon for interrogation by smart devices such as smart keys and/or smart phones capable of detecting spatial and/or directional data obtained from the vehicle-installed RF device. What is needed is a system and method for providing a cellular-enabled device serving as a long distance communication component that enables deployment of Enhanced CV Applications and Services ("ECVAS"): This includes interrogation or communication with a smart phone or web-based application capable of detecting spatial and/or directional data, distance functionality, performing remote access features (e.g., locking/unlocking doors or starting the engine on a vehicle), updating device configuration, retrieval of locally stored information (e.g., telemetry data) and application of software updates. What is needed is an application adapted to run on a smart phone, over or on a smart device, or on a remote server for processing the obtained or captured spatial, location or telemetry information and performing one or more operations and for use in connection with a user interface associated with the application. What is needed is an application adapted to run on a smart phone, smart device, or remote server for updating the configuration of or software on the vehicle-installed RF device. What is needed is an application adapted to run on a smart phone, smart device, or remote server for performing long distance remote-access operations to the vehicle such as locking/unlocking the vehicle door(s), popping the trunk, or starting the vehicle.

Remote Access systems for consumer vehicles have become a popular, if not essential, feature of most vehicles sold today. Increasingly, remote access systems are in the form of a key fob (some of which include an emergency key blade for manual lock entry) or an integrated key having a blade and key head or base. In either of these formats the key fob or key head typically includes a set of buttons dedicated to perform a set of operations, e.g., lock/unlock doors, open trunk, sound alarm, and remote start. Moreover, certain functions may be performed simply based on proximity of the driver possessing the key fob to the vehicle, e.g., unlock a locked door upon sensing proximity or location of the driver to the vehicle or an assigned or designated location of the vehicle. Such devices are often referred to as smart keys. For example, an array of sensors located or disposed at predetermined locations may sense that a driver is proximal to one of the sensors and is therefore proximal to the location of the sensor to allow or to automatically perform an operation. Also, an ignition start button may be enabled if a driver is determined to be within a set range of a sensor associated with this operation. The ubiquitous nature of smart phones and the readily available development tools and integrated communications technology supported by them provide an appealing alternative or replacement to the smart key for controlling operations associated with a vehicle. More recently, remote access systems have been enhanced with cellular connections to enable ECVAS. Smart phones natively include many attributes needed by a smart key and many additional attributes not provided on a smart key but offer enhanced properties. Accordingly, smart phones offer an attractive platform for aftermarket vehicle accessory systems.

One typical platform for providing secure communication connecting the smart key with a complimentary communications component in a target vehicle is known as Passive Entry Passive Start (PEPS), also referred to as Passive Start and Entry (PASE). PEPS provides a secure wireless communication system that enables a driver operating a smart key, or mobile device with BLE and/or UWB, to access an assigned vehicle to lock/unlock and/or start the vehicle without physically using a key. PEPS uses RF signals (e.g., BLE) for authenticating smart keys by sending signals between the vehicle communications module or component and the smart key. To perform such operations a user possessing the key or key fob must be within a functional range, depending on the platform used, of the vehicle or beacons or sensors installed on the vehicle. As means to enable functional operations, some PEPS platforms use BLE for secure localization and AoA while others use a legacy, less secure system comprised of an array of LF (~125 kHz) coils spaced at known positions within the vehicle, in conjunction with RSSI measurements by the smartkey, to triangulate the smartkey's position relative to any point (e.g., driver's seat) within the vehicle. Nearly every vehicle on the market for the past several years has included some form of keyless entry as either a standard feature or add-on option. Many vehicles in more recent years have included a cellular connection as either a standard feature or add-on option to enable ECVAS. Consumers with older vehicles without remote access systems and additional enhanced features (e.g., PEPS) enabled through use of cellular, BLE and UWB have the desire to retrofit their vehicles with aftermarket systems. What is needed is a system that can enhance the security of the legacy PEPS platform by providing additional, more secure channels of communication with the vehicle that are provided by the newer platforms that use BLE and UWB.

Second, replacement remote devices for those lost or damaged are typically proprietary and available from the original manufacturer only for a limited number of years after the manufacturer stops production of the vehicle model. Even when available, the OEM replacements are very expensive. Lower cost options are needed to provide purchasers with less expensive and more accessible options. After OEMs discontinue providing replacements it becomes increasingly difficult for consumers to buy a new OEM remote device and so alternative sources for such devices is needed.

Third, many consumers own more than one vehicle and each vehicle may be a different make or model and may have its own keyless entry remote device that is not compatible with the other vehicles owned by the consumer. Also, many companies operate fleets of vehicles and management of a fleet of vehicles comprising a variety of makes and models presents numerous challenges. Managing two or more remote devices, let alone tens or hundreds of remote devices, can be a nuisance and confusing if the remote devices feel or look similar but are incompatible.

Finally, the features and capabilities of a given OEM or aftermarket remote device are limited by the technologies of the period during which it was produced. Many remote devices were designed with poor analog transmitters that lacked range or battery life. These remote devices may have used fixed or simple rolling codes in their protocol that limit their security margin. The legacy PEPS, or LF RSSI-based, devices can be susceptible to "relay attacks". What is needed are aftermarket devices that provide enhanced encryption/decryption capabilities for greater security. What is needed is a way to upgrade function and security for operators of vehicles that pre-date technological advancements including with proximity or location or ranging capabilities afforded with BLE and/or UWB technologies, ECVAS capabilities enabled through cellular, and potentially coupled with other technologies using UHF, LF, NFC and other techniques.

The following provides additional background into vehicle key technology generally related to the present invention. Keyless entry (KE) systems known in the art employ a wide range of schemes for generating the key sequences used by remote devices. There are several common data formats used in remote device RF radio transmissions and each type is typically referred to as a code. These code types include fixed codes, rolling codes, and encrypted rolling codes.

The first generation of keyless entry remote devices transmitted the same data pattern every time a key was pressed. This is referred to as a "fixed code." The data is simple, and usually consists of an ID code and function code. Most fixed code remote devices have a different ID code, but all units of a particular remote device model shared the same function codes. Increasingly, over time this type of code could easily be intercepted by an unauthorized person and replayed through a transmitter to gain unauthorized access to the vehicle.

To eliminate the replay vulnerability of fixed codes, the ID code was made longer, and made to change in a pre-defined number sequence every time a button was pressed, this is known as a "rolling code." The ID number sequence was known to the remote device, and the car receiver. They merely had to be synchronized to the same point in the sequence, and the car would always know what code should come next in sequence from the remote device. However, this sequence is not a pre-stored list of numbers. The next number is generated by a mathematical formula that produces a known sequence of what appears to be random numbers. This approach provides a much greater level of security, as an attacker must exactly replicate the mathematical algorithm used to generate the numbers. The difficulty in recreating the original algorithm is easily increased by making the ID code longer, but this too can be subject to a replay attack.

An encrypted rolling code remote device encrypts the signal generated by the rolling code system before radio transmission, making it more difficult for an unauthorized person to analyze the rolling code content. Encryption schemes vary from vendor to vendor and usually include longer key sequences and specialized hardware to generate the encrypted key sequences. Keeping in mind that rolling code remote devices also increment their key sequences, many vendors also use elaborate algorithms to determine the amount by which the key sequence number will be incremented. Additionally, complex authentication schemes can be used between the remote device, the user's physical transponder key, and the RF base station in the vehicle to validate the key that was provided by remote device.

The use of multiple code schemes in the art makes it very challenging to create a device that is compatible with multiple makes and models of vehicle or with multiple remote devices. Furthermore, remote devices known in the art are typically frequency fixed. Frequency fixed remote devices cannot be reprogrammed to work optimally or at all at different transmission frequencies.

Contemporary remote keyless entry systems are designed to be easy to use and secure from attackers. When a user presses a button on his or her keyless remote, an internal microprocessor interprets the request and generates a unique packet of binary data. This packet may contain a unique serial number of the remote, an authentication string, function code, and various checksums. This data packet is then transmitted by the remote via an ultra high frequency (UHF) radio signal to the vehicle. The user's vehicle can then process the data verifying the remote is authorized and perform the requested action (ex: unlocking a door).

The transmitted radio signal could be monitored by possible attackers so the authentication string is important in maintaining the security of the vehicle. The authentication string often changes with each button press as a rolling code. This rolling code prevents an attacker from simply copying and replaying an earlier transmission from the same remote. To prevent an attacker from gathering many samples of the rolling code for analysis, the rolling code is often encrypted with a cipher which completely scrambles the authentication value. In order to process these complex and constantly changing values, the vehicles must share the encryption key used by the remote, the algorithm used to generate the rolling code, and the method for synchronizing to the rolling code.

Starting in the early 1990s, car keys began incorporating transponder technology. Transponders are small plastic or glass inserts that are self-contained devices which supplemented the security of the cut key blade. Transponders require no battery and are powered by a low frequency radio signal delivered from a loop of wire around the ignition coil. When a driver starts his or her car, the key blade activates the ignition and the car simultaneously "reads" the transponder via the wire loop to verify the key was authorized to start the car. If the transponder does not "respond" with a valid code (e.g., in the case of hot-wiring a car), the car will shut itself off after a few seconds from starting.

Security transponder evolution has mirrored that of remote keyless entry systems with the first generation being simple, insecure devices that transmitted a fixed value when interrogated by the ignition coil. Much like remote keyless entry, the communication signals can be easily monitored by an attacker with legally available tools. To avoid replay attacks, transponders quickly moved to more complex encryption, such as HITAG and AES, as well as the use of rolling codes. Transponders are now typically highly secure devices capable of bidirectional communication with the vehicle. With the ability for the car to send data to a transponder, some vehicle keys have the ability to store hundreds of bytes of information about the key and vehicle. This information may comprise secret encryption keys and comfort features such as the last radio station used or electronic seat position.

In addition to incorporating transponders with the key blade, remote keyless entry ("RKE") systems and key fobs now incorporate the transponder functionality with remote keyless entry microprocessors on the key. The combination of transponder, remote keyless entry microprocessor and system, and key blade forms a combination key where the keyless remote, key blade, and security transponder are packed together into a single device. The remote keyless entry portion and transponder portion of the key can share information providing for the transponder to receive rolling code and encryption key updates from the vehicle. Using a combination key with the transponder and remote keyless entry system in communication with one another, the rolling code protocols and encryption techniques may become very advanced and unbreakable to all but the most dedicated attacker.

In addition to RKE, transponder, and mechanical key functionality, first introduced in 1998 and becoming ubiquitous in the 2010s, PEPS systems are comprised of Low Frequency ("LF") transmitter coils permanently installed at several distributed locations within the vehicle. These transmitter coils modulate an LF carrier (~125 kHz) signal to communicate encrypted data to a fob containing a microprocessor-based receiver coupled to small X, Y, and Z receiver coils, or "3D coils", each oriented in its respective 3-D plane. Along with receiving and decrypting the encrypted data to process a command or receive a packet of information, the signal strength received by each of these 3D coils is measured and converted to X, Y, and Z RSSI values. Typically, the fob communicates encrypted information, such as the recently measured RSSI values, back to the vehicle via UHF (i.e., over the RKE channel). Given the known location of each transmitter coil within the vehicle along with the RSSI values received by the 3D coils, an OEM-installed system can determine the location of the fob relative to any one of the transmitting vehicle coils, and in effect, relative to any one of several important zones of a vehicle. These important zones may include by the driver's door, by the passenger door, by the trunk, in the driver's seat, or in the cab of the vehicle. When the fob's position is determined to be within a particular zone, a particular vehicle feature may be enabled. For example, if the fob is in the zone by the driver's door, the pressing of the button on that door handle results in the vehicle unlocking or locking. This is the "Passive Entry" portion of PEPS. In yet another example, if the fob is in the zone considered to be within the cab of the vehicle, the pressing of the "Push to Start" button on the dashboard will result in the starting of the vehicle. This is the "Passive Start" portion of PEPS. The mechanical key, which is usually stowed with the blade embedded within the fob and used typically only when the battery in the fob is dead, is removeable by the user to unlock the vehicle door, trunk, or glove compartment. Typically, to allow starting of the vehicle when the fob's battery is dead, the fob is placed in a predetermined location within the vehicle containing an immobilizer coil. When the "Push to Start" button is pressed, via at least one of the 3D coils, the transponder portion of the fob is authenticated by the vehicle, allowing the vehicle to start. Early generations of the PEPS system were susceptible to "relay attacks", allowing thieves to unlock, start, and steal vehicles quite unobtrusively. This attack was enabled by two connected wireless transceivers: One proximate to the fob (e.g., placed next to a vehicle owner's purse containing a fob, or by a vehicle owner walking with the fob in their front pocket); the other placed closed to the vehicle. In this arrangement, although the fob and vehicle were far apart, were not heading in a vector approaching the vehicle, and a communication delay existed between the fob and vehicle, the fob and vehicle were not designed to detect these discrepancies and therefore accepted this communication as being authentic. To counter this attack, newer generations of PEPS systems are designed to measure and detect any one or more of the indicated or other discrepancies.

Given the complexity of the KE systems in vehicles, automotive key/remote duplication is a complex and expensive process. Car owners may have a difficult time finding replacement keys and remotes, especially for older vehicles that may no longer be supported by the original manufacturer or automotive dealership.

A replacement KE device must be "paired" to the target vehicle. This "pairing" process usually involves the use of an expensive dealer owned programming tool or an after-market programming tool. In the pairing process, these tools usually connect to the on-board diagnostics ("OBD") port on the vehicle and communicate with various systems within the vehicle to generate a series of encrypted numerical sequences that are combined in various ways to generate unique vehicle codes that are used to authenticate the key or remote with the vehicle. Once generated, these authentication codes are static. If the authentication codes were captured during the pairing process, they would remain valid for later usage. Generally, this conversation between the tool and the vehicle includes a security transponder, the vehicle electronic control unit ("ECU") or body control module ("BCM"), and the KE device. If this process is not executed properly or a programming fault occurs, it is possible to leave the car in a "bricked" state where the vehicle will not start or respond properly to the KE device. It can be a very expensive process to reset the ECU or body control module of a vehicle.

These issues compound to make for a very challenging and negative experience for the customer when replacing or copying an OEM vehicle key. Customers are forced to source replacement keys from dealers or locksmiths.

Additionally, there now exist "virtual keys" hosted entirely on a smartphone. Many virtual key devices bypass traditional immobilizers and security systems. Some even communicate directly with the BCM or ECU. However, these approaches may be dependent on networks that lack appropriate levels of security thereby putting the vehicle at risk.

For instance, the Car Connectivity Consortium® (CCC) is a cross-industry standards organization that creates flexible ecosystems applicable across a wide range of vehicles, manufacturers and mobile devices and operating systems, e.g., iOS and Android. CCC has developed and promoted a "Digital Key" standardized ecosystem that enables mobile devices, such as smart phones, to store, authenticate, and share Digital Keys for communicating with vehicles in a secure manner. Vehicle security and access systems are sophisticated and tightly controlled by each manufacturer and vary widely in the manner with which mobile devices may gain access to such systems. CCC published its Digital Key, Release 2.0 as a specification designed to meet vehicle manufacturers security and access communications requirements in providing access by mobile devices. The CCC adopted BLE in combination with UWB wireless connectivity technologies in its specification to enable location-aware features for Digital Key for secure positioning and high accuracy in key fobs. Member companies have been working on optimizing the High-Rate Pulse repetition frequency (HRP) UWB standard in IEEE 802.15.4z to achieve this level of accuracy within this specific use case, while ensuring safety and security. The Digital Key and other related specifications are available from CCC via its website—www.carconnectivity.org.

SUMMARY OF THE INVENTION

While the various inventions may be referred to as "present invention" the term is not limiting or requiring all aspects of invention disclosed herein. Although the first (USK) and second (MFB) inventive aspects are related and combinable, the individual inventive features may stand on their own as inventions.

The present invention provides a system and method for deploying BLE and/or UWB-enabled devices to enhance spatial and directional sensing or beaconing in connection with vehicles to provide functions and layers of security not otherwise available. The present invention further provides a system and method for deploying a cellular-enabled device to enhance long distance communication capabilities to vehicles to provide functions not otherwise available. For instance, in automotive applications a first present invention provides a universal smart key or smart key fob ("USK") for use across a range of vehicle makes and models and years (MMY) for pairing with and communicating with vehicle immobilization and security systems and for performing functions typically found on modern OEM key fob devices, e.g., remote entry, passive entry, locking/unlocking doors, unlatching trunks, alarm sounding, engine start, etc. A second present invention provides a mobile fob bridge (MFB) also referred to as "ZeroKey" or more simply "bridge." The bridge may include the USK functionality as an integral or removable module or component and provide USK functions. The bridge device pairs with and communicates with vehicle immobilization and security systems and provides a communications bridge to communicate with either or both of 1) a hand-held smart device, e.g., a smart phone or smartphone, and/or 2) remote equipment, e.g., remote or central server. Also, the bridge may communicate with the remote equipment, e.g., remote or central server, via the hand-held smart device via web browser or an application running on the smart device. The bridge may be configured to communicate directly with a remote based server such as over a wireless network. The system is adapted to perform certain operations in essence replicating functions or features typically found on OEM key fob devices, e.g., remote entry, passive entry, locking/unlocking doors, unlatching trunks, alarm sounding, engine start, etc.

In automotive applications smart keys or other remote key fobs or the like may come equipped with UWB and/or BLE transceivers and vehicle-based equipment may come equipped with cellular, UWB and/or BLE transceivers to communicate or otherwise respond to the presence of cellular and UWB and/or BLE equipped devices to enable PEPS and/or ECVAS functionality. Vehicles equipped with cellular, UWB and/or BLE may enable devices other than smart keys provided with the vehicle to enable the same PEPS and/or ECVAS functionality. For instance, a vehicle may automatically lock and/or unlock doors as a person possessing a UWB-enhanced device approaches or nears the vehicle and is detected by the vehicle-based UWB component based on proximity of the person. Alternatively, a user may be miles away from their vehicle and send a command to unlock the vehicle door from an application running on their smart phone to the vehicle-based cellular component. One problem is older vehicles when made did not include cellular radios nor UWB and other near-field capabilities. The present MFB invention provides a solution to this problem in providing modern advanced functions by providing a bridge to communicate with and existing vehicle security systems.

More and more smart phones include UWB-enhanced capabilities for providing secure services transmitting data and spatial and directional awareness on personal devices, e.g., AirDrop on iOS 13.1 on the iPhone 11 having the U1 chip, and similar features on Android-based personal smart devices such as made by Samsung, Huawei and others. By working in connection with a smart phone UWB/BLE module, the present MFB invention and the USK invention may utilize integrated UWB and/or BLE equipped beacon or antenna to provide secure access and control of the aforementioned features associated with a vehicle.

The following are among the advantages associated with the present inventions: avoids need for physical key; enables the USK/MFB device to replace some or all functions of original OEM key; non-invasive—"plug, pair, and play" integration and setup; may leverage consumer mobile smart phone or other smart device; enables multiple users (e.g., car sharing); enables ECVAS; enhances Fleet Management (e.g., utility companies, UPS, FedEx, USPS); versatile power format—can use vehicle power or battery powered; and enables current smart key vehicles ability to upgrade; replace the need for a physical key and/or transponder by providing alternate methods of gaining entry and starting the vehicle.

A first embodiment of the present invention provides a Bridge adapted to be disposed in a target vehicle and to be wirelessly paired with a hand-held smart device operated by a user for controlling a set of features associated with the target vehicle. The Bridge comprises: a transceiver adapted to perform ranging operations in cooperation with the wirelessly-connected hand-held smart device; a micro-controller adapted to handle BLE operations and communications with BLE functions of a wirelessly-connected smart device; a USK module comprised of a communications interface configured to communicate with one or more vehicle communications systems, the USK module further configured to perform vehicle-specific operations in connection with the transceiver or the micro-controller BLE-enabled functions or both the transceiver and the micro-controller BLE-enabled functions; and one or more memory components configured to store data and/or instructions related to one or more of pairing, behavior selecting, behaviors, bootloading, and calibrating processes.

The first embodiment may be further characterized in one or more of the following features: wherein the transceiver is an ultrawide band (UWB) micro-controller-based transceiver; wherein the set of features includes one or more of security feature, access feature, entry feature, trunk feature, door lock/unlock feature, engine start feature, alarm feature, light on/off feature, door open feature, operator recognition feature, convertible top feature, windows up/down feature, and operator approval feature; further comprising a user-to-user communication feature to enable a remote user to communicate with an other user operating the hand-held smart device to enable control of the target vehicle via the Bridge. Still further the first embodiment may be characterized in one or more of: further comprises a LF (low frequency) component adapted to communicate with a vehicle communications system, and wherein the USK module is configured to communicate with one or more vehicle communications systems, and wherein the one or more vehicle communications systems includes transponder, UHF or LF components including antennas and/or OBD interfaces; further comprising a Near Field Communications (NFC) reader that has an associated NFC coil antenna adapted to read a trusted NFC tag, wherein the NFC reader is located within the target vehicle either integral with the Bridge or separate from the Bridge, and wherein the trusted tag is read by the NFC reader to allow access to the target vehicle; wherein the USK module comprises a Bootloader Application stored in an internal memory; further comprising an expansion port for adapting the Bridge to perform enhanced functions and/or to alter firmware or behavior data and/or instructions; further wherein the USK module is configured to be removable from the Bridge for placing in a pairing pocket or other vehicle location for communicating with one or more of a vehicle system, a data link connector, or LF coils; wherein the Bridge is configured to pair with a hand-held smart device by operation of a dedicated mobile application loaded onto and operating on the hand-held smart device.

A second embodiment of the present invention provides a method of controlling a set of features associated with a target vehicle. The method comprises the steps of: providing a Bridge disposed in a target vehicle; wirelessly pairing the Bridge with a hand-held smart device and operated by a user for controlling a set of features associated with the target vehicle; communicating, via a vehicle communications interface associated with the Bridge, with one or more vehicle communications systems; performing, via a transceiver associated with the Bridge, ranging operations in cooperation with the wirelessly-connected hand-held smart device; processing, by the Bridge, BLE operations and communications with BLE functions of a wirelessly-connected smart device; performing, by the Bridge, vehicle-specific operations in connection with the transceiver or the BLE-enabled functions or both the transceiver and the BLE-enabled functions; and storing, by one or more memory components associated with the Bridge, data and/or instructions related to one or more of pairing, behavior selecting, behaviors, bootloading calibrating processes.

The second embodiment may be further characterized in one or more of the following features: wherein the transceiver is an ultrawide band (UWB) micro-controller-based transceiver; wherein the set of features includes one or more of security feature, access feature, entry feature, trunk feature, door lock/unlock feature, engine start feature, alarm feature, light on/off feature, door open feature, convertible top feature, window open/close feature, operator recognition feature, and operator approval feature; further comprising establishing a user-to-user communication connecting a remote user with an other user operating the hand-held smart device in close proximity to the target vehicle to enable control via the Bridge; further comprising communicating via a LF (low frequency) component with a vehicle communications system, and wherein the vehicle communications interface is configured to communicate with one or more vehicle communications systems, and wherein the one or more vehicle communications systems includes UHF or LF components including antennas and/or OBD interfaces; further comprising providing a Near Field Communications (NFC) reader that has an associated NFC coil antenna adapted to read a trusted NFC tag, and reading by the NFC reader a trusted tag to allow access to the target vehicle, wherein the NFC reader is located within the target vehicle either integral with the Bridge or separate from the Bridge; further comprising operating a mobile application running on the hand-held smart device to wirelessly communicate with the Bridge and execute vehicle control features; further comprising providing an expansion port for adapting the Bridge to perform enhanced functions and/or to alter firmware or behavior data and/or instructions; further comprising providing a USK module to perform BLE operations and communications with BLE functions of a wirelessly-connected smart device, wherein the USK module is removable from the Bridge for disposing in a pairing pocket or other location for communicating with a vehicle system, e.g., data link connector, or via LF coils; further comprising pairing the Bridge with the hand-held smart device by operation of a dedicated mobile application loaded onto and operating on the hand-held smart device; further comprising at least one of the following steps: (a) operating, using the hand-held smart device, a "tap" function to perform vehicle control functions via the Bridge; and (b) providing an accelerometer disposed within the target vehicle and operatively connected to the Bridge, and causing the accelerometer to perceive a "knock" action by a user to perform a vehicle control function.

The second embodiment may be further characterized in one or more of the following features: further comprising a calibration process comprising the following steps: prompting, by mobile application operating on the hand-held smart device, a user to position the hand-held smart device to a set of defined locations in and around the target vehicle; at each defined location, generating a signal representing location data and communicating the location data to the Bridge; and generating, by an algorithm associated with the application, a set of location vectors; and creating and storing a calibration profile for allowing the Bridge to locate the hand-held smart device in a three-dimensional space associated with the target vehicle.

The second embodiment may be further characterized in one or more of the following features: wherein a vehicle control function is performed based on a sensed location of the hand-held smart device and based on the calibration profile; further comprising a pairing process comprising the following steps: selecting, via a mobile application running on the hand-held smart device, a pairing process for pairing the Bridge with the target vehicle; entering via the mobile application one or both of a) data representing a make model and year (MMY) of the target vehicle, and b) a VIN (vehicle identification number) of the target vehicle; communicatively coupling the Bridge with a vehicle communications system based in part on the MMY or VIN data; and following prompts presented on the mobile application to communicate with the vehicle communications system to send commands and respond to security access challenges.

The second embodiment may be further characterized in one or more of the following features: wherein communicating with the vehicle communications system to send commands and respond to security access challenges further comprises one from the group consisting of: causing, via the mobile application, the phone to communicate with the Bridge over BLE to command the Bridge to send RF packets as required by target vehicle to complete pairing process; positioning the Bridge at a defined location within the target vehicle to facilitate wireless communication with immobilizer system; plugging in an adapter cable into Bridge to fit immobilizer reader coil adapter into a defined location in the target vehicle; and placing the bridge or pairing component of the Bridge in or within a close proximity to a pairing or programming pocket or slot.

The second embodiment may be further characterized in one or more of the following features: wherein communicatively coupling the Bridge with a vehicle communications system includes one from the group consisting of: plugging in an OBD plug associated with the Bridge to an OBD port associated with the target vehicle; placing a vehicle communications interface component of the Bridge into a pairing pocket of the target vehicle; and placing the Bridge near a pairing coil associated with the target vehicle.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIGS. 4-8 provide a series of plan views of exemplary embodiments of keyless remote entry devices used to operate motor vehicles.

FIGS. 16-19 illustrate a set of flowcharts associated with a first exemplary pairing/calibrating/locking implementation.

FIG. 16 provides a flowchart illustrating an exemplary app-based USK/MFB Device Pairing Process in accordance with one embodiment of the present invention.

FIG. 17 provides a flowchart illustrating an exemplary app-based USK/MFB Device Calibration Process in accordance with one embodiment of the present invention.

FIG. 19 provides a flowchart illustrating an exemplary app-based USK/MFB Device Vehicle Door Locking Process in accordance with one embodiment of the present invention.

FIG. 20 provides a flowchart key providing a legend of various roles and perspectives associated with actions taken in the pairing/calibrating processes of FIGS. 21-27.

FIGS. 21-27 illustrate a set of flowcharts associated with a second exemplary pairing/calibrating/locking implementation.

FIG. 21 provides a flowchart illustrating an exemplary app-based USK/MFB Device Behavior Selection Process in accordance with one embodiment of the present invention.

FIG. 22 provides a flowchart illustrating an exemplary app-based USK/MFB Device Vehicle Type and Pairing Process in accordance with one embodiment of the present invention.

FIG. 23 provides an illustration of an exemplary app-based USK/MFB Device RSSI/Zone Calibration Table in accordance with one embodiment of the present invention.

FIGS. 24-27 provides a flowchart illustrating an exemplary app-based USK/MFB Device Vehicle Zone Creation and Calibration Process (Parts 1-4) in accordance with one embodiment of the present invention.

FIG. 28 illustrates a set of memory allocations associated with the exemplary bootloading operation.

FIG. 29 illustrates a ULP (EEPROM) external memory associated with the exemplary bootloading operation.

FIG. 30 illustrates an External Flash Memory (encrypted) associated with the exemplary bootloading operation.

FIG. 31 illustrates a User Application stored on internal flash memory associated with the exemplary bootloading operation.

FIG. 32 illustrates a RAM memory allocation associated with the exemplary bootloading operation.

FIG. 33-35 illustrate a Bootloader Application stored on internal flash memory associated with the exemplary bootloading operation.

DETAILED DESCRIPTION

Figure 1:
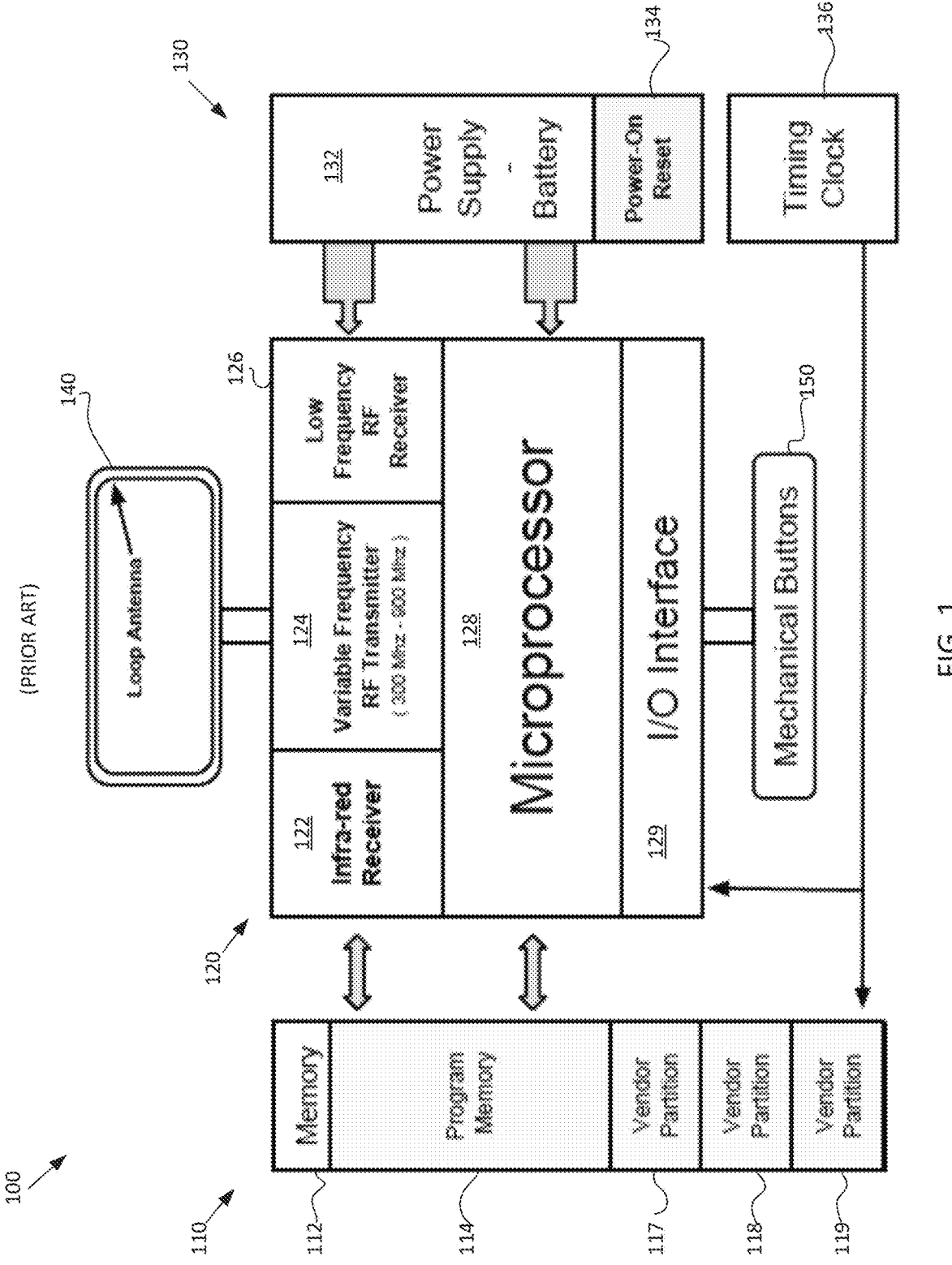
FIG. 1 provides a schematic view of one embodiment for the high level circuit implementation for a rolling code keyless entry device.

The present inventions will now be described in more detail with reference to exemplary embodiments as shown in the accompanying drawings. While each aspect of the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention comprises two distinct devices that share some common operational componentry and may be used separately or combined and may include interconnection with smart phones or other smart devices to provide enhanced vehicle communications and control systems including for remote keyless entry and remote vehicle start.

A first component of the present invention is a universal smart key (USK) device such as a smart fob or the like that has one or more advanced proximity, location, distance or ranging capabilities and adapted to communicate with a vehicle and a smart phone/device to perform a set of operations, e.g., lock/unlock, trunk unlatch, horn, lights, etc., related to control of one or more target vehicle(s). The USK device may replicate and/or enhance the operations of an OEM key provided originally with a target vehicle or set of vehicles. The USK device may include one or more of transponder, RKE, PEPS, Bluetooth, BLE, UWB and other communications capabilities and interoperate with existing locations beacons or sensors or antennas installed or located about a vehicle for determining one or more of location, proximity, range, distance of a user possessing the USK relative to one or more vehicle location(s).

A second component of the present invention is a mobile (key) fob bridge (MFB) device capable of being directly connected with a vehicle communications system and vehicle immobilizer control unit (e.g., BCM/ECU), e.g., directly connected via OBD, or dongle via OBD, or other hard-wired or wireless connection, that has one or more advanced proximity, location, distance or ranging capabilities and adapted to communicate with a vehicle and a smart phone/device to perform a set of operations, e.g., lock/unlock, trunk unlatch, horn, lights, etc., related to control of one or more target vehicle(s). For example, the MFB device may be installed or otherwise placed or disposed or located within a vehicle and may communicate with a smart key, either an OEM provided smart key or the USK device discussed herein, to provide a passive keyless entry system. The MFB device may communicate with one or more of: an OEM key provided originally with a target vehicle or set of vehicles, a USK device that serves to replace or replicate or supplement an OEM key to operate a target vehicle, and a smart phone or other smart device. The MFB device may include one or more of Transponder, PEPS, RKE, Bluetooth, BLE, UWB, NFC and other communications capabilities and interoperate with existing (or added aftermarket) location beacons or sensors or antennas installed or located about a vehicle for determining one or more of location, proximity, range, distance of a user possessing a smart key (e.g., an OEM or USK device) relative to the MFB device and one or more vehicle location(s).

The primary sections of the present disclosure related to functional operation of the USK and MFB devices is below with reference to FIGS. 10-19. However, while pairing of the USK/MFB devices disclosed herein is principally discussed in connection with the app-based approach of FIG. 16, there are prior systems and methods utilized to pair after-market keys with vehicles for operating such vehicles. FIGS. 1-9 that immediately follow describe such systems and are included for reference as to the interoperation of keys with vehicle immobilizer control unit (e.g., BCM/ECU) and other vehicle-based communications and control systems.

FIGS. 1-9 relate primarily to prior Universal Rolling Code Remote (URCR) or Universal Remote Head Key (URHK) systems of previously disclosed inventions of the present applicant covered in prior patents and patent applications as incorporated herein above.

With reference to FIG. 1, a schematic view of an embodiment of a remote entry device 100 according to the present invention is provided. The remote entry device primarily comprises a processing unit 120 and as described herein is not limited to "entry" function but may include a variety of key operations. The processing unit 120 of the remote entry device 100 comprises a microprocessor 128, I/O interface 129, infra-red receiver 122, variable frequency RF transmitter 124, and low frequency RF receiver 126. The processing unit is also operatively connected to a loop antenna 140, mechanical buttons 150, power unit 130, timing clock 136, and memory module 110.

The processing unit 120 is comprised of a suitable microprocessor 128 which may be a microcontroller or Application Specific Integrated Circuit (ASIC) having a general processor core, static and volatile memories, hi-resolution timers, standard integrated circuit interfaces, cryptographic acceleration modules, transceiver acceleration and power management features. The static memory in the processing unit may be supplemented by external memory 112 in the memory module 110 in electrical communication with the processing unit. External memory 112 in the memory module 110 may be high capacity and/or high security and tamper resistant. This type of memory provides a greater security margin to both the user and the operation of device 100. The system timing may be provided by a timing clock module which may be a separate module 136 or may be integrated into the microprocessor 128. The system timing signals are used to control the state of the memory module 110, I/O interface 129, the microprocessor 128, and the transmitter 124 and receivers 122 and 126. The I/O interface 129 de-bounces the signals from the mechanical buttons 150 but is also a general-purpose interface for other devices that may be connected to the remote entry device 100.

The memory module 110 may comprise two primary forms of data: the active configuration and possible configurations. The active configuration is stored within the program memory 114 that is easily accessible for the processing unit 120. This block of data describes how the remote entry device 100 should behave when asked to perform a remote access emulation task. In addition, information related to active rolling code seeds, encryption keys, and other sensitive information may be stored in separate, protected areas of the memory module 110 such as vendor partitions 117, 118, and 119.

Possible configurations stored in memory module 110 will vary depending on the implemented method of configuration. For standalone applications with user inputted configuration, all possible configuration data will need to be stored. When a configuration tool is used or the system is intentionally limited to a small number of remote devices, the possible configuration memory may be very small or even not implemented. In either case, the possible configurations will be organized in vendor partitions 117, 118, and 119 based on remote device technology. Vendors or manufacturers with similar functioning remote devices will be combined to meet a lowest common denominator of functions and features with extra functions available on a per remote device basis. This grouping allows for configuration data to be optimized for storage and for efficient retrieval for processing. A set of possible configurations may also be referred to as a set of device configuration profiles. A set of device configuration profiles may be one or more profile. A grouping of sets of device configuration profiles may contain one or more sets of device configuration profiles.

The required amount of memory to store possible configurations may vary between 0-bits for tool configured remote device system to many megabits for stand-alone field configured remote devices. Memory requirements may also be dictated by which vendor profiles are included in a particular implementation. Exemplary information that may be stored in a vendor profile is provided below in Table 1.

TABLE 1

| Data Type | Data Stored |
|---|---|
| VendorID | Vendor ID information |
| Remote Device Configuration | Available Remote Device Functions |
| | Button Map |
| | Button Behavior Configuration |
| | LED/Feedback Configuration |
| | Button Function Codes |
| | Advanced Remote Device Control Configuration |
| Packet Formatting | Serial Number Configuration |
| | Payload Type ID and format |
| | Rolling Code Hopping Mode |
| | Required Preamble/Postamble |
| | Error Correction Mode |

TABLE 1-continued

| Data Type | Data Stored |
| --- | --- |
| | Encryption Type |
| | Pairing Mode |
| | Padding/Dummy Data Configuration |
| Transmitter | Transmit Channel (RF, IR, etc) |
| Configuration | Modulation Mode |
| | Data Encoder Mode |
| | Transmitter Data Rate |
| | Transmitter Frequency Configuration |
| | Transmitter Power Level |
| | Function Codes |
| Advanced Functions | LF Transponder Configuration |
| | Passive Entry Configuration |
| | Location Based Access |

The processing unit 120 runs custom application code that supports managing I/O, generation of emulated remote device data, changing remote device configuration, interfacing with communication interfaces, and other advanced features. The application code is stored either in the non-volatile memory in the microprocessor 128 or in external memory 112. The application code can be updated at any time to support new remote device configurations, new features and fix problems. Updated application code may or may not affect the current remote device configuration.

The variable frequency RF transmitter 124 provides the processing unit 120 with the ability to send and receive data from entities that are not the user. These other entities can include a target vehicle access system, a remote device configuration tool, another compatible remote device, global positional systems, or other acceptable data sources.

In one embodiment, the variable frequency RF transmitter 124 may be a highly configurable, frequency agile, ISM band transmitter. Using a standard data interface, the processing unit 120 can enable, configure, and pass data through this transmitter such that it matches the original transmission of an OEM or aftermarket vehicle remote device. For more advanced functionality, a receiver 126 may be added to create a full transceiver. The transmitter 124 features a wideband configured loop antenna 140 compatible with the full range of transmit frequencies of the emulated remote devices. The loop antenna 140 may be optionally integrated into the processing unit 120. The antenna circuit may be tested and configured for optimal transmit power. The frequency of the transmission by the RF transmitter 124 may be dynamically adjusted. The RF transmitter 124 is frequency agile. The loop antenna 140 may be dynamically adjusted and the RF transmitter's 124 parameters may be changed to optimize performance via a matching network that optimizes impedance from the RF transmitter 124 to the loop antenna 140. By utilizing the matching network and by optimizing the impedance an optimal transmission signal is obtained. Furthermore, this optimization suppresses the transmission harmonics and filters unwanted transmission frequencies. The transmission frequency range modified in this manner is dynamically adjustable, e.g., it may be set to any frequency in a range from 300 MHz-860 MHz. In contrast to known fixed frequency remote devices, the frequency adjustment feature provides the remote device 100 with the ability to work with, for example, cars in American, European, and Asian markets in addition to serving as a filter for unwanted frequencies. An infra-red receiver 122 may also be added to provide for the processing unit 120 to receive infra-red signals.

The remote entry device 100 also comprises a power unit 130. The power unit 130 comprises a power supply/battery

132 and a power on reset module 134. In another embodiment the remote entry device 100 may be powered by line power instead of by the battery 132. The processing unit 120 will place the remote device in a low-power standby or sleep mode when not executing a remote access or configuration. User input (passive or active) will wake the remote device from its low power mode to execute the desired function. For more advanced functionality, the remote device unit may wake up periodically based on low power timers (without any user input) to execute functions.

The remote device may have a power-on reset system 134 and/or brown/out reset system to maintain data integrity of the remote device even in the case of an inadequate power supply. The processing may alert the user via an output interface that the remote device battery is low or faulty and requires attention.

Generation of a rolling code is performed by the microprocessor 128. In one embodiment, the rolling code is transmitted as a binary data stream. The binary data stream is assembled based on protocol information stored in the remote device configuration memory which may either be integrated into the microprocessor 128 or may be stored in the external memory 112. Each protocol will be made up of different binary components that will vary on content and behavior based on the remote device to be emulated. Components such as preambles, serial numbers, and functions codes will remain mostly fixed for most protocols. Conversely, components such as rolling codes, encrypted codes, and checksums will vary frequently if not with every user input. The processing unit 120 retrieves from memory or generates such components as dictated by the protocol.

One embodiment of a typical binary data stream may be transmitted as a modulated carrier signal as an RF transmission. The modulated carrier signal may be an ISM band (315 MHz, 434 MHZ, etc.) signal that has been modulated via OOK, ASK, FSK, PSK, etc. to carry the binary encoded data. This binary encoded data makes up one or more packet payloads that hold all the information needed by the vehicle to calibrate, authorize and execute a remote access function requested by the user. The packet payload may comprise a preamble, serial number, function, rolling code, and checksum. Vendors use a wide range of packet payload formats so the proposed device must be able to generate the required payload for a specific manufacturer. The vendor profiles are referenced to determine the type of payload that will be transmitted.

With reference again to FIG. 1, rolling codes and encrypted values are generated as need by the processing unit 120. The processing unit may make use of cryptographic modules to accelerate the generation process. These modules provide support for standard cryptographic primitives and protocols or may be custom and proprietary acceleration blocks. Rolling code and encryption operation not performed in dedicated modules will be performed by application code.

The processing unit 120 tracks remote code generation and stores any increments or changes to the rolling code or encryption system with each button press. Rolling code or encryption algorithm behavior is specified in the remote device protocol currently selected.

Proper timing of the binary data stream is achieved using hi-resolution timers that are part of the processing unit 120. Precision timing is maintained by either a crystal or RC oscillator in the microcontroller/ASIC or external.

Typical operation of the remote entry device 100 has the user engage one of the input elements such as mechanical buttons 150 (or the remote device unit is passively activated by an input). The I/O interface 129 will typically comprise inputs, such as mechanical buttons 150, and outputs. Input elements allow the end user to actively or passively affect the functional behavior of the remote device 100 including configuration operations, pairing commands, and remote access. Output elements relay useful information to the end user about the status of the vehicle, remote device configuration, pairing procedures, battery level, and result of remote device access commands.

The input elements of the remote device may have generic markings for certain common remote device access functions or the user may have the options of customizing the inputs to best match the functionality. The input and output elements are linked to the processing unit 120 that can process input requests and respond with output information as well as send and receive information via the remote device's communication interfaces. The processing unit 120 stores information relating to current and possible remote device configuration, remote device status, and vehicle status. Input elements are actively filtered or debounced by the processing unit 120 to provide clean, reliable user input.

If the input from a user is valid based on the current remote device configuration, the processing unit 120 accepts it and processes a functional request. The processing unit 120 may then relay information back to the user, use the communication interfaces to do a data transaction with another entity, or both. Functional requests from user input are classified as either remote access or configuration. Remote access requests are the convenience and management functions the remote device 100 is currently configured to perform. These include both the original functions of the OEM remote device the remote device 100 is currently emulating and any new functions added. Configuration functions are those that cause the processing unit 120 to alter how it responds to remote access requests.

Remote device functionality is not limited to direct emulation of car access function, but may also include security transponders, passive entry, and other vehicle or non-vehicle related functionality. Remote device emulation tasks require the processing unit 120 to execute, e.g., the following set of standardized emulation routines:

1. Retrieve the current remote device configuration and status from non-volatile memory, either the integrated memory in microprocessor 128 or the external memory 110.
2. Configure the RF transmitter 124 for the proper frequency, power level, modulation scheme, and data rate via standard data interface.
3. Generate or retrieve any required fixed, rolling, or encrypted codes using cryptographic modules or subroutines.
4. Assemble a complete binary stream of remote device data to be transmitted and stored in volatile memory.
5. Pass the binary stream through the transmitter with proper timing via a data interface.
6. Based on the remote device configuration, monitor the user input and repeat any required part of transmission as long as input is maintained active or end transmission after a certain interval.
7. Update any rolling code counters for the protocol.
8. Place remote device 100 into sleep mode.

For any remote access operation that requires the remote device 100 to receive data from the target vehicle, the processing unit 120 will configure the receiver, receive data, decode it, and generate the necessary response behavior based on the remote devices protocol.

Figure 2:
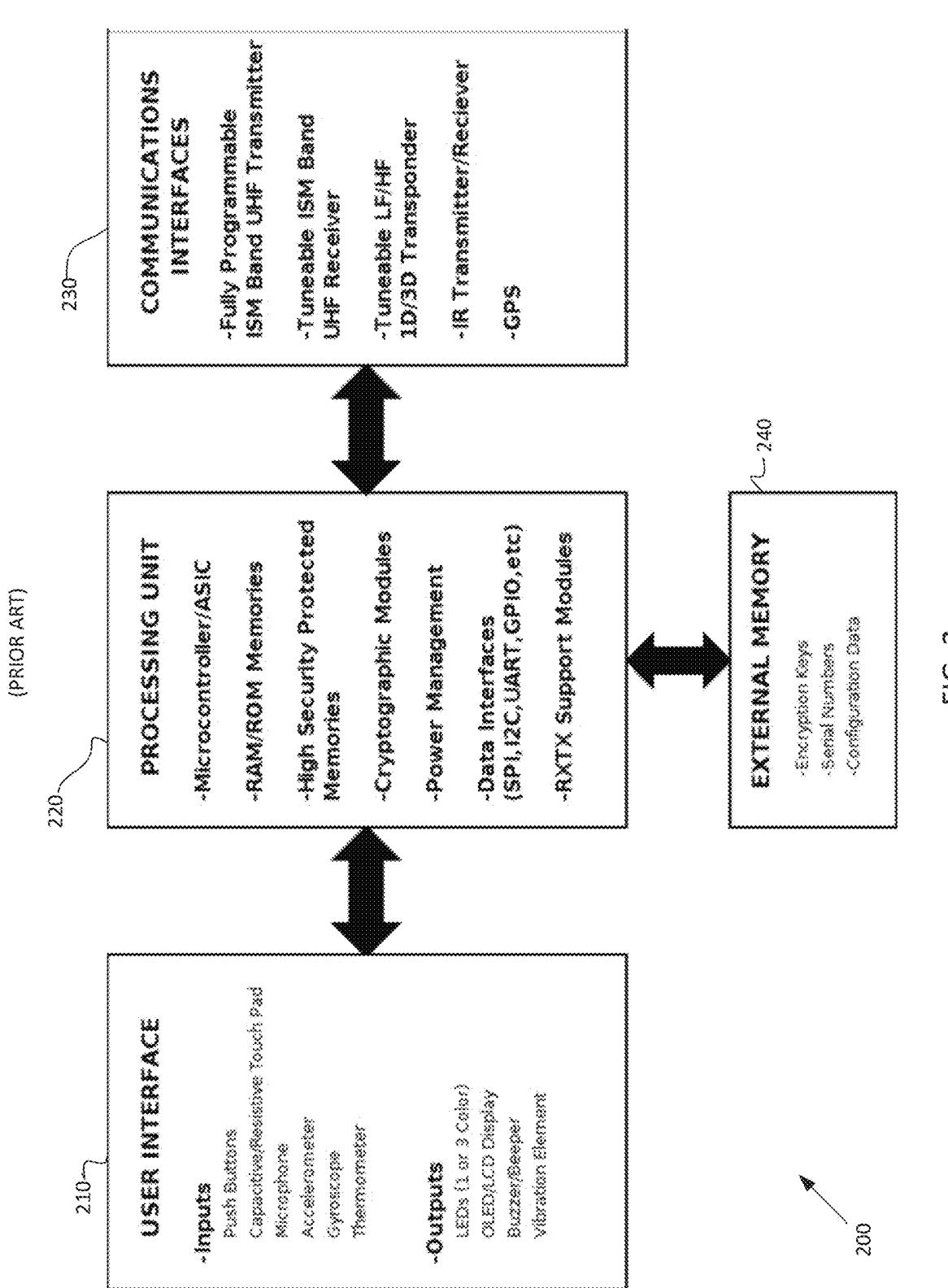
FIG. 2 provides a diagram of the typical functions of a rolling code keyless entry device.

With reference now to FIG. 2, a block diagram 200 of one embodiment of the typical functions of a rolling code keyless entry device is provided. The diagram 200 depicts the various functional elements of a rolling code locking system, specifically the user interface 210, the processing unit 220, the external memory interface 240, and the various communication interfaces 230 that may be implemented. The interfaces that are implemented are application specific and may vary across products. The user interface 210 may comprise both inputs and outputs. The inputs for user interface 210 may include a set of push buttons, capacitive/resistive touch pad, microphone, accelerometer, gyroscope, and thermometer. The outputs for the user interface 210 may include LEDs that may comprise one or more color, an OLED/LCD display, a buzzer or beeper, a polyphonic speaker, and a vibration element. The processing unit 220 may comprise a microcontroller/AISC, RAM/ROM memories, high security protected memories, cryptographic modules, power management modules, data interfaces (e.g., Serial Peripheral Interface (SPI), Inter-integrated Circuit (I2C), Universal Asynchronous Rx/Tx (UART), General Purpose Input/Output (GPIO)), and RXTX support modules. The communications interfaces 230 may comprise a fully programmable ISM band UHF transmitter, a tune-able ISM band UHF receiver, a tune-able LF/HF 1D/3D transponder, an IR transmitter/receiver, and a GPS module. The external memory 240 may comprise RAM/ROM memories, solid state memory banks, magnetic memory banks, and may store encryption keys, serial numbers, and configuration data.

Figure 3:
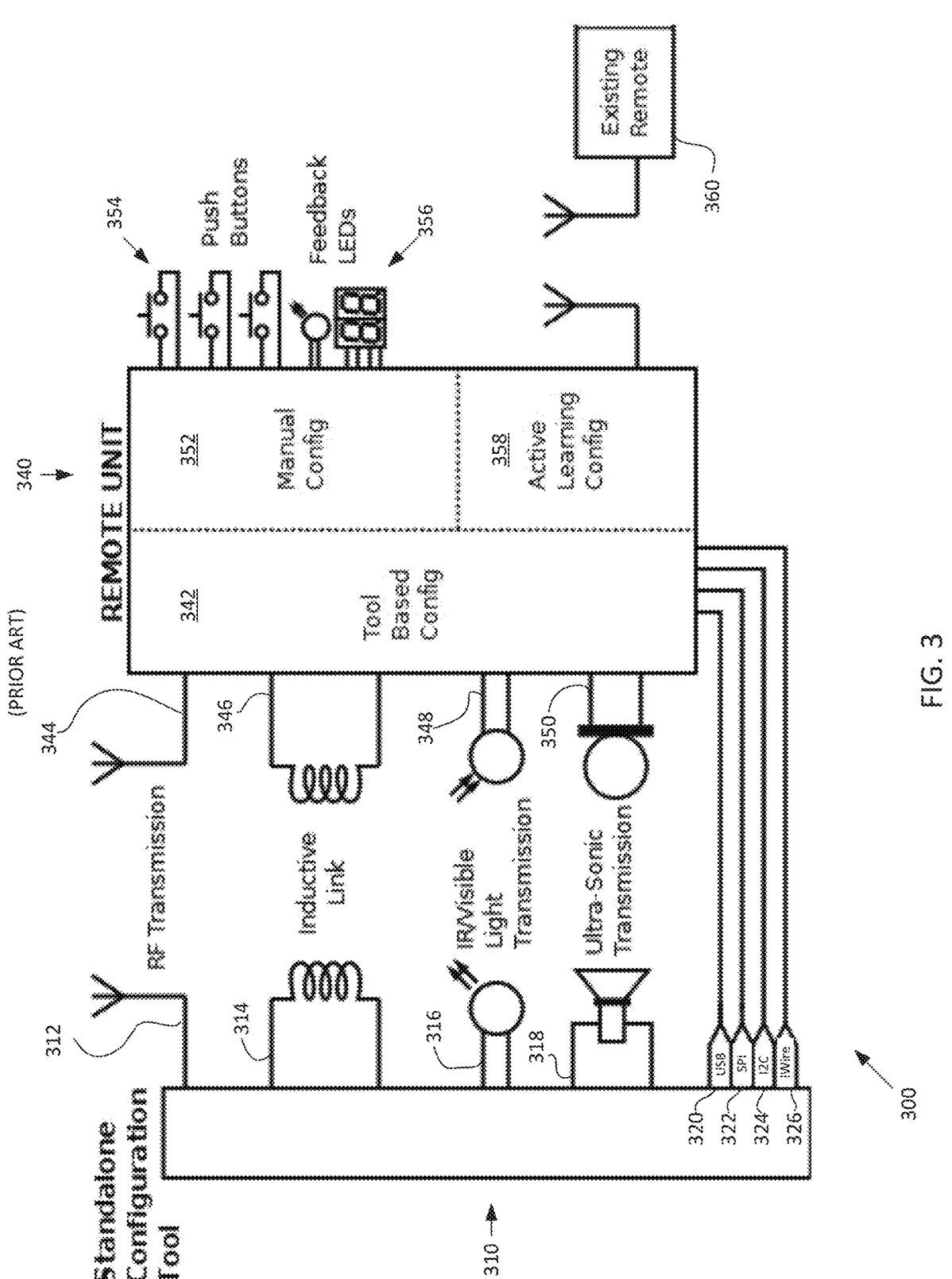
FIG. 3 provides a schematic diagram of an embodiment of an external device that may be used to program, configure, or reconfigure a rolling code keyless entry device.
Figures 6, 7, 8:
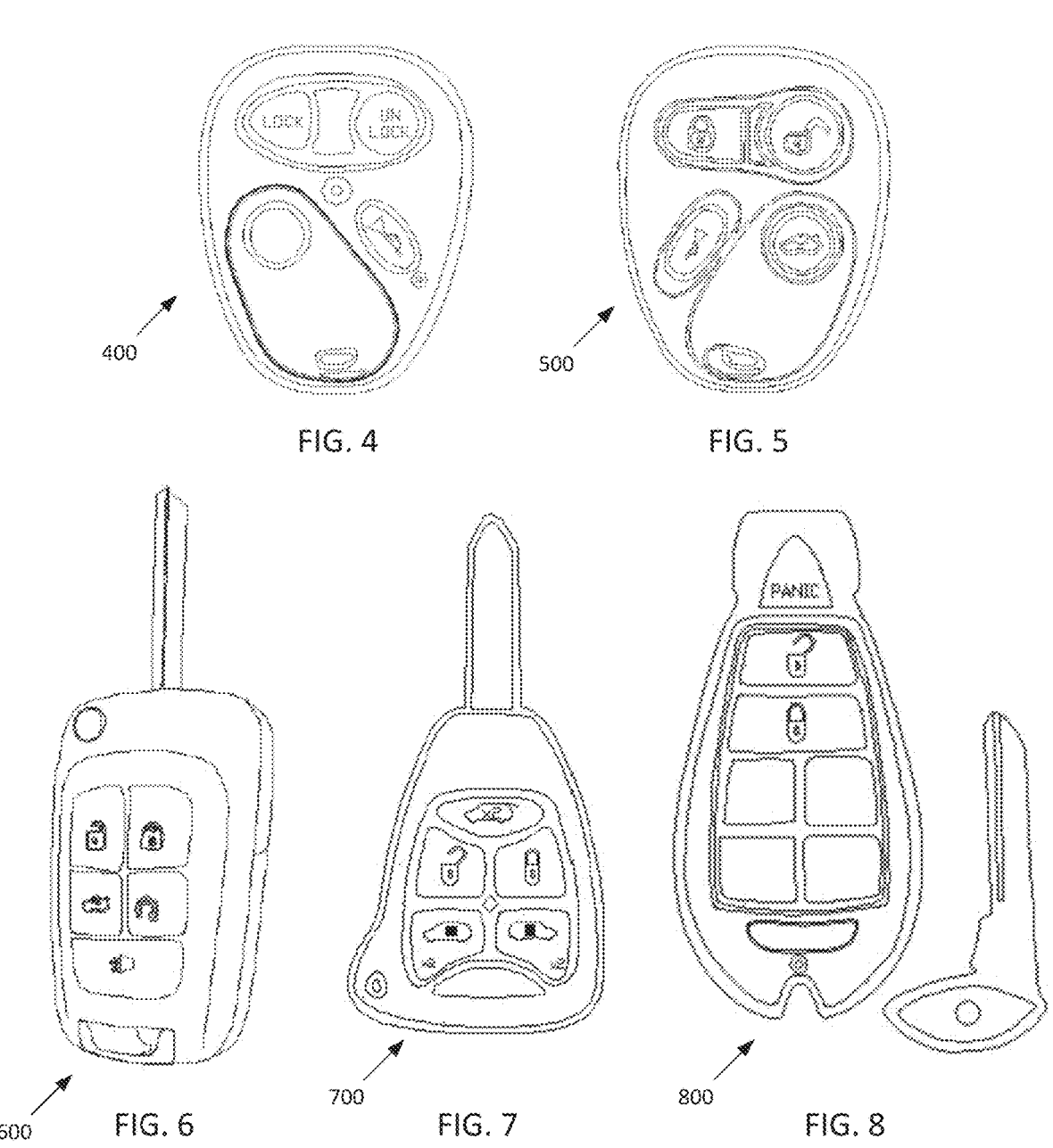

With reference now to FIG. 3, schematic diagram 300 represents one exemplary embodiment of an external configuration tool or device 310 that may be used to program, configure, or reconfigure a rolling code keyless entry device 340. The diagram 300 shows a collection of many of the possible methods of configuring the remote device 340. In a typical implementation only one or at most two methods would be available. The external device 310 would typically comprise at least one of an RF transmitter 312, inductive link 314, IR transmitter/receiver 316, and ultrasonic transmitter 318. The external device 310 may also be operatively connected to the keyless entry device 340 through a USB interface 320, SPI interface 322, I2C interface 324, or IWire interface 326 present on both the external device 310 and keyless entry device 340. FIG. 3 depicts the three main modes for configuring the device 340, the tool-based approach, active learning configuration, and manual configuration.

The configuration interface for the remote device 340 may be either a user interface such as push buttons 354 or may be a configuration tool such as external device 310. Configuration tasks require the processing unit of the remote device 340 to execute, e.g., the following set of standardized setup routines:

1. Check if configuration command was read or write. Reply with current configuration if read, proceed to 2. if write.
2. Receive write password from configuration interface.
3. Check that no write restrictions have been placed on the remote device configuration.
4. Receive configuration data from external device 310 or pull data from possible configuration datapool.
5. Verify configuration integrity and confirm reception of data to configuration interface.
6. Generate any unique serial numbers, seed values, or encryption keys.
7. Store those keys, serial numbers, and serial numbers.
8. Place processing unit and transmitter into sleep mode.

This configuration may be performed in any of the three previously mentioned configuration modes. When using the tools-based approach custom hardware may be used to program the device 340 through the tool-based configuration module 342 using RF transmitter/receiver 344, inductive link 346, IR or visible light transmitter/receiver 348, or ultrasonic transmitter/receiver 350. When the remote device 340 is part of a tool-based configuration scheme, the user or an authorized agent of the user (e.g., a locksmith) can setup the remote device using a stand-alone tool, such as external device 310, of variable complexity. The external device 310 may have a computer interface or be fully standalone. The external device 310 may be battery powered or require an external power source. The external device 310 may have flexible limitations to how it may configure remote devices. The external device 310 may be operatively connected with the remote device 340 over a wide range of interfaces including but not limited to: direct electrical connection using a standard data interface such as USB 320, SPI 322, I2C 324, UART 326, etc. or a custom electrical interface, this interface may encrypt the configuration data; RF transceiver 312 using either frequencies related to the emulated remote devices or unrelated frequencies of convenience; inductively coupled data link 314 similar to RFID, this approach does not require the remote device 340 to have a battery present at configuration as power can be provided via the inductive link 314/346; an ultrasonic emitter and transducer link 318; or an IR/visible LED emitter and photodiode link 316. The external device 310 may allow for a large amount of data to be transferred in the remote device setup process. The external device 310 may change or add to every aspect of the remote device configuration up to and including the firmware of the remote device itself.

In the manual configuration mode, a user or a technician configures the remote device using the mechanical interfaces such as push buttons 354 that are operatively connected to the manual configuration module 352. In manual configuration mode, feedback may be provided to the end user through, for example, the feedback LEDs 356.

When the user interface, e.g., push buttons 354, is also the configuration interface, the remote device will be provided to the user in a neutral state with no configuration information present in memory. The user can then use the available input elements to enable configuration mode, enter the configuration password, and enter the desired vendor profile code. The user output elements such as feedback LEDs 356 will confirm if the configuration process was successful. Manual configuration will not allow the user to specify any remote device protocol details as these are stored in the possible configurations memory. The user may only specify a short vendor/protocol code.

In one embodiment, a special case of the manual configuration process is a remote device implementation that can learn its configuration information from another remote device. This is called active learning mode. In active learning mode, the active learning configuration module 358 is "trained" using data from an existing remote device 360. In active learning mode, the remote device 340 is placed in configuration mode by the user and the remote device monitors for an RF signal. Based on the received signal, the remote device 340 sets all the necessary configuration memory values to match the protocol of the target key. Once the complete RF signal (or signals) are received, the remote device 340 gives the user an indication via feedback LEDs 356 of whether or not it was able to successfully configure itself.

With reference now to FIGS. 4, 5, 6, 7 and 8, plan views of several form factors of OEM keyless entry remote devices are depicted. Keyless entry remote devices are available in a wide range of form factors. The OEM devices 400, 500, 600, 700, and 800 represent some of the devices the present invention may emulate. FIGS. 4, 5, 6, 7 and 8 show some of the more popular types of keyless entry remote device. The OEM device 400 and OEM device 500 represent typical RF remote device access units. OEM device 600, OEM device 700, and OEM device 800 are remote device units with integrated key blades of varying styles. The present invention may be implemented in any of these form factors. The external cases may also be customized for various markets and applications.

Figure 9:
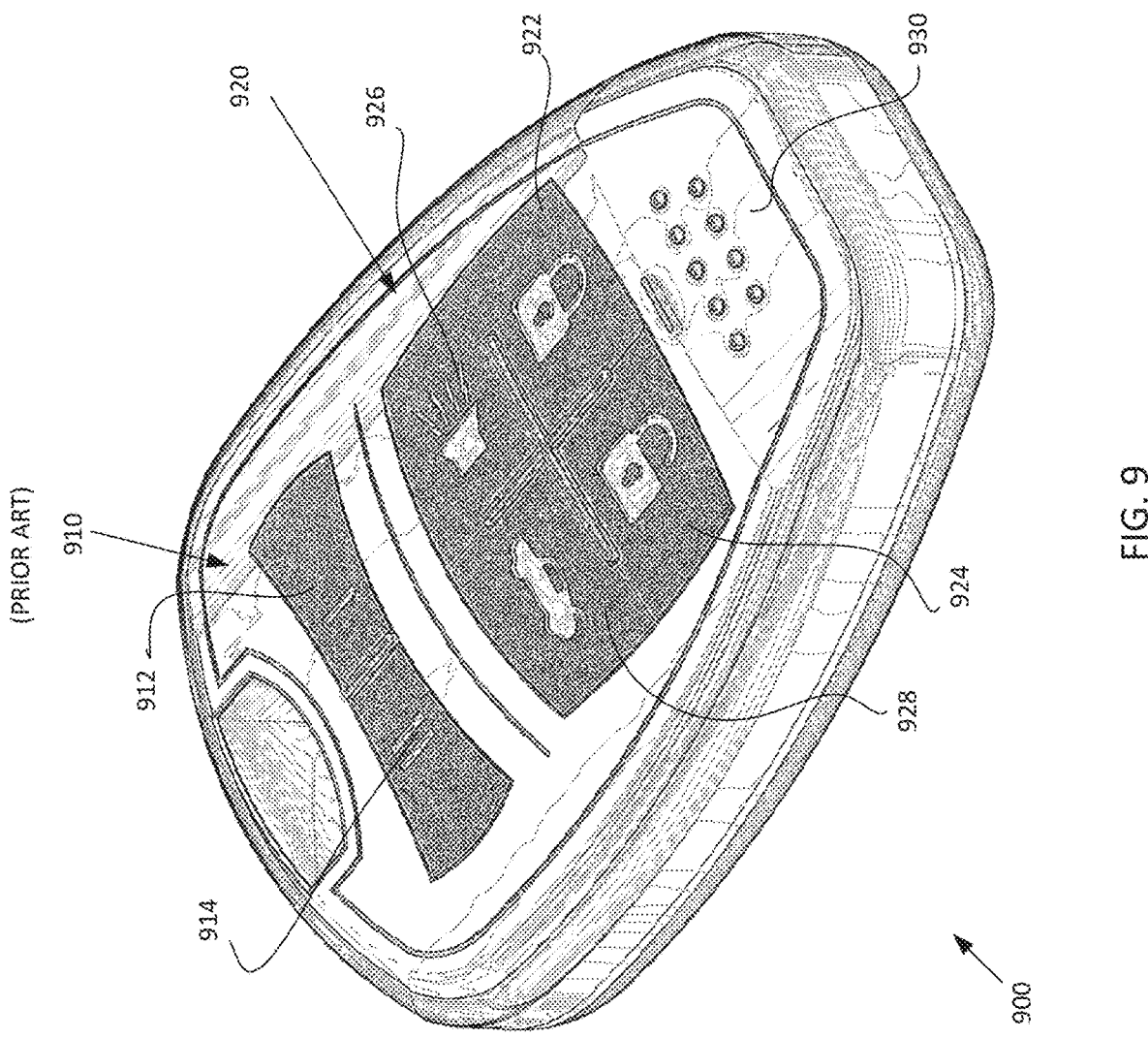
FIG. 9 provides a plan view of an exemplary embodiment of a keyless remote entry device.

With reference now to FIG. 9, a plan view of an exemplary embodiment of a remote device 900 is provided. In this embodiment, the remote device 900 is in the form of a key fob and does not comprise a physical key (although an "emergency" physical key is often included as an alternative means to unlock a vehicle's door), instead it has device configuration profile selection keys 910, function keys 920, and secondary function key 930. The remote key fob device 900 may further comprise an opening to allow for the attachment of a key ring, lanyard, or other retaining means and may include an emergency key. In this embodiment, the internal circuitry of the remote device 900 may comprise a processor, a memory, and a transmitter resulting in a "smart" key. The memory may be loaded with one or more sets of device configuration profiles.

In one embodiment, the remote device 900 may have, for example, two sets of device configuration profiles stored in the memory. To operate the remote device 900, a user may select, for example, the first of two sets of device configuration profiles stored in the memory. This may be performed by pressing the first device configuration profile selection key 912 associated with the first set of device configuration profile. The remote device 900 will automatically be configured to this first set of device configuration profile after the first set of device configuration profile is read from the memory. The function keys 920 may then be selectively operated by a user to perform the function associated with each key according to the first set of device configuration profile. The lock key 922 may be used to lock an end device associated with the first set of device configuration profiles, the unlock key 924 may be used to unlock an end device associated with the first set of device configuration profiles, the alarm key 926 may be used to activate or deactivate the alarm of an end device associated with the first set of device configuration profiles, and the trunk key 928 may be used to open the trunk of an end device associated with the first set of device configuration profiles. While the function keys 920 may be associated with specific functions, they may also be assigned to perform functions different than locking, unlocking, alarm, and trunk according to the configuration of the currently active set of device configuration profiles. A user may press the second device configuration profile selection key 914 to cause the remote device 900 to read the second set of device configuration profiles from the memory and automatically configure the remote device 900 according to the second set of device configuration profiles. The function keys 920 will then operate according to the functions associated with the second set of device configuration profiles.

The remote device 900 may also have a secondary function key 930 that may be configured to perform one of several tasks. The secondary function key 930 may be configured to, for example, operate a garage door, operate an additional function on an end device, or activate another device not associated with the currently active set of device configuration profile. The secondary function key 930 may keep the same function across all sets of device configuration profiles or may be re-configured based on the currently selected or active set of device configuration profile. The remote device 900 may also have additional keys, buttons, or switches on its face and may be used to select from and operate according to a plurality of sets of device configuration profiles. The remote device 900 may also comprise a radio frequency identification ("RFID") or similar RF device to enable the remote device 900 to handshake or connect to an end device without user operation. The device configuration profile keys 910 and function keys 920 may also be replaced by a user to change the look or feel of the physical keys.

While remote-only devices are still sold with new cars, the automotive industry has been moving toward more highly integrated remote and key blade combination devices—so-called Remote Head Keys—and integrated non-blade keys such as "fobik" keys. These remote head keys are often much more advanced than a typical key blade and transponder device and have the ability to store information about the car. Remote head car keys are all-in-one key and remote-control devices. The RHK has a key blade that is cut using a bitting pattern to match with a vehicle ignition component. The RHK's head or base adjacent to the blade typically contains a transponder chip to communicate with the associated vehicle's immobilization system/security system to allow the car to start.

In connection with aftermarket replacement or duplicate RHK products and services, a Universal RHK (URHK) is designed to cover a range of compatible remotes or stock keeping units ("SKUs") representing vehicle makes and models, as possible. The URHK device emulates the three main features of a modern combination remote head key: the cut key blade, the remote keyless entry radio frequency ("RF") transmitter, and the low frequency ("LF") security transponder. The URHK supports a large range of interchangeable key blades that covers a plurality of blade sizes, shapes, and bitting patterns. The main body of the URHK remote has a mechanism to secure a key blade insert for cutting and normal usage. The URHK RF transmitter is frequency agile. The transmitter is configurable between AM and FM, and also supports various encoding schemes (Manchester, Pulse Width, etc.). The URHK security transponder is able to emulate several different types of OEM transponders.

The tight coupling of a typical remote head key to the car means the URHK can be leveraged to create a unique key back-up service, i.e., a Key Bank or "KeyBank". The Key Bank may also be referred to more generally as a key bank. The Key Bank service and URHK device may be provided by iKeyless, Inc. to provide customers or users with a way to back up and replace vehicle keys.

The URHK can serve as a replacement for, or as an addition to, an OEM provided remote head key. The programing operation for the URHK is similar to the user experience of programming universal remote controls for televisions. Beyond the transponder and RKE required communication means, the URHK may also contain additional communication channels to support Near Field Communications ("NFC") and Bluetooth Low Energy transceivers ("BLE"). This allows for non-contact programming of the URHK through a mobile device. This interface can also be used to activate unique smart key functions or additional Key Bank services.

The Key Bank service can be used with OEM remote head keys or URHK devices. A user with a compatible vehicle can enroll their keys in the Key Bank service that will securely store a copy of critical remote configuration information. If the user then loses their key, they can contact the Key Bank service and request a replacement. The replacement key will use the stored remote information to give them an exact copy of their remote that works right out of the package.

Now with reference to FIGS. 10-19 and the USK and MFB inventions illustrated therein. The USK and MFB devices are distinct but share common operational components. The USK and MFB devices may be used separately or together and may are designed to communicate with smart phones or other smart devices to provide enhanced vehicle communications and control systems including for remote keyless entry and remote vehicle start. The USK and MFB devices may be configured to enable multiple smart phones to pair and operate with one or more target vehicles. In addition, a smartphone may be configured to operate multiple USK and MFB devices, therefore enabling access and feature control for multiple vehicles. Furthermore, a smartphone operating a USK or MFB enabled app may receive, issue, and/or revoke "digital keys", or other access authorization tokens, for a limited or permanent duration enabling access to one or more of the vehicle features. The capabilities described herein are particularly useful for car sharing, fleet management, car rental, and/or emergency services (e.g., vehicle owner has locked child inside a car on a hot summer day or lost their key). The optional LTE cellular modem enables the MFB to operate independently from a smartphone in order to receive remote commands and/or other remote communications.

As described in reference to the figures, a first present invention is in the form of a universal smart key (USK) device such as a smart fob or the like that has one or more advanced proximity, location, distance or ranging capabilities and adapted to communicate with a vehicle and a smart phone/device to perform a set of operations, e.g., lock/unlock, trunk unlatch, horn, lights, etc., related to control of one or more target vehicle(s). The USK device replicates and/or enhances the operations of an OEM key. The USK device may include one or more of transponder, PEPS, RKE, Bluetooth, BLE, UWB, NFC and other communications capabilities and interoperate with existing location beacons or sensors or antennas installed or located about a vehicle and used in connection with algorithms executed on one or more associated devices for determining one or more of location, proximity, range, distance of a user possessing the USK relative to one or more vehicle location(s).

Also as described in reference to the provided drawings is a second present invention in the form of a mobile (key) fob bridge (MFB) device capable of communicating with a vehicle security/communications/immobilizer system, e.g., control unit such as a BCM and/or ECU). The MFB device may be directly connected via OBD, or dongle via OBD, or may be wirelessly connected. The MFB includes one or more antenna and integrated NFC or BLE or UWB-based short-range distancing or ranging capabilities and is adapted to communicate with a smart phone/device to enable the smart phone to function as an alternative passive or active remote keyless entry system. The smart phone once paired and recognized by and within range of the MFB device is enabled to perform a set of operations such as door lock/unlock, trunk unlatch, horn, lights, emergency, etc., related to control a target vehicle having the MFB disposed therein and with the smart phone within range of the vehicle/MFB device. The MFB device may communicate with one or more of: an OEM key provided originally with a target vehicle or set of vehicles, a USK device that serves to replace or replicate or supplement an OEM key to operate a target vehicle, and a smart phone or other smart device. The MFB device may include one or more of transponder, PEPS, RKE, Bluetooth, NFC, BLE, UWB and other communications capabilities and interoperate with existing (or added aftermarket) location beacons or sensors or antennas installed or located about a vehicle for determining one or more of location, proximity, range, distance of a user possessing a smart key (e.g., an OEM or USK device) relative to the MFB device and one or more vehicle location(s).

Figure 10:
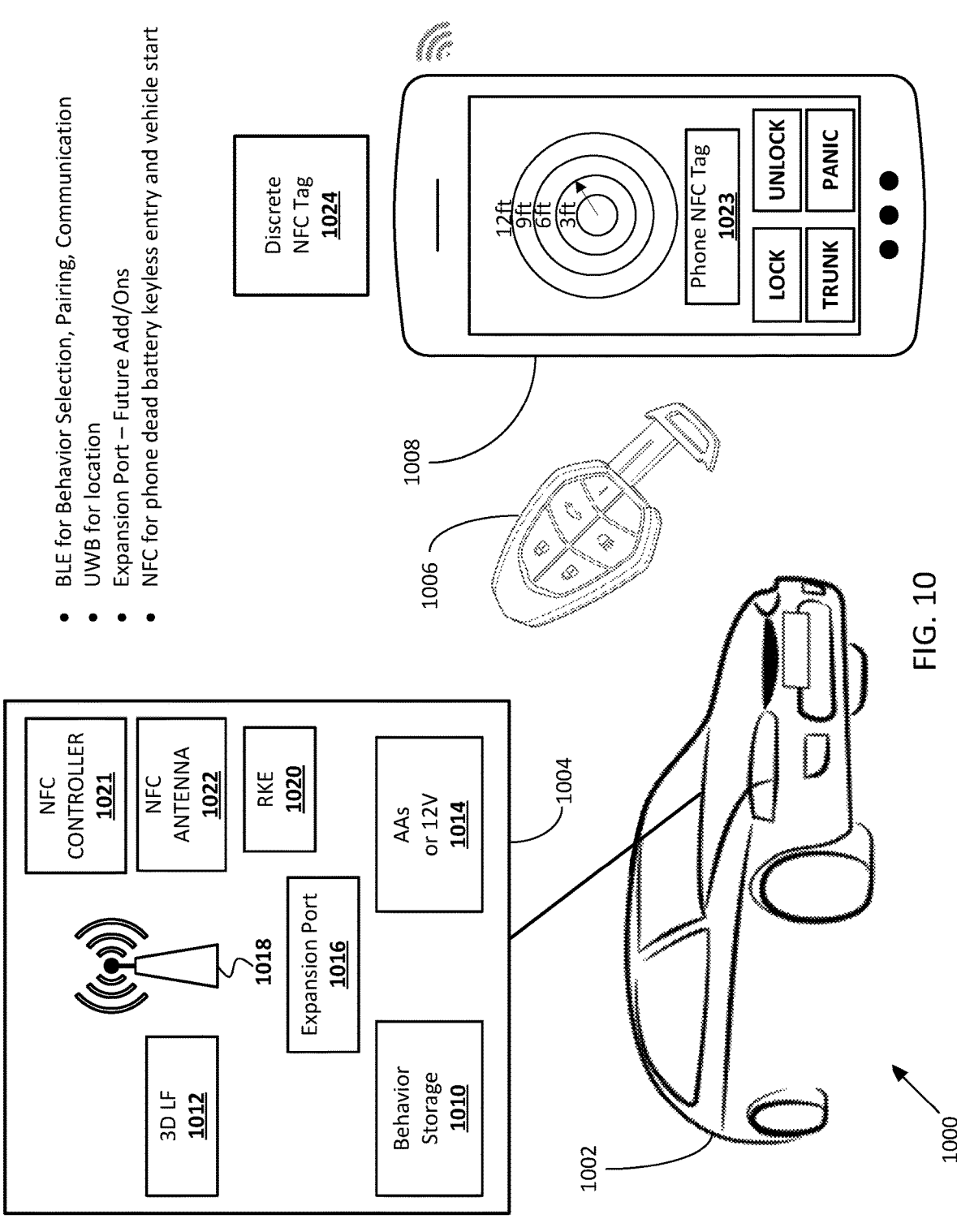
FIG. 10 provides a schematic diagram illustrating an advanced vehicle communications system in accordance with a first embodiment of the present invention.

With reference to FIG. 10, a vehicle keyless entry (KE) communications system 1000 is illustrated in connection with a vehicle 1002, a communications bridge device (Mobile (key) Fob Bridge or MFB) or "Bridge" 1004, a smart key 1006 and a hand-held smart device, such as a smart phone, 1008. The MFB 1004 may be located, installed or placed at a number of suitable locations, e.g., OBD port, OBD port passthrough under dash, glove box, center console, under seat, or attached to the surface of a window. When not attached to the surface of the window, to allow communication with the NFC controller 1021 of the MFB 1004, a wired or wireless NFC antenna 1022 may be attached to the window with the MFB 1004 located remotely in the number of other suitable locations. The MFB 1004 may be calibrated for accuracy in operations once the location is selected. The MFB 1004 is configured to communicate with an immobilizer or security system of vehicle 1002. The MFB 1004 includes a power source 1014, such as batteries (e.g., self-contained, rechargeable, primary, replaceable AA or other type) or a direct source such as from the vehicle 1002 (e.g., 12-volt source from OBD port, fuse block or power outlet such as cigarette lighter). The MFB 1004 may include an expansion port 1016 for future add-on devices. The MFB 1004 also includes a behavior storage component 1010, low frequency component 1012, an antenna component 1018, and a remote keyless entry component 1020. The MFB includes a microcontroller or processor and associated memory for executing and storing instructions associated with establishing communications connections, performing communications and operations tasks and storing behavior and other data. The MFB 1004 also includes an NFC controller 1021 with NFC antenna 1022 to allow access to and starting of the vehicle in the case that the smart phone battery is dead. In this example, the MFB includes BLE and UWB capabilities (and optionally NFC capabilities) for behavior selecting, pairing (e.g., vehicle, smart key, smart phone), communication bridging, locating or proximity sensing or ranging tasks. Through BLE the MFB 1004 may establish a communications connection or session with a hand-held smart device, e.g., smart phone, 1008 via an application or "app" downloaded and running thereon. The smart key 1006 may be an OEM key originally provided with the vehicle 1002 or an aftermarket Universal Smart Key ("USK"). The smart key or USK is capable of being paired to the immobilizer system of vehicle 1002 alongside the MFB 1004. The smart phone's embedded NFC tag 1023 and/or a discrete NFC tag 1024 provided to, for example, carry in their wallet, may be paired to the MFB 1004. As shown on the exemplary smart phone 1008, the associated mobile application or "app" includes a virtual or digital RKE function with a set of virtual buttons (lock, unlock, trunk (unlatch or "pop"), and alarm/panic) for causing the vehicle 1002 via the MFB 1004 device to perform one or more operations, e.g., lock or unlock vehicle doors, sound an alarm, open trunk, etc. In this example a ranging feature is shown on the smart phone indicating a range or distance and azimuth of the user and phone to a sensed device, e.g., MFB 1004 with antenna 1018. In addition, in this example, the smart phone's embedded NFC tag 1023 or the discrete NFC tag 1024 can be "swiped" past the NFC antenna 1022 of the MFB 1004, causing the vehicle 1002 via the MFB 1004 device to perform one or more operations, e.g., lock or unlock vehicle doors, allow for the vehicle to be started within 30 seconds, etc.

Figure 11:
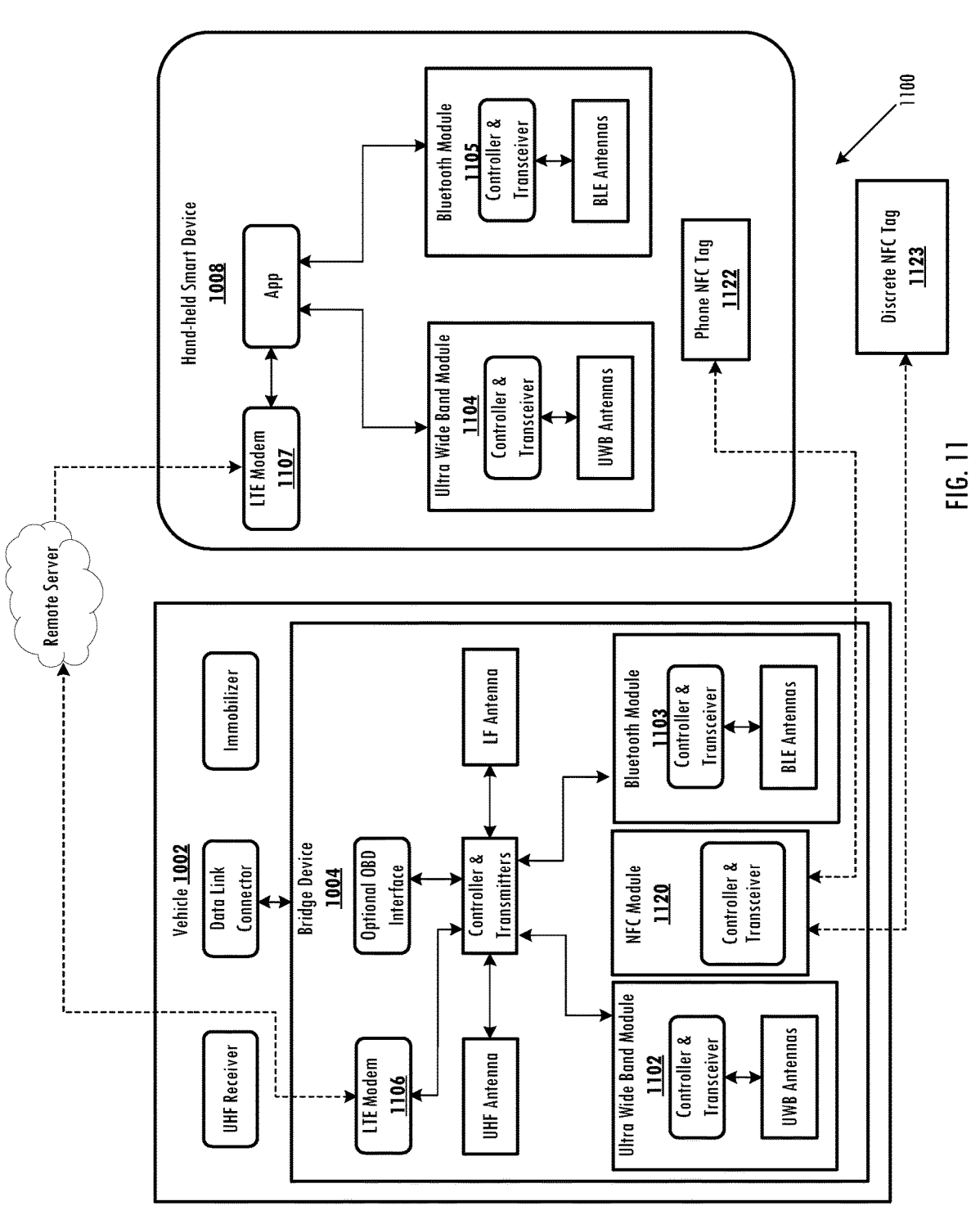
FIG. 11 provides a schematic block diagram illustrating an advanced vehicle communications system in accordance with the present invention.

FIG. 11 illustrates a functional block diagram of a KE system 1100 for performing operations associated with a target vehicle 1002. A MFB bridge device 1004 is located within a vehicle 1002 and communicates with vehicle systems by one or more of several ways. For example, the MFB 1004 may generate a signal, e.g., an UHF RF signal that is received via a UHF receiver of the vehicle. MFB 1004 may also communicate with vehicle systems via a data link connector and the security/immobilizer system, e.g., ECM or BCM. The MFB as may connected in hard wired fashion via an OBD pin interface or an intermediate dongle connected to the OBD or by RF signals. The MFB device includes UHF and LF antennas and controllers and transmitters capable of generating signals and packetized data from transmission to the vehicle systems. In this embodiment, the MFB 1004 includes a UWB module 1102 having its own controllers and transceiver and UWB antenna(s) for short-range location, proximity and ranging purposes. The MFB 1004 further includes a BLE module 1103 having its own controllers and transceiver and BLE antenna(s) for communication with the smart phone. The MFB 1004 further includes an NFC module 1120 having its own controllers and transceiver for communication with the either a smart phone's embedded NFC tag 1122 or with a discrete NFC tag 1123 carried by the user and typically stored in, for example, their wallet.

The MFB 1004 communicates with a smart device, such as smart phone 1008, having a complementary UWB module 1104 with controller and transceiver and UWB antenna and complementary BLE module 1105 with controller and transceiver and BLE antenna and a complementary NFC tag 1122. The MFB 1004 may also communicate with a discrete NFC tag 1123 carried by the user and typically stored in, for example, their wallet.

The MFB/Smart Phone-based solution of FIG. 11 may be further modified to provide cellular communications-enabled and enhanced CV capabilities. In this manner the system 1100 provides an enhanced system to adapt older vehicles with cellular as well as NFC/BLE/UWB-enabled components for enhanced features and performance associated with newer vehicles. The system 1100 optionally provides a cellular-enabled MFB device 1004 having an LTE modem 1106 in communication with an LTE modem 1107 of a remotely located smart device 1008 via a remote server as shown. In this manner the cellular-based features serve as a long distance communication component that enables deployment of Enhanced CV Applications and Services ("ECVAS"). This includes interrogation or communication with a smart phone or web-based application capable of detecting spatial and/or directional data, distance functionality, performing remote access features (e.g., locking/unlocking doors or starting the engine on a vehicle), updating device configuration, retrieval of locally stored information (e.g., telemetry data) and application of software updates. In this manner, an application running on the cellular-enabled smart phone, over a smart device, or on a remote server for processing the obtained or captured spatial, location or telemetry information and performing one or more operations and for use in connection with a user interface associated with the application. In this manner the application running on a smart phone, smart device, or remote server may update the configuration of or software on the vehicle-installed RF device—MFB 1004 or other components. In this manner the application adapted to run on a smart phone, smart device, or remote server is capable of performing long distance remote-access operations to the vehicle such as locking/unlocking the vehicle door(s), popping the trunk, or starting the vehicle.

Figure 12A:
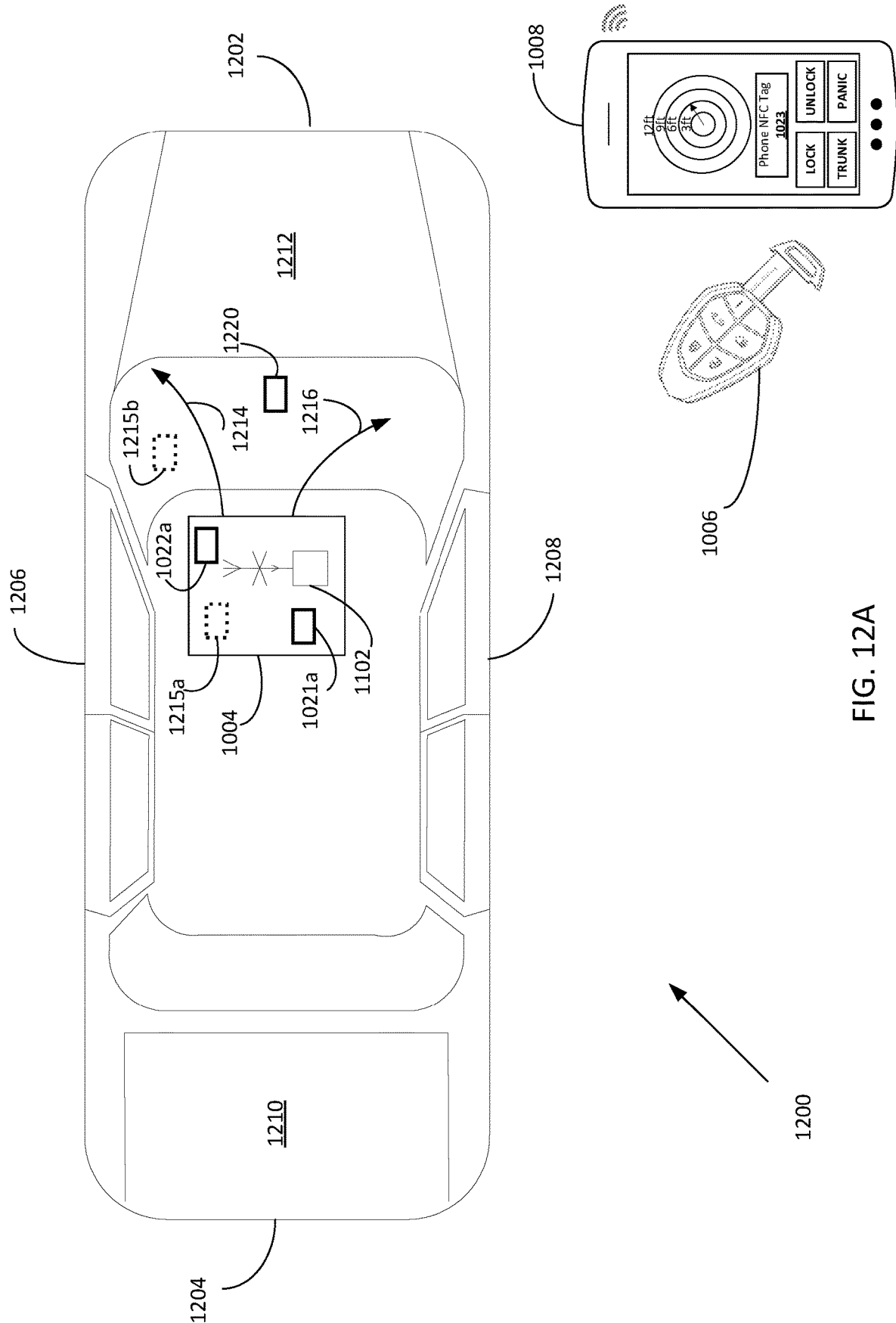
FIG. 12A provides a schematic diagram illustrating an advanced vehicle communications system in accordance with the present invention.

FIG. 12A provides a schematic diagram illustrating an advanced vehicle communications system 1200 associated with a vehicle. Here the vehicle includes a front 1202, back or rear 1204, driver side 1206, passenger side 1208, trunk 1210, and hood 1212. As shown an MFB device 1004 having an antenna or antenna array 1102, such as for receiving and transmitting LF, UHF, BLE, NFC, and UWB communications signals, may be located in the vehicle at one of two locations—attached to a window of the vehicle 1215*b* or not attached to the window of the vehicle, close by OBD port of the vehicle at location 1214 or in a pairing pocket or glovebox location 1216. Here a user/driver has both a smart key or USK device 1006 and a smart phone or smart device 1008 having an app or application running thereon adapted to communicate with the MFB 1004 and to perform operations, such as remote keyless entry via the application. Virtual buttons or user interface elements are presented to the user on the smart phone for commanding certain functions once the smart phone is within a predetermined distance or range of the vehicle or within a predetermined zone (e.g., at the driver side door 1206). As discussed further below, the Bridge may include an accelerometer 1215, which may be integral with the Bridge shown as 1215*a*, or may be separate from the Bridge as shown at 1215*b* such as on the windshield. Likewise the Bridge may be located at a place where a "knock" function may be employed. Also, as discussed previously above, the Bridge may include NFC controller 1021 and NFC antenna 1022, which may be integral with the Bridge shown as 1021*a* and 1022*a* or may be partially or fully remotely located from the Bridge shown as 1220, or may be located alongside or integrated with the accelerometer 1215*a*.

Figure 12B:
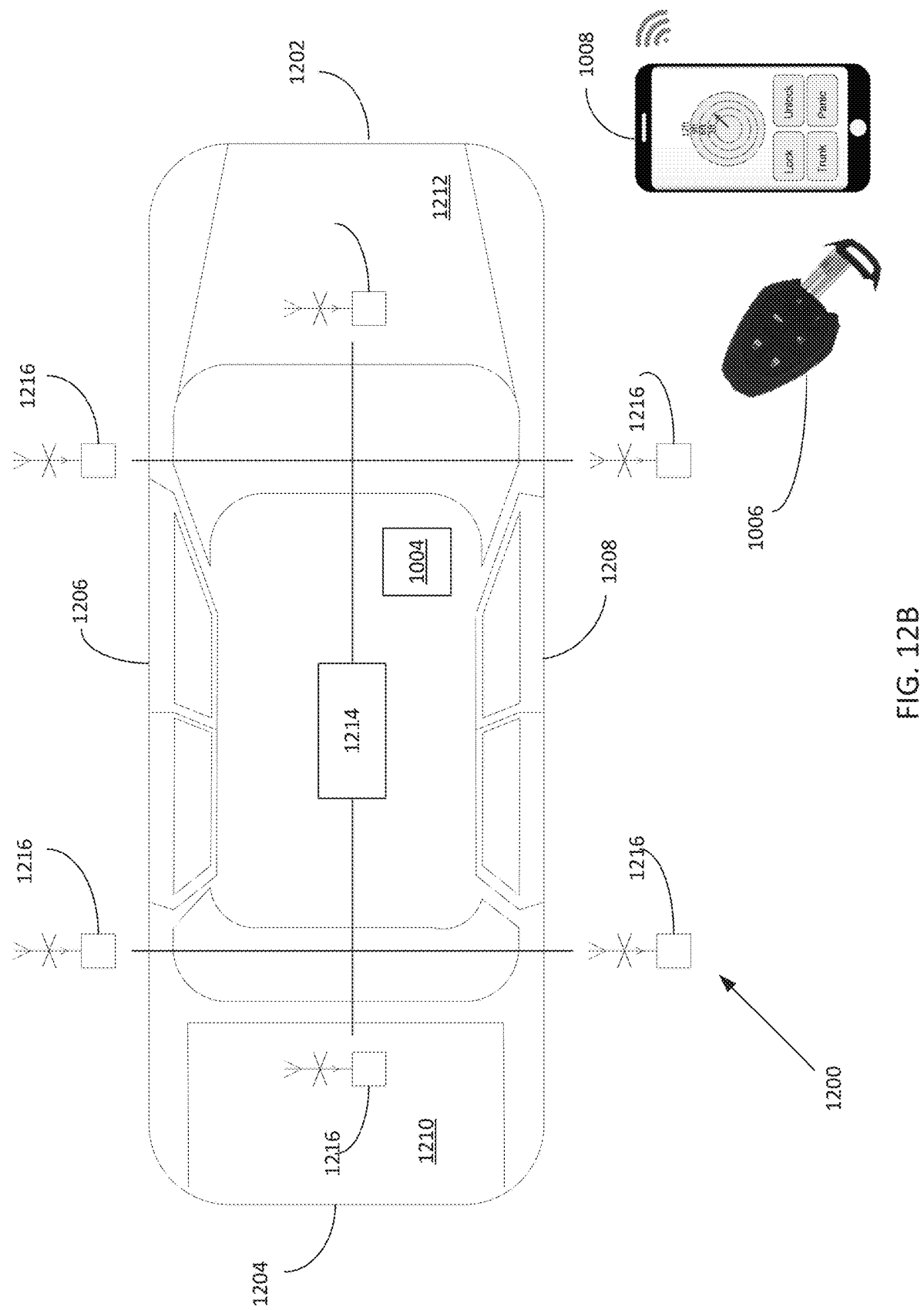
FIG. 12B provides a schematic diagram illustrating an alternative advanced vehicle communications system in accordance with the present invention.

FIG. 12B provides a schematic diagram illustrating an alternative advanced vehicle communications system 1200 associated with a vehicle. As described above, an MFB device 1004 is located within the vehicle and communicates with the vehicle security and other systems. Here the vehicle includes an OEM PKE, UWB or BLE based location/ranging system having a primary module 1214 and a series or array of antennas or beacons located at points about the vehicle, e.g., one or more sides of the vehicle, front and/or rear of the vehicle. The MFB 1004 may communicate with the primary module 1214 directly or via the vehicle security and immobilizer system. The MFB may communicate with a USK 1006 and/or smart phone 1008 to enable RKE and other vehicle operations. The smart phone location may be determined by the MFB or via the OEM location/ranging system. The interoperability of the MFB with the OEM location/ranging system may involve mapping and a process comparable to the pairing and calibrating processes described below.

Figure 13:
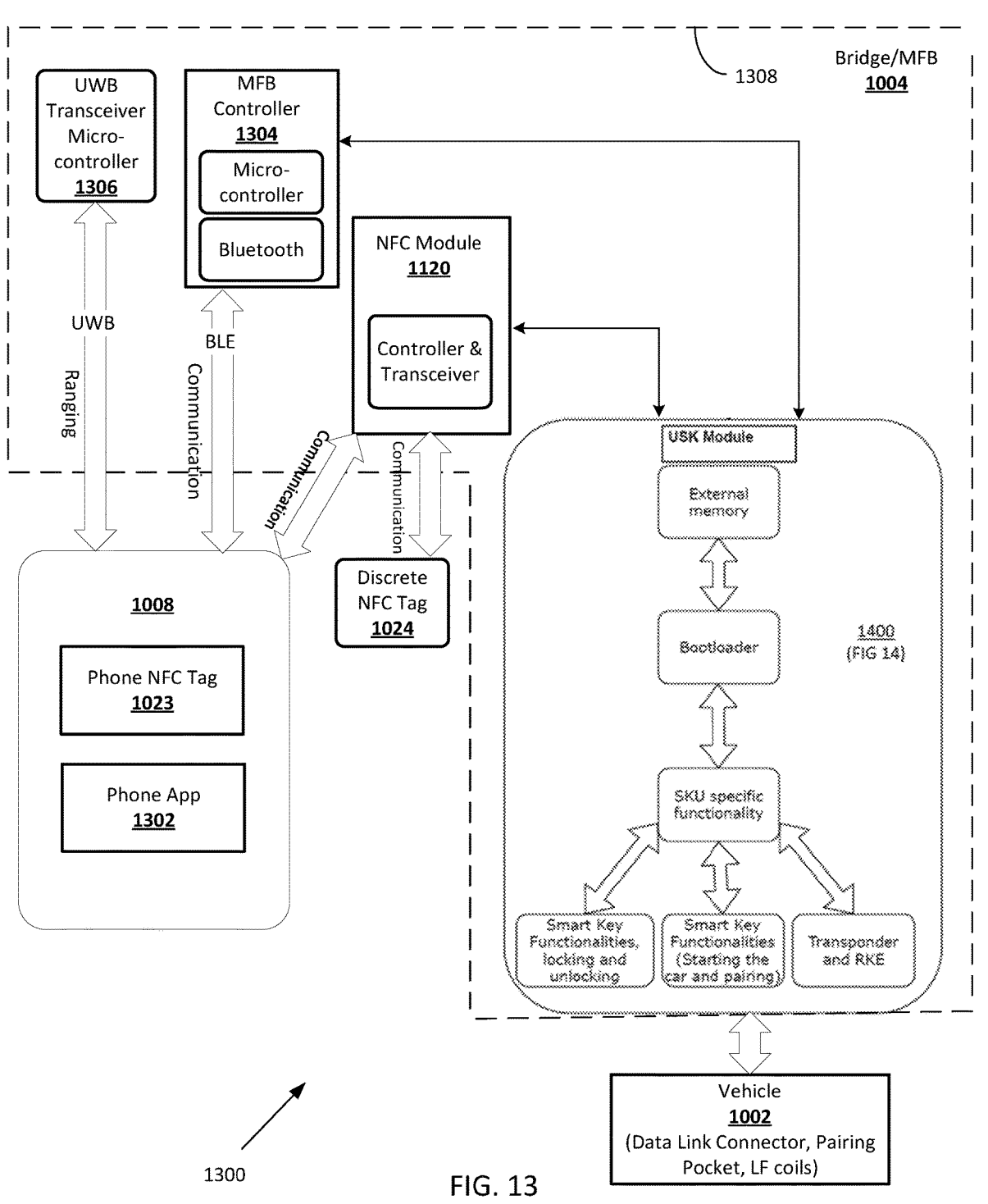
FIG. 13 provides a system software block diagram illustrating an interconnected set of modules and communications flow and Universal Smart Key module (FIG. 14) in accordance with the present invention.

FIG. 13 provides an exemplary system software block diagram of an USK/MFB device (shown as MFB 1004) used in conjunction with a smart phone 1008 as an RKE system 1300 to operate a vehicle 1002. The MFB 1004 is comprised of an interconnected set of modules and communications flow including a main controller 1304, a Universal Smart Key module 1400 (FIG. 14), and an NFC module 1120. Here an RKE app 1302 is configured to be stored on a memory and executed by a processor included in a smart phone 1008 (or similar smart device). The RKE Phone app 1302 utilizes and calls on functional layers of an operating system (e.g., iOS or Android) operating on the smart phone 1008 and is configured to call upon UWB, BLE and other communications features included on the smart phone 1008. In this manner the smart phone provides location, proximity and ranging capabilities associated with use of BLE protocol and UWB ranging protocol data and communications and processes based on communications and ranging interactions with BLE feature and microcontroller included on MFB controller 1304 and UWB transceiver micro-controller 1306 included on MFB-Mobile Fob Bridge device 1004. The UWB transceiver and Bluetooth (BLE) features communicate with USK module 1400 (see FIG. 1400) via MFB Controller 1304, e.g., via SPI functionality. The NFC control module 1120 communicates with either the smartphone's embedded NFC tag 1023 or with the discrete NFC tag 1024, which are considered "trusted" tags. The functional modules and features shown within the hatched line 1308 are included and part of MFB 1004.

Figure 14:
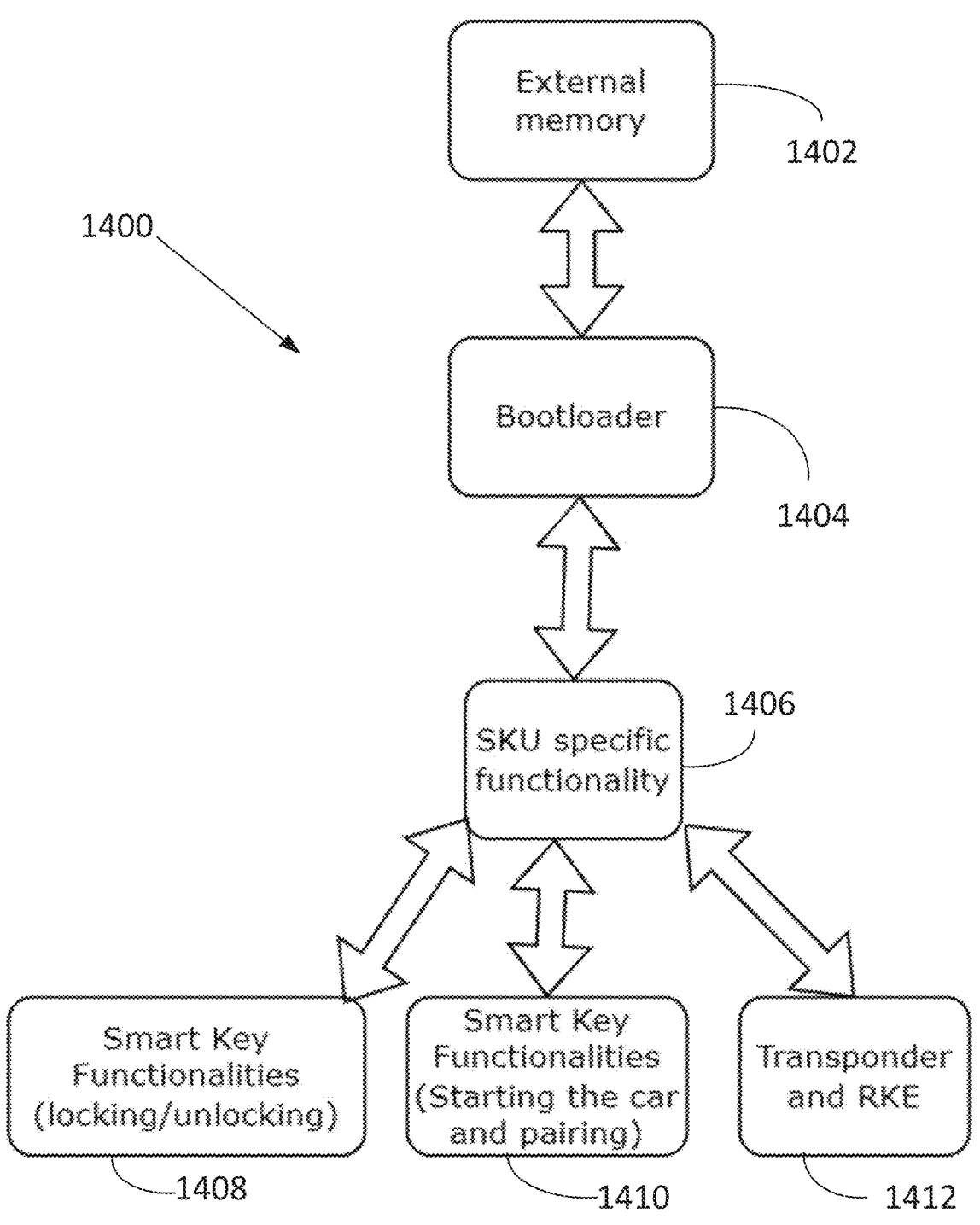
FIG. 14 provides a schematic diagram illustrating a universal smart key (USK) module configuration for use in the USK and/or MFB components of the advanced vehicle communications system in accordance with the present invention.

FIG. 14 provides a schematic diagram illustrating a universal smart key (USK) module associated with the MFB and USK devices described herein. The USK module 1400 is configured for use in the USK and/or MFB components of the advanced RKE/vehicle communications system. The USK module includes blocks representing an external memory 1402, bootloader 1404 (or, optionally an internal memory without a bootloader), SKU specific functionality data 1406, which is made up functionally of smart key functionalities (locking/unlocking) 1408, smart key functionalities (engine start and pairing) 1410, and transponder and RKE 1412. The Bootloader 1404, if needed, described in more detail below, is configured to load behavior data associated with a vehicle and type selected or identified into local memory for local execution. The USK module may communicate wired or wirelessly with a vehicle 1002 during a pairing stage and operational stage post-pairing. The USK module may be removable from the MFB Device 1004 and configured to be received within a pairing pocket or niche or other accommodation provided within vehicle 1002 to allow for low frequency pairing using LF coils.

The MFB Device may alternatively include a tether or dongle or other communications connector to facilitate communications with the vehicle at various stages, e.g., during pairing. The MFB Device is intended to be securely placed at a determined location within the vehicle, e.g., in the glove box, armrest or console compartment, or close by the OBD port/under dash. The USK module functions much the same whether in USK mode (as a universal smart key) or MFB mode (as a bridge between smart device (phone) and vehicle). However, in MFB mode, the Phone app 1302 sends commands to USK module 1400 to send set RSSI values to the vehicle when the phone is located at critical locations of the vehicle to perform certain operation. For example, with the phone near the driver door handle to enable Passive Entry or proximate to the driver seat to allow Passive Start (PEPS, PASE).

Figure 15:
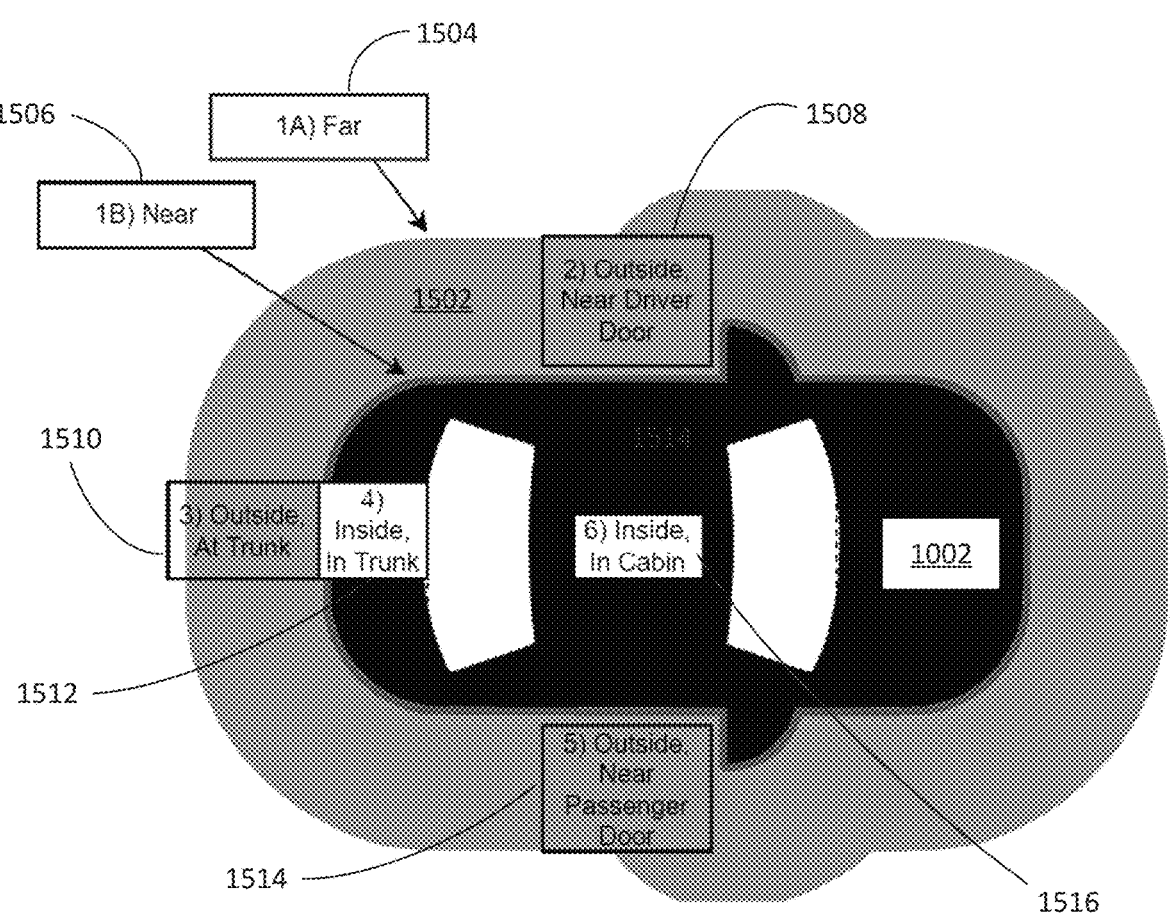
FIG. 15 provides a schematic diagram illustrating an exemplary Vehicle Zone mapping diagram comprising a set of key locations of interest in and around the vehicle to which a MFB device may be calibrated or mapped in connection with a smart phone in accordance with the present invention.

FIG. 15 provides a provides an exemplary Vehicle Zone mapping diagram that shows a set of key locations of interest in and around the vehicle 1002 to which a MFB device may be calibrated or mapped in connection with a smart phone. Virtual map may be established by prompting a user to move to identified locations in and around the car. Once at the prompted location a user may be directed to wave the smart phone up/down, side-to-side, and/or in figure eights to enable the UWB and BLE processes to populate a data table with data points related to RSSI values for use in performing vehicle operations such as locking/unlocking and remote start. In this example, the vehicle zone map 1500 comprises multiple zones of interest. Here, a user may be prompted to move about the periphery of the vehicle 1002 to establish a "near" or close-by zone 1506—essentially shown as an outline of the vehicle. A "far" or outer periphery 1504 is established by prompting the user to move about the vehicle 1002 a certain distance away from it—e.g., about six feet from the vehicle. Having the user move about the far or outer perimeter of the vehicle establishes the outer zone. The outer area or zone 1502 is mapped as the area defined by the inner or near zone or periphery 1506 and the outer zone or periphery 1504. The far zone may be referred to as Zone 1A and the near zone may be referred to as Zone 1B, with the area defined between Zones 1A and 1B as Zone 1. A Zone 2 may be defined as the location generally at the immediate exterior or outside of the driver door indicated as Zone 2 1508. A Zone 3 may be defined as the location generally at the immediate exterior or outside of the trunk indicated as Zone 3 1510. A Zone 4 may be defined as the location generally at the interior of the trunk indicated as Zone 4 1512. The difference between the exterior and interior of the trunk may be that if the key, in the case of the USK device, or the phone are detected as being within the trunk then the vehicle may be programmed to prevent locking or closing of the trunk. With the USK or phone outside of the trunk then it may be opened for access to the trunk. A Zone 5 may be defined as the location generally at the immediate exterior of the passenger door indicated as Zone 5 1515. A Zone 6 may be defined as a space or area within the cabin of the vehicle and is shown at reference 1516. With the USK or phone detected or transmitting a signal indicating a location within the cabin then the vehicle may be allowed to start without insertion of a physical key—e.g., the vehicle immobilizer is defeated, and a start function enabled. The Vehicle Zone Map of FIG. 15 may be referred to in connection with the description of the pairing/calibrating/locking implementation of FIGS. 16-19 and FIGS. 21-26 and in particular the MFB Vehicle RSSI Lookup/Zone Calibration Table of FIG. 23.

As described above, BLE provides a PXP or proximity profile that serves as a proximity monitor to detect whether a proximity reporter is within a close range using the RSSI feature. RSSI (Received Signal Strength Indicator) represents a measurement of the power of a received radio signal. Device proximity, although not precise distance, may be determined using a radio receiver's RSSI value.

FIGS. 16-19 provide, respectively, examples of a vehicle Pairing process (FIG. 16), a Calibration process (FIG. 17), a vehicle door Unlock process (FIG. 18), and a vehicle door Lock process (FIG. 19). The processes may be used in connection with either the USK universal smart key/fob device of the first invention or the MFB mobile fob bridge of the second invention. While the examples may be described in terms of one or the other of the USK and MFB devices the processes relate equally to both and indeed both may be operated in combined fashion for a system solution.

Figure 16:
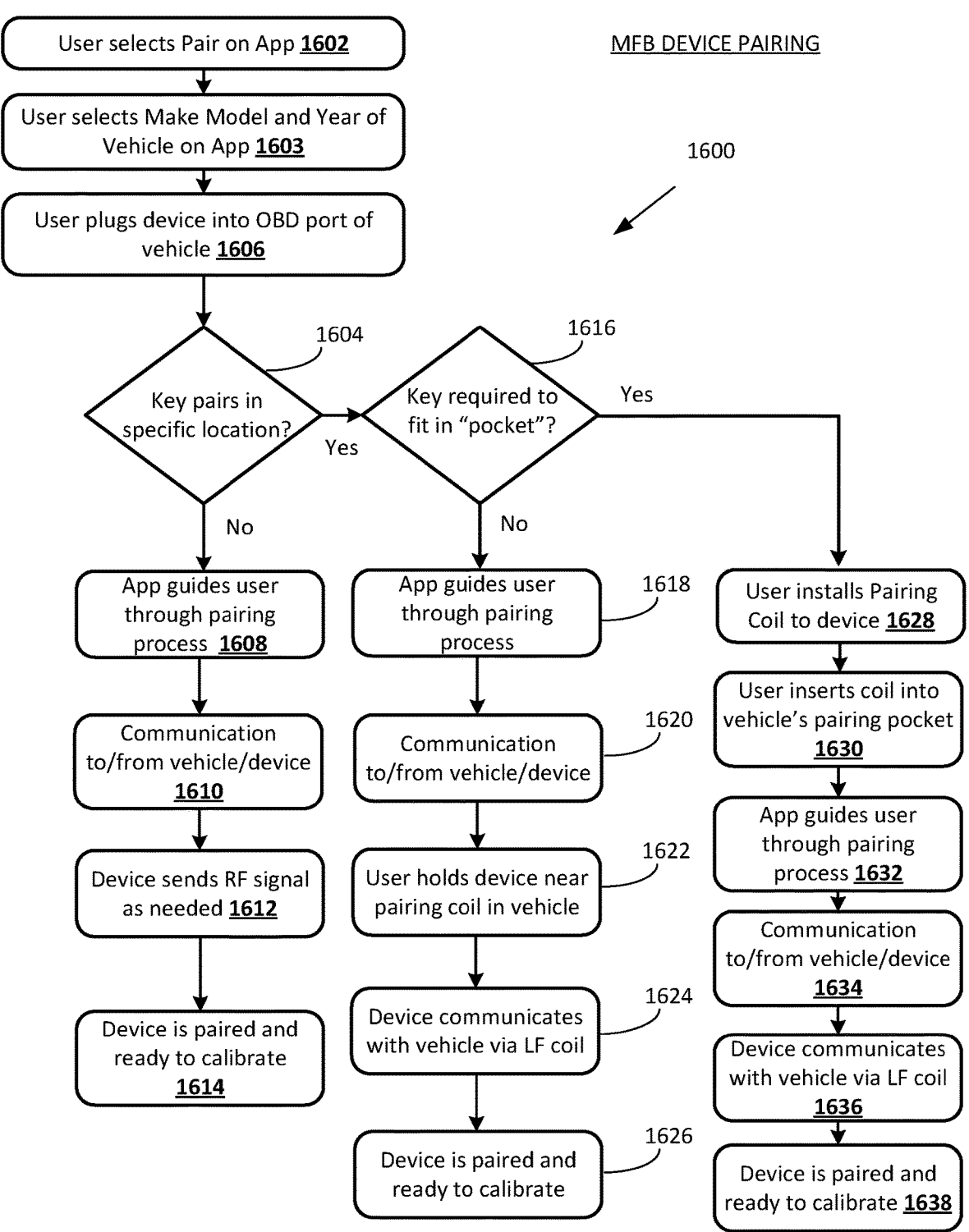

FIG. 16 provides a flowchart illustrating an exemplary app-based USK/MFB Device Pairing Process in accordance with one embodiment of the present invention. In general, the device pairing implements a process very similar to that used when pairing a new OEM key with a vehicle. For example, an app-based approach to the pairing process generally entails: 1) Select Pair new device on app; 2) Select make model and year (MMY) of vehicle (alternatively may validate with the VIN (vehicle identification number)); 3) Plug in the pairing tool; 4) Follow prompts on app to communicate with vehicle over OBD interface, send commands, respond to security access challenges, etc.; 5) Through App, phone will communicate with device if necessary over BLE to command to device to send RF packets as required by vehicle to complete pairing process OR device will be held up to specific location within vehicle to facilitate wireless communication with immobilizer system OR user may plug adapter cable into device to fit immobilizer reader coil (adapter) into a particular location in the vehicle, for example in or within a close proximity to a pairing or programming pocket or slot.

With reference to FIG. 16, an exemplary pairing process 1600 for pairing the MFB device 1004 with a vehicle, e.g., vehicle 1002 is shown. The pairing process commences at step 1602 with a user selecting a "pair" button or feature running on an application executed, for example, on a smartphone. Next, at step 1603, the user selects a make, model, and year (MMY) of a target vehicle previously identified or otherwise associated with the application running on the smart phone. In place of MMY fields a vehicle VIN may be entered, and the app may use a look-up table or the like to identify the target vehicle for pairing. At step 1606, the user is instructed to plug the pairing tool into the vehicle's OBD port. At step 1604, the application running on the smart phone or otherwise connected via the smartphone determines whether the smart key must be paired in a specific location or not.

If the answer to the decision block of step 1604 is "no" the process proceeds to t step 1608, where the process guides the user through a pairing process. At step 1610, the process establishes one or more communication between the target vehicle and the MFB device. At step 1612, the MFB device generates and transmits or sends an RF signal to communicate with the vehicle as needed. At step 1614 the MFB device is paired with the vehicle and ready to be calibrated via a calibration process—see FIG. 17.

If the answer to the decision block of step 1604 is "yes" the process proceeds to step 1616 where the application determines whether the smart key to be paired is required to fit in a vehicle "pairing pocket."

If the answer to the decision block of step 1616 is "no" the key is not required to fit into a pocket and the process proceeds to step 1618 and the process guides the user through a pairing process. At step 1620, the process establishes one or more communication between the target vehicle and the MFB device. At step 1622, the user is directed to hold the MFB device near a LF pairing coil in the vehicle. At step 1624 the MFB device communicates with the vehicle via the low frequency (LF) coil. At step 1626, the MFB device is paired with the vehicle and ready to be calibrated via a calibration process—see FIG. 17.

If the answer to the decision block of step 1616 is "yes" the key is required to fit into a pocket and the process proceeds to step 1628, which prompts the user to install a tethered LF pairing coil to the MFB device. At step 1630, the user inserts the tethered coil into a vehicle's pairing pocket. add step 1632, the application guides the user through a pairing process. At step 1634 the Process requires a communication between the vehicle and MFB device. At step 1636, the MFB device communicates with the vehicle via the low frequency (LF) coil. At step 1638, the MFB device is paired with the vehicle and ready to be calibrated via a calibration process—see FIG. 17.

Figure 17:
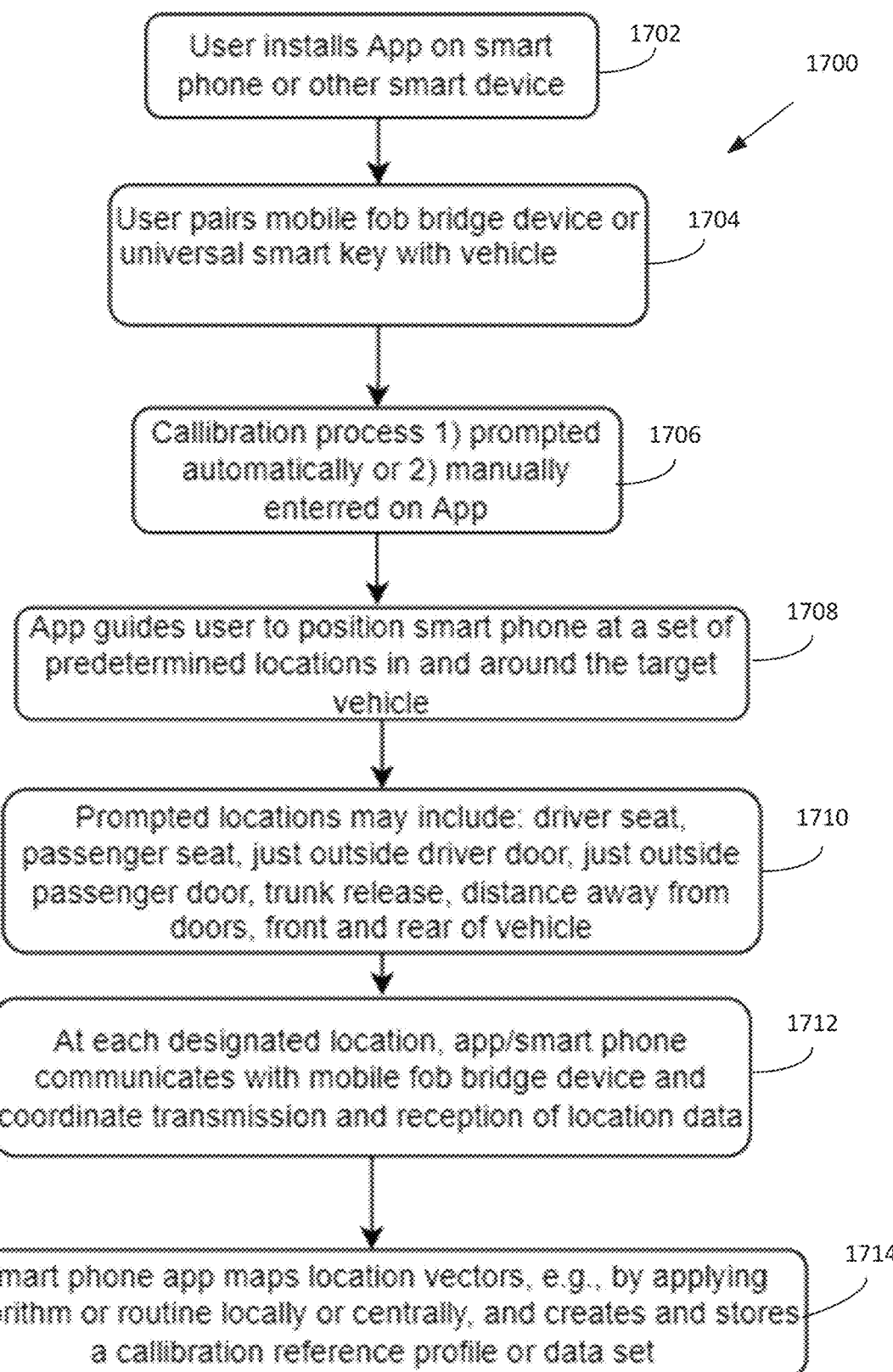

FIG. 17 provides a flowchart illustrating an exemplary app-based USK/MFB Device Calibration Process 1700 in accordance with one embodiment of the present invention. In general, the Calibration process involves the following steps: 1) App is installed on smart phone and opened; 2) after pairing (FIG. 16), calibration will either be prompted or can be manually entered on app; 3) app guides user to predetermined locations in and around vehicle—e.g., guides user to locate phone in driver's seat, in passenger's seat, just outside of driver's door, passenger's door, trunk release, two steps away from driver/pass doors; 4) at each point, app will communicate with device to coordinate transmission and reception of location information; 5) app uses algorithm to map location vectors and create a calibration profile allowing device to locate phone in 3D (three-dimensional) space in/around vehicle for the purposes of granting access to, securing, and/or starting a vehicle.

Now with reference to the more specific calibration process 1700 depicted in FIG. 17, at step 1702 the user installs the App on a smart phone or other smart device. At step 1704 the user pairs the mobile fob bridge MFB device or universal smart key USK with the vehicle. At step 1706 the user is either prompted automatically or manually commences the calibration process. At step 1708 the App guides the user to position the smart phone at a set of predetermined locations in and around vehicle. For example, at step 1710 the App guides the user to locate the smart phone in driver's seat, in passenger's seat, just outside of driver's door, passenger's door, some distance away from one or more of the doors, e.g., two steps away from driver/pass doors, front and rear of vehicle, trunk release. At step 1712 for each designated vehicle location the user is guided to have the app/smart phone communicate with the MFB device and coordinate transmission and reception of location data. At step 1714 the app running on the smart phone maps location vectors, e.g., by applying one or more algorithms or routines executing locally or centrally, and creates and stores a calibration reference profile or data set.

Once an MFB device and/or USK device is properly paired with a vehicle and/or a smart phone, then the system is setup for operation and use by the driver/user. Accordingly, the PEPS operating in the vehicle in combination with the UWB or BLE system(s) operating between the smart phone and the MFB is/are then capable of automatically or otherwise recognizing an authorized USK or smart phone as it and the user approach the vehicle. Localization confirms the presence of a device within a predefined zone to enable certain vehicle operations, e.g., passive remote keyless entry, unlocking a vehicle door in the presence of a user with a recognized smart phone or smart key.

Figure 18A:
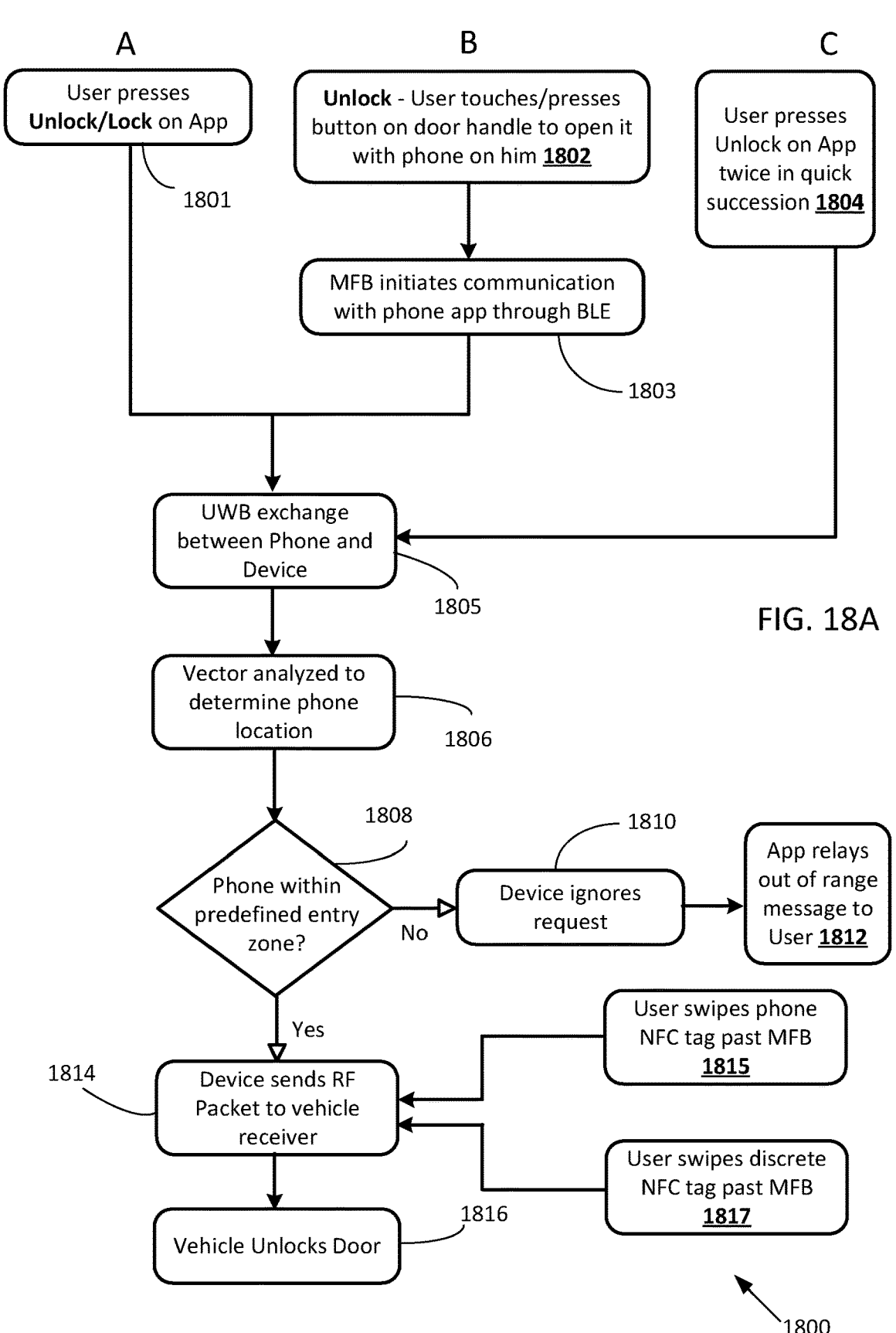
FIG. 18A provides a flowchart illustrating an exemplary app-based USK/MFB Device Vehicle Door Locking/Unlocking Process in accordance with one embodiment of the present invention.

FIG. 18A provides a flowchart illustrating a first exemplary app-based USK/MFB Device Vehicle Door Unlocking Request and Process 1800 in accordance with one embodiment of the present invention. In general, the unlocking process entails a user entering a request via a user interface operating via the app running on the user's smart phone. The user either opens the app or uses a widget on a home screen to activate the door unlock feature of the associated target vehicle with which the MFB has been paired and recognized. The smart phone sends packetized data to the MFB device over a UWB protocol. The MFB device receives and processes the packet or packetized data. If the MFB device, or alternatively the App running on the user's smart phone, determines the smart phone is within a prescribed area, or zone, or distance coinciding with the request type (e.g., outside the vehicle within a certain distance of a driver or passenger door while Unlock button or user interface element was pressed) then the MFB device generates and transmits an RF packet over the air, mimicking an OEM smart key/fob remote's transmission and thereby unlocking one or more doors of the target vehicle.

As shown in FIG. 18A, there are three paths A, B and C associated with the unlock procedure. In path A at step 1801, a user presses a user interface element labeled "lock/unlock" on an app and presented on a smartphone. In path B at step 1802, a user in possession of the smartphone recognized by the vehicle or MFB touches or presses a button on the door handle of a vehicle door handle and at step 1803 the MFB initiates communication with the phone app through BLE. In path C at step 1804, the user presses unlock on the app twice in quick succession. Following any one of these initial steps, at step 1805, a UWB exchange between the smartphone and the MFB device occurs. At step 1806, a vector analysis is performed to determine the location of the smartphone relative to the vehicle. This vector analysis may be performed by either the processing function of the smartphone or on the MFB device if so allocated. At step 1808, a determination is made as to whether the smartphone is within a predefined entry zone. If the phone is within the predefined entry zone, then at step 1814 the MFB device sends an RF signal and packet to the vehicle receiver. At step 1816, the vehicle, in response to the RF packet received, unlocks the door. If the smartphone is not within the entry zone, then at step 1810 the MFB device ignores the request, and at step 1812, the app may relay an out of range message or similar indication to the user. It should be noted that zone requirements may be removed when sending and receiving the lock/unlock signal over the optional cellular network.

Now with reference to the more specific Unlocking process 1800 depicted in FIG. 18A, may commence via three alternative paths A, B and C. At step 1801 (path A), with the recognized smart phone in their possession, the user presses an unlock/lock button or element or feature presented via an app running on a smart phone. At step 1802 (path B), with the recognized smart phone in their possession, the user touches or presses a button on a vehicle door handle or touches the handle itself to open it and at step 1803 the MFB initiates a communication with the smart phone app through the BLE module or function or feature. At step 1804 (path C) the user presses unlock on the app button twice in quick succession (double tap). All three paths A, B and C then converge at common step 1805 at which the UWB module or function processes an exchange between the MFB device and the smart phone present with the user at the vehicle. At step 1806 the phone's location is determined using spatial, directional and/or ranging vector analysis using data based on signals to/from beacon and or antenna-based (BLE/ UWB) components. At step 1808 a decision block determines whether the smart phone present with the user falls within a predefined entry range or zone or area. If the smart phone is not within the predefined zone, range or area, then the MFB device ignores the unlock request at step 1810 and at step 1812 the app relays an "out of range" or the like message to the user via the smart phone display and user interface of the app. If the smart phone is within the predefined zone, range or area, then the MFB device generates, transmits or sends an RF signal and packet to the vehicle receiver at step 1814. At step 1816 the vehicle unlocks one or more doors based on the signal received in step 1814. Again, it should be noted that zone requirements may be removed when sending and receiving the lock/ unlock signal over the optional cellular network. At step 1815, the user may swipe the smartphone's embedded NFC tag 1023 past the MFB 1004, resulting in the previously described steps of 1814 and 1816. Alternatively, at step 1817, the user may swipe the discrete NFC tag 1024 past the MFB 1004, resulting in the previously described steps of 1814 and 1816.

Figure 18B:
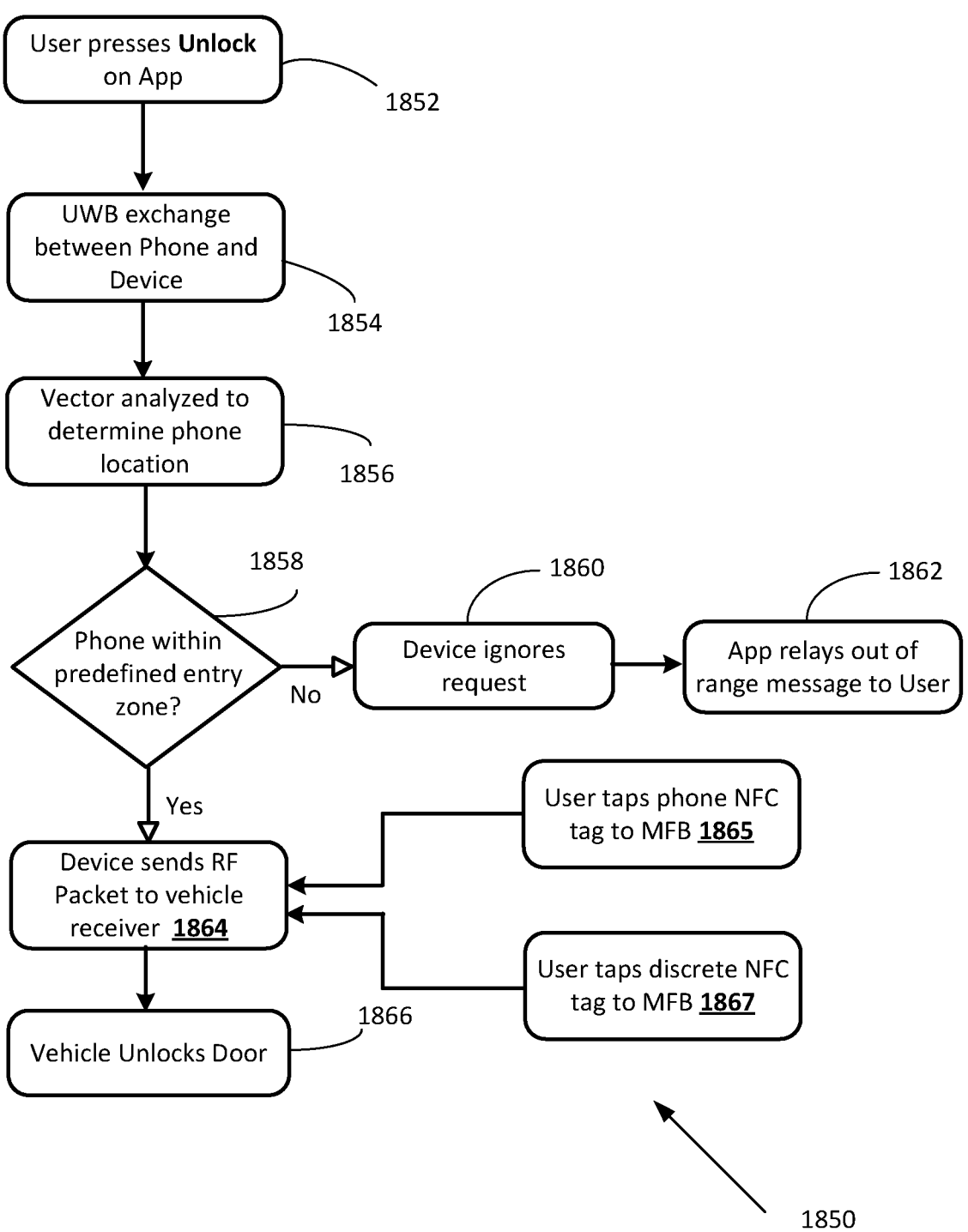
FIG. 18B provides a flowchart illustrating a second exemplary app-based USK/MFB Device Vehicle Door Locking/Unlocking Process in accordance with one embodiment of the present invention.

FIG. 18B provides an alternative unlock process 1850 associated with the MFB device. Here at step 1852 the user presses or taps or touches an unlock button or user interface element presented on the display of the smartphone by the app. At step 1854, a UWB exchange between the smartphone and the MFB device is initiated and established. At step 1856, a vector analysis is performed to determine the location of the smartphone relative to the vehicle. At step 1858 a determination is made whether the smartphone is within a predefined entry zone. If the phone is within the predefined entry zone then at step 1864 the MFB device sends an RF signal and packet to the vehicle receiver. At step 1866, the vehicle, in response to the RF packet received, unlocks the door. If the smartphone is not within the entry zone, then at step 1860 the MFB device ignores the request, and at step 1862, the app may relay an out or range message or similar indication to the user. Again, it should be noted that zone requirements may be removed when sending and receiving the lock/unlock signal over the optional cellular network. At step 1865, the user may swipe the smartphone's embedded NFC tag 1023 past the MFB 1004, resulting in the previously described steps of 1864 and 1866. Alternatively, at step 1867, the user may swipe the discrete NFC tag 1024 past the MFB 1004, resulting in the previously described steps of 1864 and 1866.

FIG. 19 provides a flowchart illustrating an exemplary app-based USK/MFB Device Vehicle Door Locking Request and Process 1900 in accordance with one embodiment of the present invention. With reference to the exemplary Locking request and process 1900 depicted in FIG. 19, at step 1902 the user presses a "lock" button or interface element presented via app running on the smart phone. At step 1904 the process causes a UWB-based exchange to be communicated between the MFB device and the smart phone. At step 1906 the system performs a vector analysis to determine the location of the phone relative to one or more beacons or antennas positioned about the vehicle and/or the MFB itself. At step 1908 a decision block is processed to determine if the smart phone is located outside the vehicle. If the phone is not outside the vehicle, then at step 1910 the MFB device ignores the request to lock the door and at step 1912 the app relays an out-of-range message to the user indicating the user with the phone must exit the vehicle before performing the requested lock operation. If the phone is outside the vehicle, then at step 1914 the MFB device disables the vehicle passive entry system (PASE/PEPS) response and at step 1916 the MFB device generates and transmits or sends an RF signal and data packet to the vehicle receiver and at step 1918 the system locks all vehicle doors.

FIG. 20 provides a flowchart key providing a legend of various roles and perspectives associated with actions taken in the pairing/calibrating processes of FIGS. 21-27. As shown, a dotted line indicates an action or logic on the smartphone; a solid line indicates an action or logic taken on the MFB device; a shadowed line indicates an action or logic taken on the smartphone and the MFB device; and a bold solid line indicates a pairing action between the USK module operating on the MFB device and the vehicle. Note the USK module may be removable from the MFB device enclosure or housing to permit the USK module to be placed within a pairing pocket of the vehicle or to connect an associated tether or dongle or connector to connect for example with an OBD port or other component of the vehicle. Again, it should be noted that zone requirements may be removed when sending and receiving the lock/unlock signal over the optional cellular network.

FIGS. 21-27 illustrate a set of flowcharts associated with a second exemplary pairing/calibrating/locking implementation.

Figure 21:
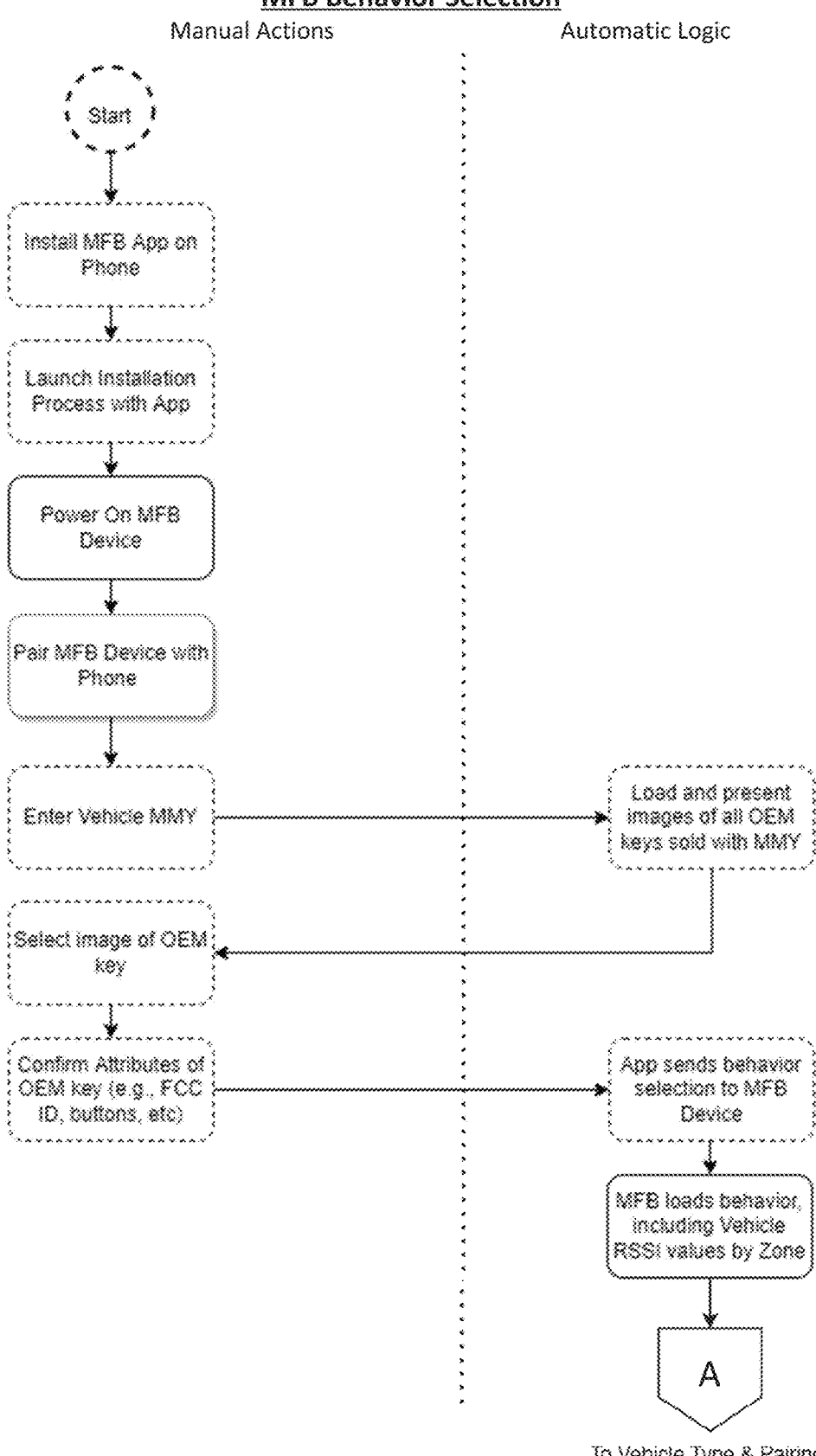

FIG. 21 provides a flowchart illustrating an exemplary app-based USK/MFB Device Behavior Selection Process in which a series of manual actions are performed along with a set of automated logic steps performed by the MFB device or smart phone. Here at start a user installs an MFB app on a smartphone that is intended to be carried by the user and used to operate in connection with a target vehicle and MFB device. Once installed, the user opens the MFB app and uses the app to launch the installation process. The user then powers on the target MFB device and commences pairing the MFB device with the smartphone. The user then is prompted to enter MMY (make, model year) information about the target vehicle in which the MFB device is to be placed or installed. The app loads and presents to the user images of all OEM keys sold with vehicles matching the MMY entered. The user then uses the app to select an image of an OEM key that matches the OEM key associated with the target vehicle. The user then confirms the attributes of the OEM key, for example by confirming FCC ID, buttons and other information helping to identify the OEM key type. Once the user has confirmed sufficient information to positively identify the OEM key type, the app sends behavior selection to the MFB device and the MFB device loads behavior as selected, including loading previously determined vehicle RSSI values by Zone. The process then proceeds to the Vehicle Type and Pairing process of FIG. 22.

Figure 22:
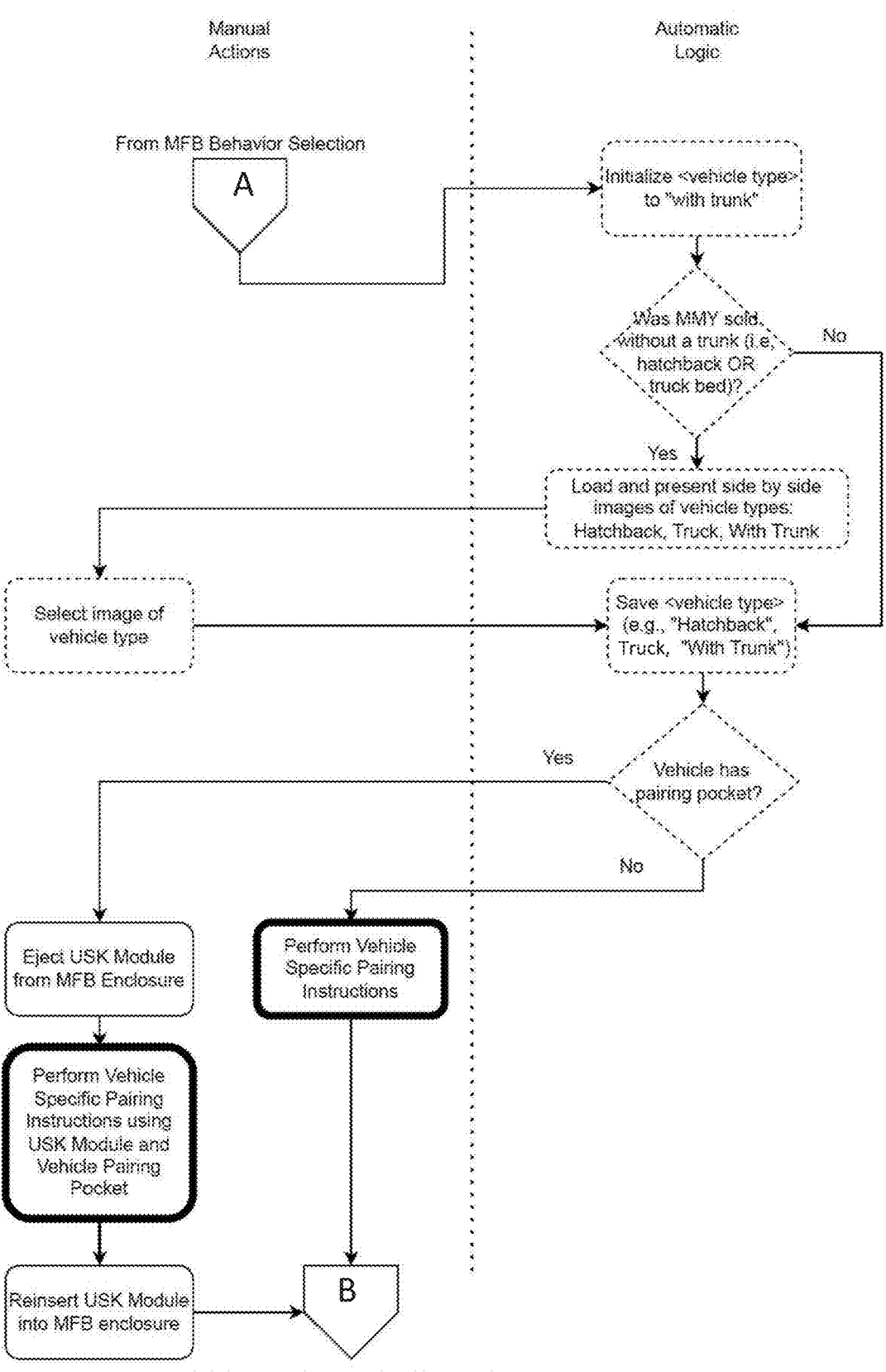

FIG. 22 provides a flowchart illustrating an exemplary app-based USK/MFB Device Vehicle Type and Pairing Process having a set of manual actions and automated logic. Here the Behavior Selection process proceeds to the step of initializing the <vehicle type> to "with trunk" and a determination is made as to whether the MMY identified was sold without a trunk—in other words was there a hatchback or truck bed option associated with the MMY data. If the MMY data indicates no model was sold without a trunk, the process proceeds to saving the <vehicle type> as having a trunk. If the MMY data indicates a model was sold without a trunk then the process presents the user with a set of images for selection of the matching vehicle type and sends the user input and saves the data as indicated, e.g., with hatchback or with truck bed. Next the process proceeds to determining whether the vehicle has a pairing pocket.

If the vehicle has a pairing pocket, then 1) the MFB device is place in the pairing pocket or 2) if configured, the USK is ejected or removed or disconnected from the MFB device and placed in the pairing pocket. Next the process performs vehicle specific pairing instructions using the USK module and vehicle pairing pocket and once completed, the USK module, if configured, is returned to or reconnected with the MFB device.

If the vehicle does not have a pairing pocket, then the process performs vehicle specific pairing instructions to pair the MFB device with the vehicle.

Once the MFB and vehicle are paired, the process proceeds to the localization or calibration process. FIG. 23 provides a flowchart illustrating an exemplary app-based USK/MFB Device RSSI/Zone Calibration Table as an example of a calibration or localization table used in calibrating the MFB device with the vehicle. In this example of three vehicle types, each vehicle has six zones with which the MFB and smartphone are used to create a three-dimensional (3D) mesh for each zone relating to a spatial or locational point of reference for the vehicle. A set of x, y and z RSSI values are stored in a Vehicle RSSI Table for use in the calibration and lookup process.

Figure 24:
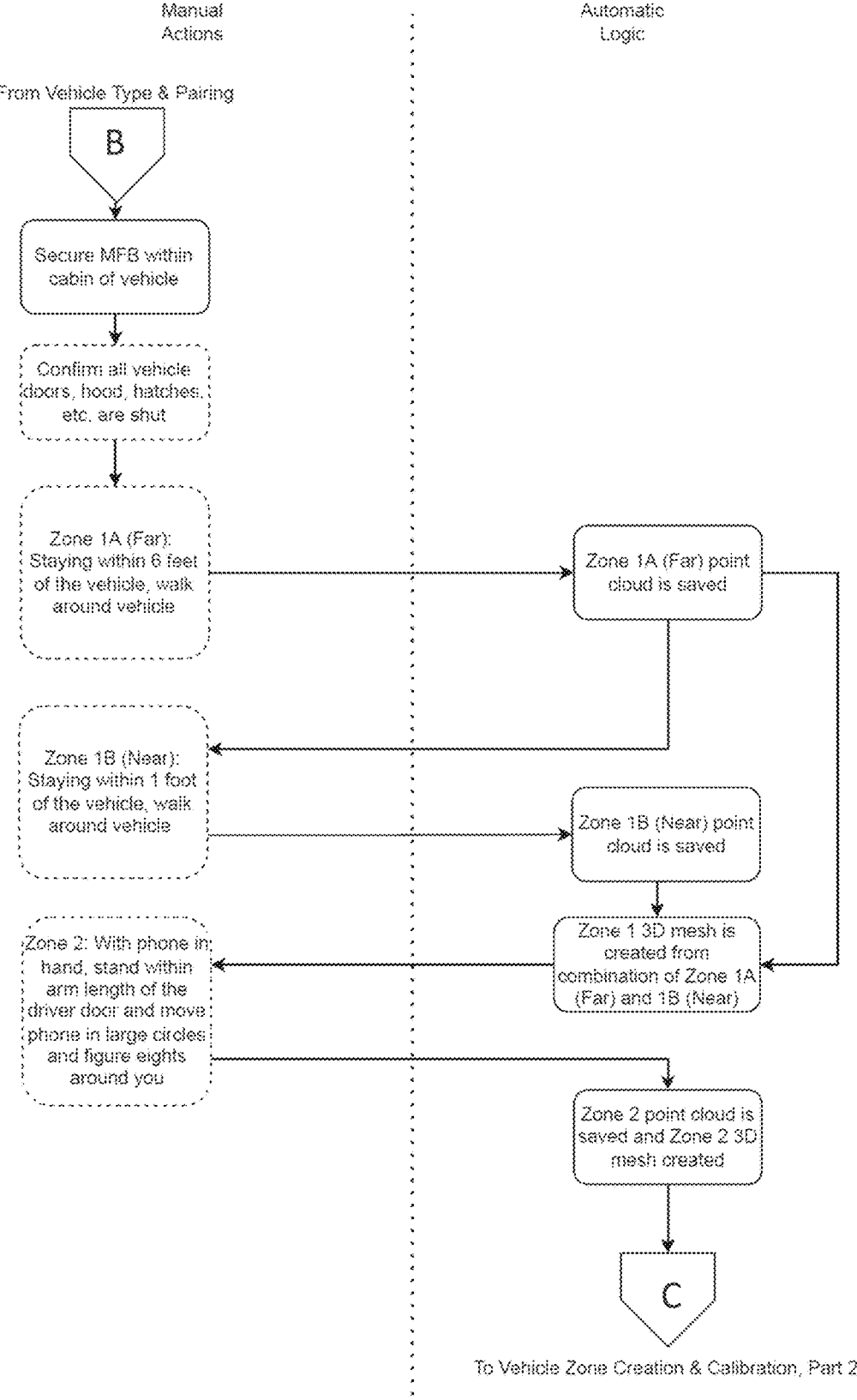
Figure 25:
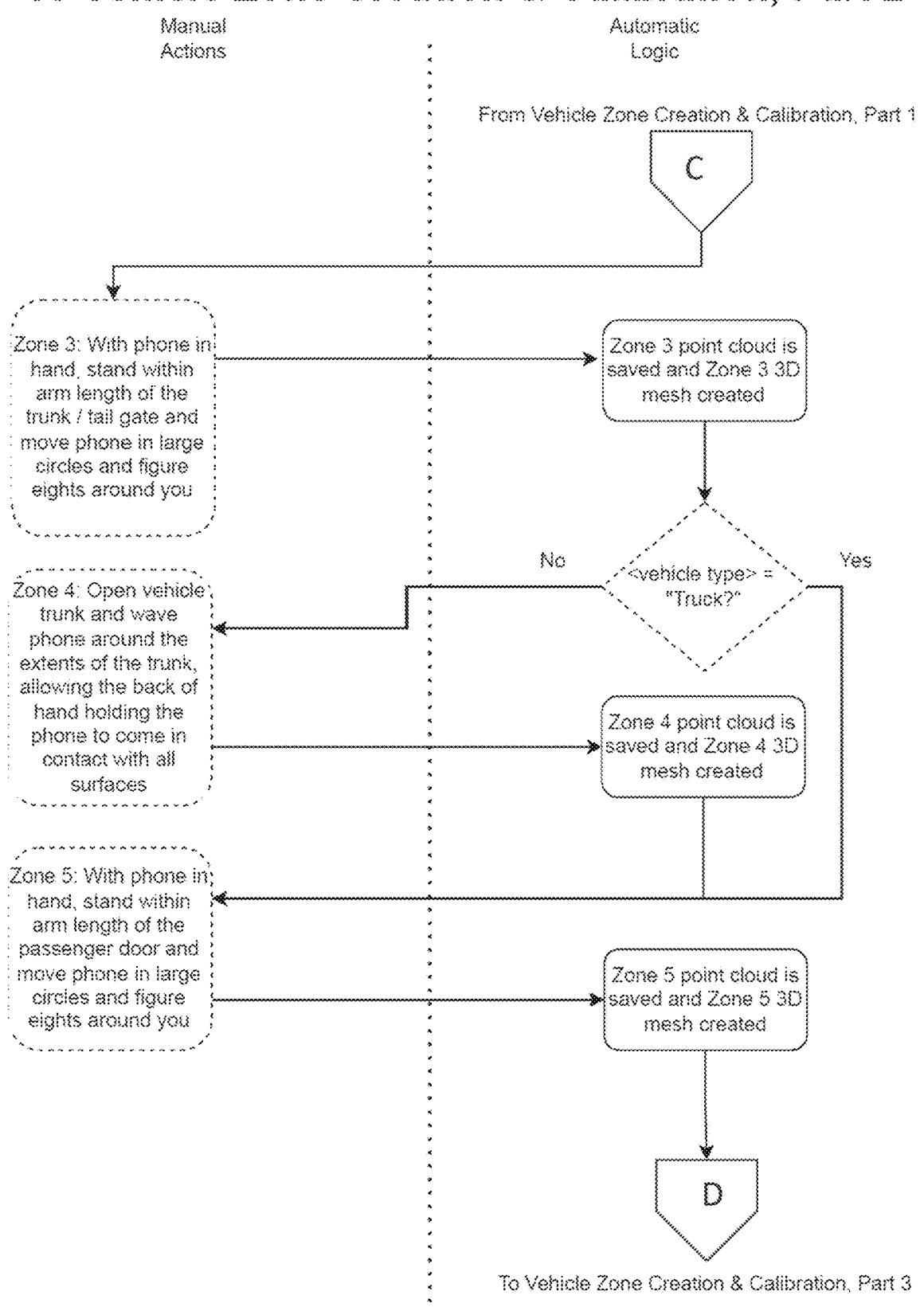
Figure 26:
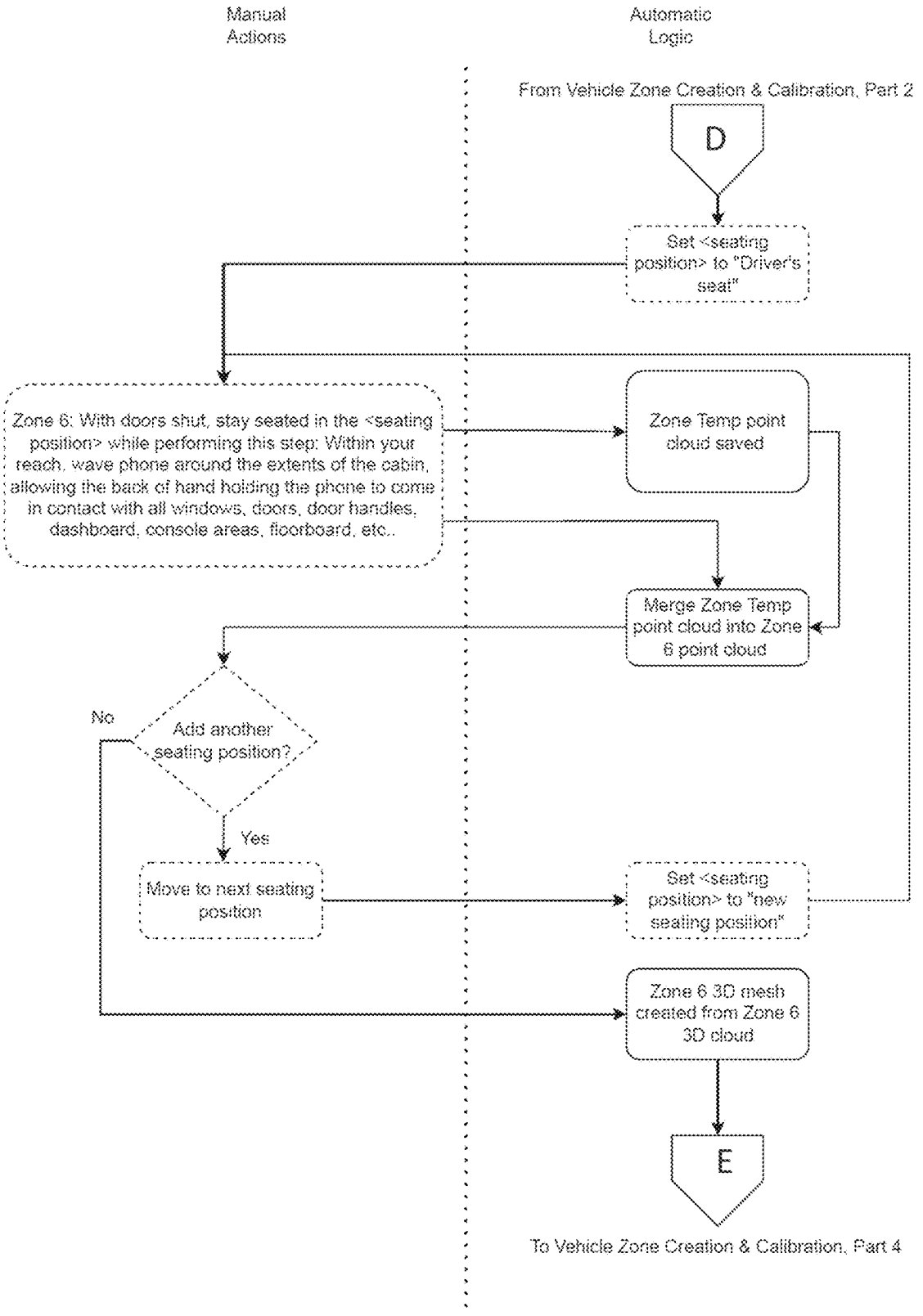
Figure 27:
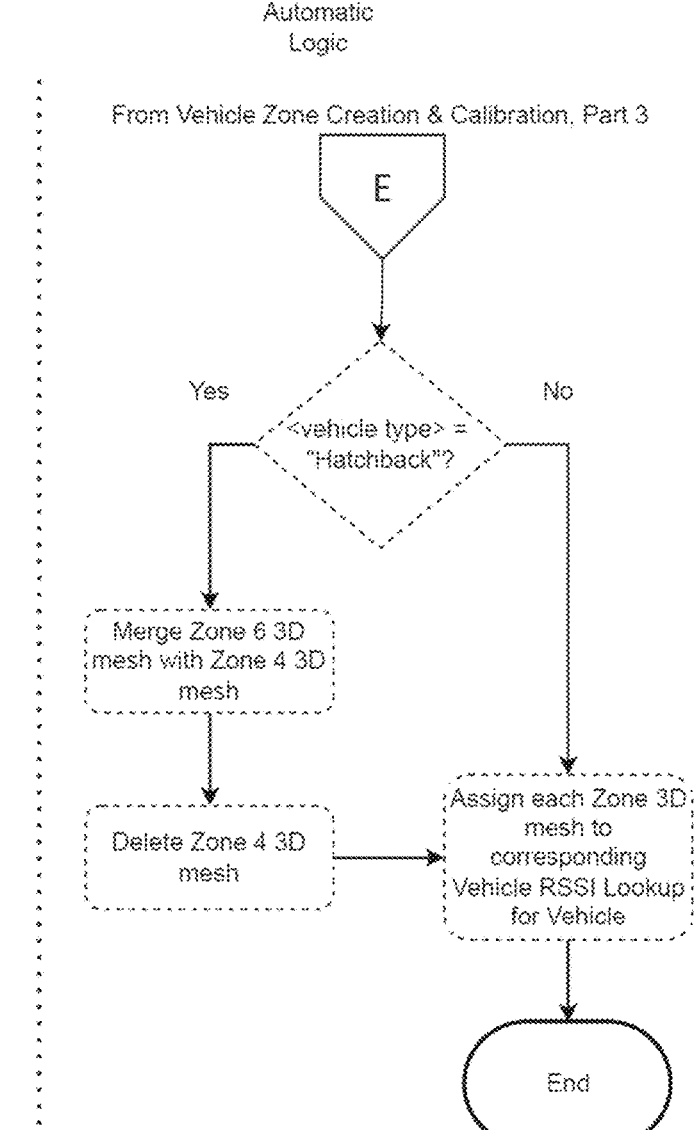

FIGS. 24-27 provides a flowchart illustrating an exemplary app-based USK/MFB Device Vehicle Zone Creation and Calibration Process (Parts 1-4) in accordance with one manner of implementation. FIG. 24 shows exemplary detailed processes for creating and calibrating Zones 1A (Far), 1B (Near), and Zone 2 outside near drive door of vehicle. FIG. 25 shows exemplary detailed processes for creating and calibrating Zone 3, outside at trunk, Zone 4 inside, in trunk area or compartment, and Zone 5 outside near passenger door of vehicle. FIG. 26 shows exemplary detailed processes for creating and calibrating Zone 6 inside cabin of vehicle which may be at one or more seating locations. FIG. 27 provides a further process for configuring or merging Zone 6 with Zone 4 based on whether the vehicle is a hatchback type vehicle ad may involve deleting a zone, e.g., Zone 4. At each described location the user is directed to wave the smartphone in a manner to create a set of data points for each zone. For each zone a point cloud is created and saved, then converted into a 3D mesh for each zone performed, for example, using publicly available open source C/C++ libraries. Each Zone 3D mesh is then assigned to a corresponding set of RSSI values using the RSSI Lookup table for the vehicle type. The RSSI data may be, for example, learned in a separate process by manipulating an OEM key and monitoring RSSI signal and data generated by communications with a vehicle at each of the zones described and defined above.

FIGS. 28-35 illustrate a Bootloader Process and associated memory and flowcharts associated with a bootloading operation in connection with the present invention.

Figure 28:
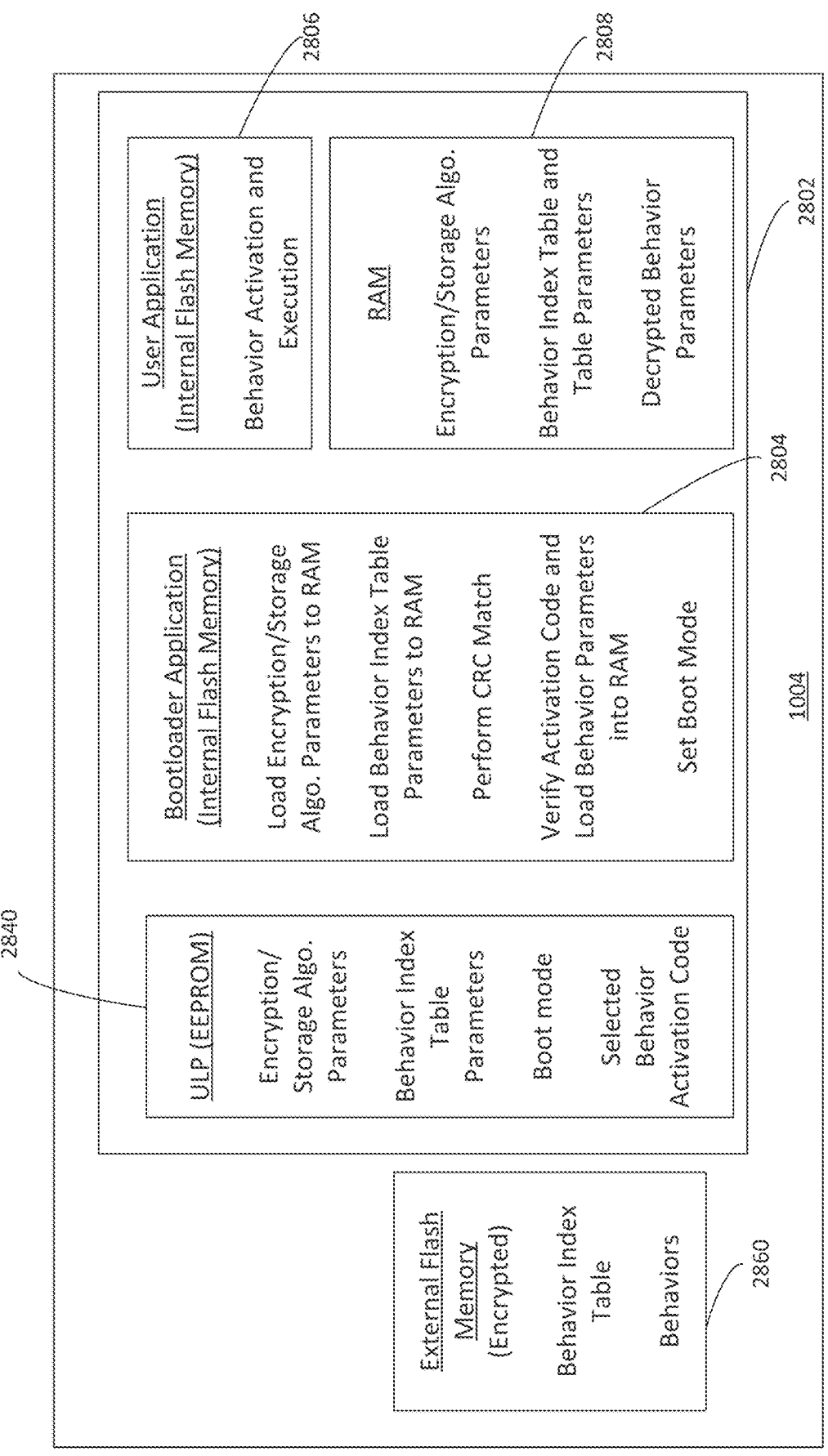
FIGS. 28-35 illustrate a Bootloader Process and associated memory and flowcharts associated with a bootloading operation in connection with the present invention.

FIG. 28 illustrates a set of memory allocations associated with the exemplary bootloading operation. In this exemplary embodiment of the bootloading configuration an internal memory 2802 includes allocations for the bootloader application (internal flash memory) 2804, User Application (internal flash memory) 2806, ULP (EEPROM) 2840, and RAM 2808, and external memory including External flash memory (encrypted) 2860. The bootloader application accesses and writes data to the other internal and external memory components as described in more detail in connection with the processes illustrated in flows of FIGS. 33-35. The bootloader application is stored in internal flash memory and includes load encryption/storage parameters (to RAM 2808), load behavior index table parameters (to RAM 2808), CRC (Cyclical Redundancy Check) Match functions, Activation Code verification and load selected behavior parameters (into RAM 2808), and Boot mode setting function. The various operations may be, for example, performed using C or C++ code. The User Application component 2806 includes Behavior Activation and Execution function. The RAM 2808 includes Encryption/Storage algorithm parameters, Behavior Index Table Parameters, Decrypted Behavior Index Table, and Decrypted Behavior parameters. The internal ULP (in EEPROM) includes Encryption/Storage algorithm parameters, Behavior Index Table parameters, Boot Mode parameter, and Selected Behavior Activation Code parameter. The External Flash Memory (Encrypted) includes Behavior Index table and one or more sets of Behaviors.

Figure 29:
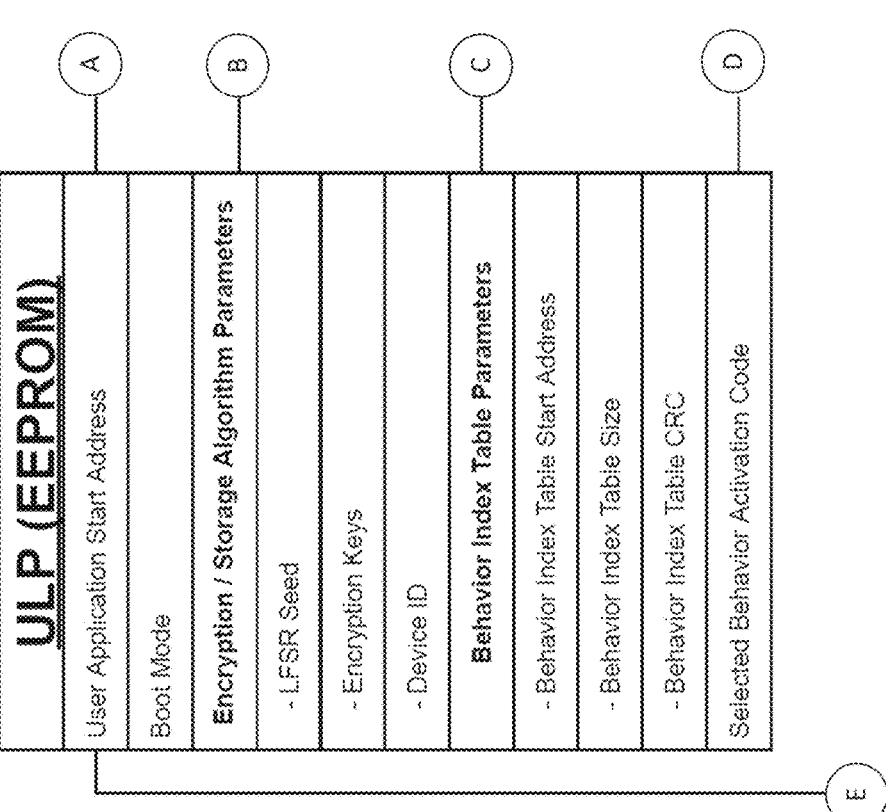

FIG. 29 illustrates a ULP (EEPROM) internal memory associated with the exemplary bootloading operation. In this example, the ULP includes a User Application Start address which through the bootloader process is provided to the Bootloader Application 2804. The Encryption/Storage Algorithm parameters include LFSR (Linear-Feedback Shift Register) seed, Encryption keys, and Device ID. The Behavior Index Table parameters include Behavior Index Table Start Address, Behavior Index Table size, Behavior Index Table CRC parameter, and Selected Behavior Activation Code.

Figure 30:

FIG. 30 illustrates an External Flash Memory (Encrypted) associated with the exemplary bootloading operation. In this example, the External Flash Memory includes Behavior Index Table elements as shown and one or more sets of Behaviors 1-n.

Figure 31:
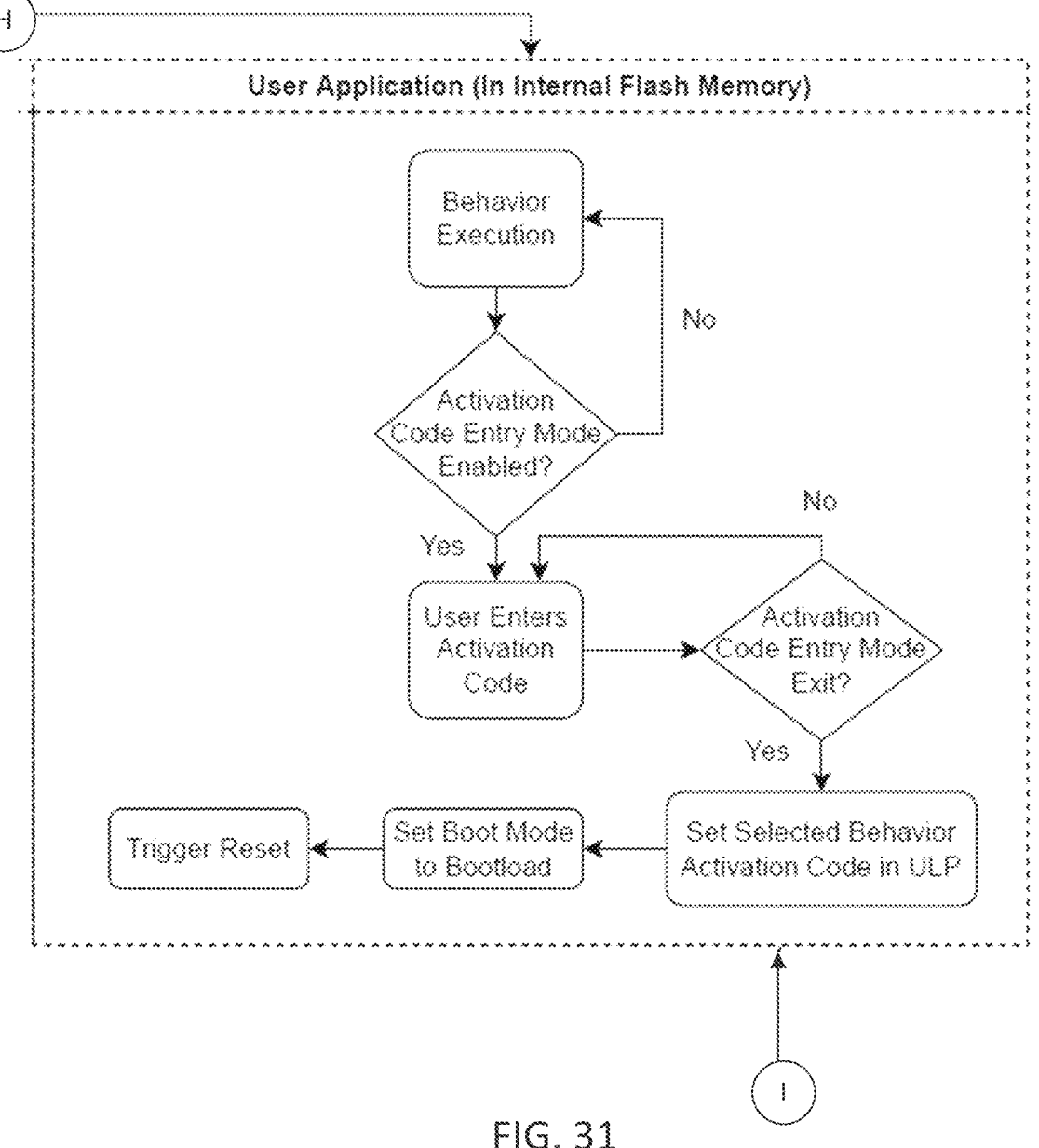

FIG. 31 illustrates a User Application stored in internal flash memory associated with the exemplary bootloading operation. In this example, the User Application 2806 includes logic and processes for Behavior Execution, Activation Code Entry Mode, setting selected Behavior activation code in ULP and setting Boot Mode, e.g., to Bootload mode and trigger reset. Letters H and I indicate flows of data (code and parameters) communicated between the Bootloader Application and the associated internal and external memory components during operation of the User Application and Bootloader Application of FIGS. 33-35.

Figure 32:
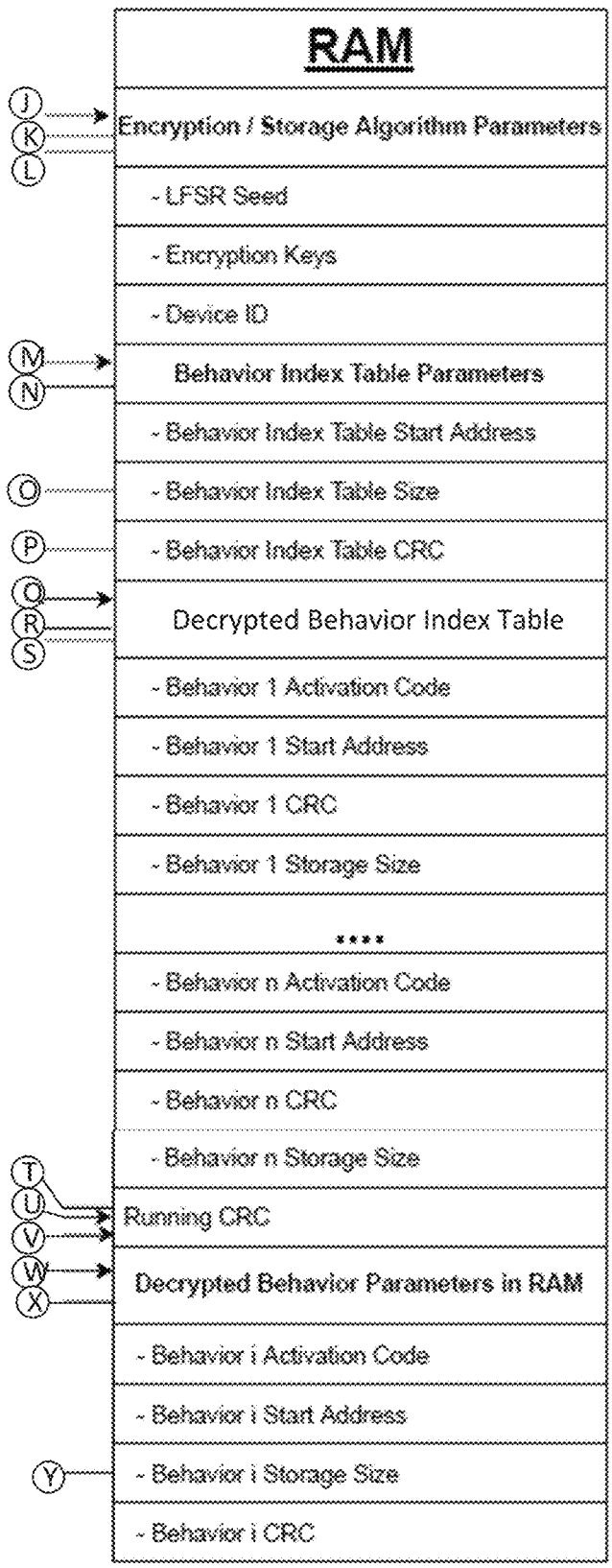

FIG. 32 illustrates a RAM memory allocation associated with the exemplary bootloading operation. In this example RAM includes a set of Encryption/Storage parameters (including LFSR seed, Encryption keys, and Device ID), Behavior Index Table parameters (including the start address, CRC and storage size of the Behavior Index Table), Behavior Index Table (including, for each set of Behaviors 1-n, activation code, start address, CRC and storage size parameters), Running CRC parameters, and Decrypted Behavior Parameters.

Figure 33:
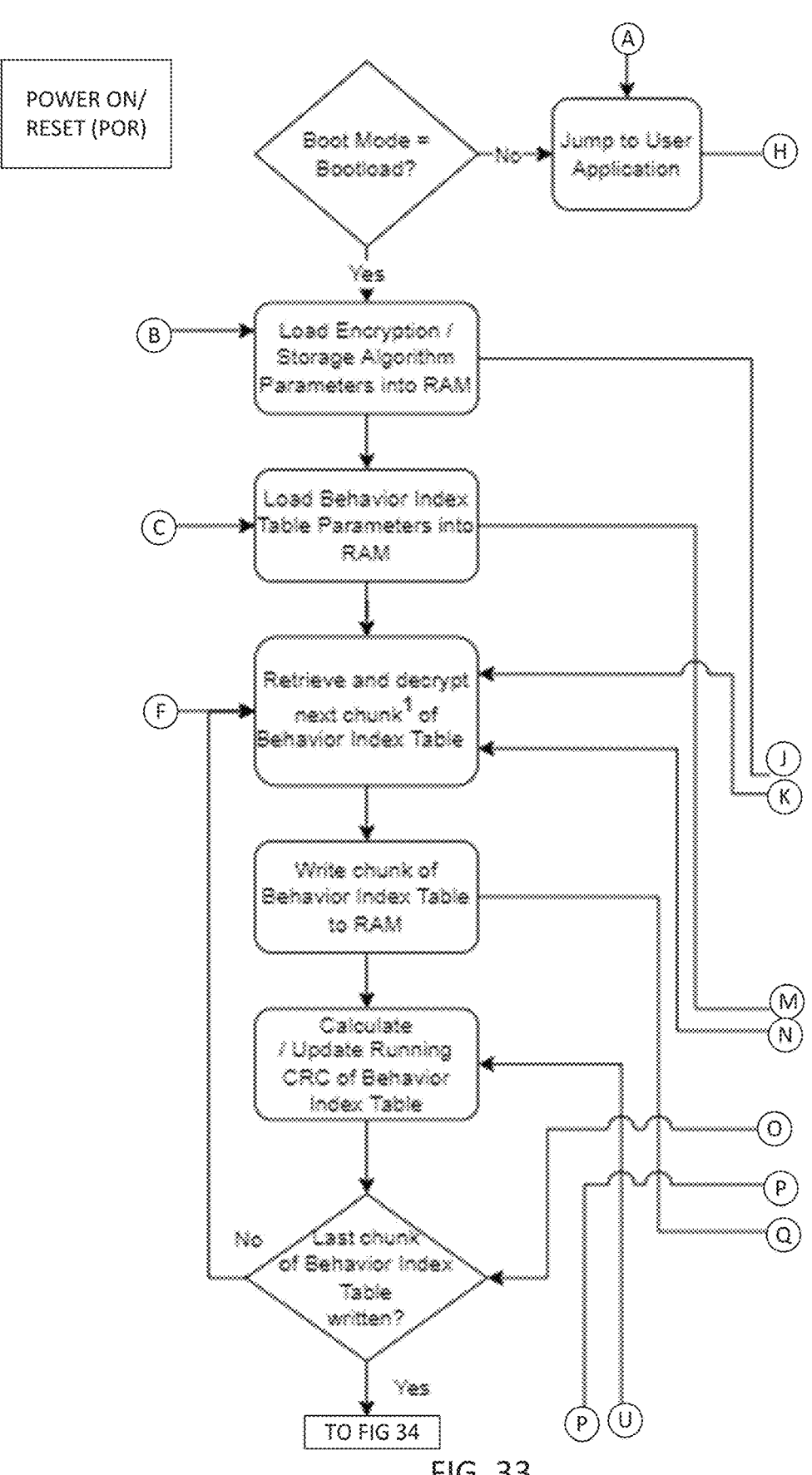
Figure 34:
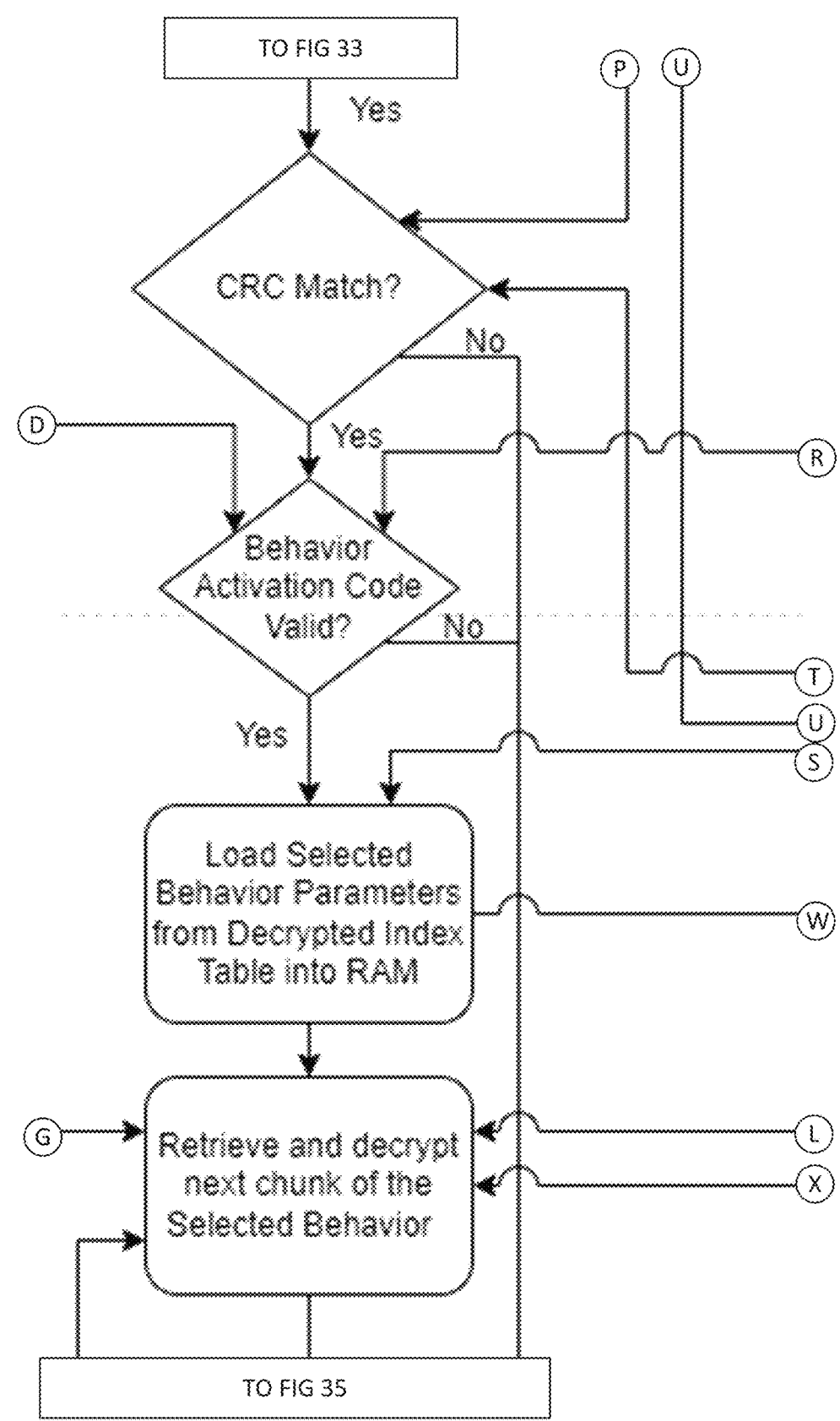
Figure 35:
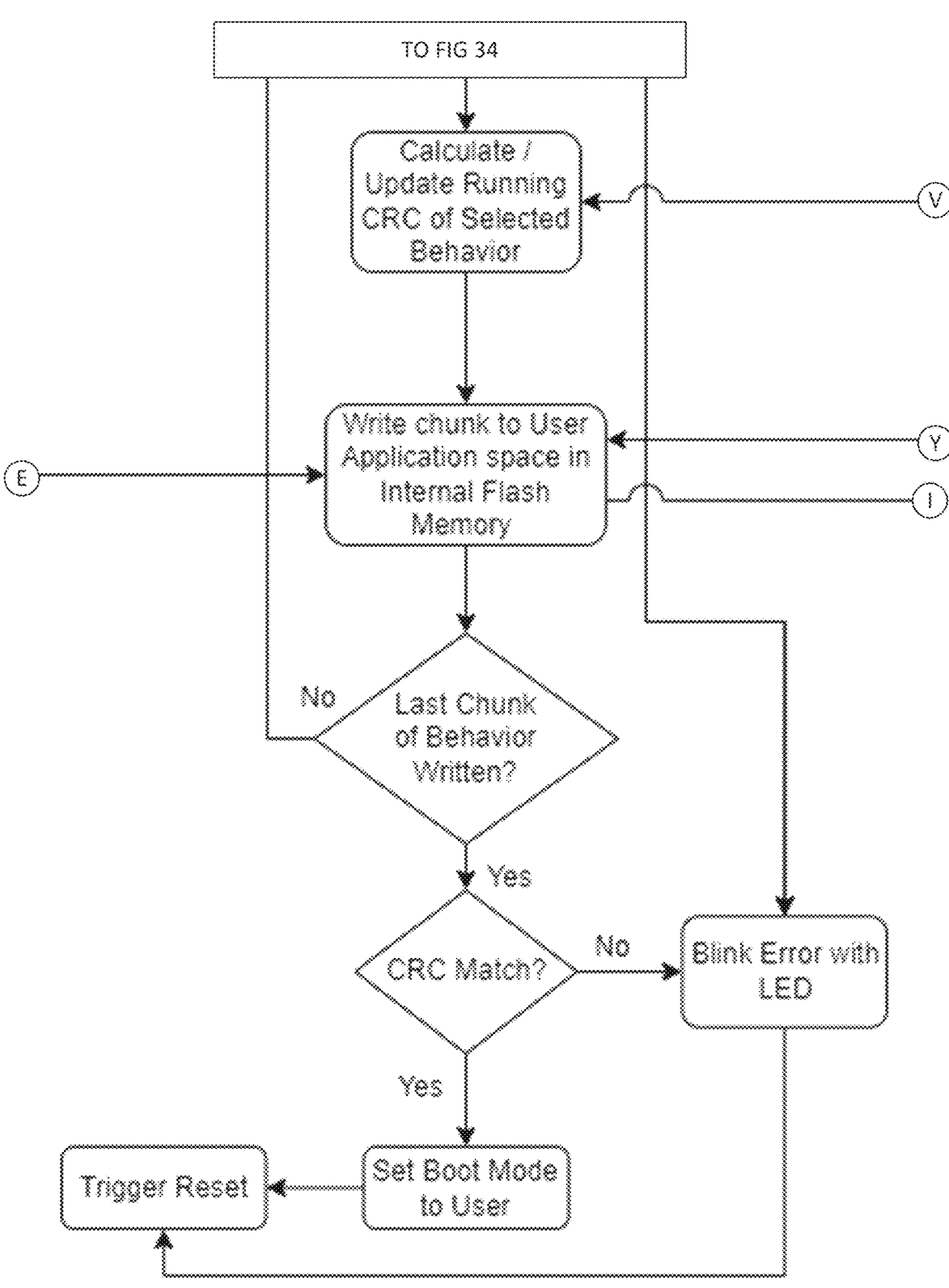

FIG. 33-35 illustrate a Bootloader Application stored on internal flash memory associated with the exemplary bootloading operation. In this example, letters A-Y indicate flows of data (code and parameters) communicated between the Bootloader Application and the associated internal and external memory components during operation of the Bootloader Application. When the MFB device is first powered up for pairing and configuration processes, a power on/reset (POR) function commences with an initialization of the MFB device, the bootloader application will receive behavior selection information and initiate in "Bootload" mode to access and load behavior and other data associated with configuring the MFB device for operation with a target vehicle in connection with a smartphone. Once the particular vehicle behavior parameters and functions are loaded into the internal memory 2802 within the memory space of the User Application 2806, then the bootloader application accesses the User Application start address and allows the User Application 2806 to commence operation in a "user application" mode and jumps to the User application as indicated to execute the functions associated with the selected Behavior. Here, the bootloader application ("BA") accesses the Boot Mode parameter stored in ULP 2840 to determine if the bootloader application should follow path "A" and "jump" to the User Application ("UA") in internal flash memory, and if not, then the BA commences in "bootload" mode.

If the bootloader application is in bootload mode, then the steps illustrated following the "yes" path commences with loading encryption/storage algorithm parameters into RAM—the bootloader application accesses the parameters from the ULP at path "B" and loads the LFSR seed, encryption keys and device ID parameters into RAM at path "J." Next the BA accesses the Load Behavior Index Table ("BIT") parameters from the ULP at path "C" and loads the parameters into the RAM at path "M." The BA continues to perform the functions shown in the figures to: retrieve and decrypt chunks (finite size of data such as a byte or word or page) of Behavior Index Table, writes chunks of the BIT to RAM; calculates and update running CRC of BIT, performs CRC match operation, validates the selected Behavior activation code; loads selected behavior parameters from decrypted (Behavior) index table into RAM; repeats for subsequent chunks of the selected behavior; writes chunks to UA space in internal flash memory; upon last chunk of selected behavior written performs a CRC match and if match confirmed sets bootload mode to user mode and if not then an error indication such as an LED is activated.

Once in User mode, the UA handles operation of the MFB in performing remote access, remote start and other operations associated with the target vehicle to which the MFB device has been paired, calibrated and otherwise configured.

In addition to the localization/calibration and vehicle control operations discussed above, the USK and MFB devices may be further configured to perform additional operations. For example, the USK and/or MFB devices may include executable instructions configured to process a Vehicle Start request via Engine Start-Stop Button. Many vehicles are capable of allowing starting of a vehicle without a user inserting a key or fob into an ignition. Upon sensing the presence of an authorized key or key fob within range of the vehicle or at or near a location in the vehicle, the user may simply press a "start" button and the car with start the engine. In connection with the present USK and MFB inventions, the devices may also be adapted to support and enable this feature. For example, upon sensing the presence of a USK or smart device (via the MFB localization functions described herein) the vehicle system "wakes" via a polling routine, or unlock request, or other triggering event. The USK remains active to function as a passive entry fob equivalent to the OEM remote key. The user presses Engine Start-Stop button in vehicle and the device receives an LF request from the vehicle and responds appropriately, authorizing vehicle start.

In addition, upon a user exiting a vehicle, the smart phone or device (via the MFB localization functions described above) or USK is polled or otherwise monitored for distance outside of or away from the vehicle. The system may also monitor battery voltage for charging (i.e., ignition "on" condition) versus engine off status (i.e., ignition "off" condition). When it is determined that a user's smart phone or device (via the MFB localization functions described above) or USK is out of or is about to exit the vehicle, some typical passive fob responses may be disabled in the MFB device to prevent the OEM anti-lockout function from occurring and to allow the vehicle door to lock. For example, when a user either 1) presses a lock button UI element on their smart phone, 2) is at a prescribed distance from the vehicle and all vehicle doors are shut or 3) presses the unlock/lock button on either the driver or passenger door, when the MFB device receives a location request over the LF system, the system determines if the user's smart phone is exiting the vehicle or not. If the user's smart phone is no longer within the vehicle or is outside a pre-defined range, the MFB device responds in a manner consistent with the OEM remote system's behavior to allow the vehicle to lock.

In addition, software executing on the smartphone may call on operations associated with an accelerometer feature to access accelerometer data, e.g., data available to a mobile application (of "app") running in the background. A further aspect that maybe employed is a "knock" (AKA "tap" for phone) to unlock/lock door(s), unlatch or pop open trunk or control other features associated with the target vehicle via the hand-held smart device or smartphone. The mobile app associated with the bridge/vehicle control may include limitations on when the phone app would "listen" for a tap, e.g., avoid a tap while the phone is unlocked (e.g., user texting, etc.) and/or not qualify a tap as a tap when it is detected with a corresponding screen touch. This feature may be enabled only when the phone is locked and/or when a tap is detected without a corresponding screen touch as any double, triple, quadruple taps may be more representative of a true intention to execute the tap to lock/unlock/pop instead of just user interaction with the screen.

In one embodiment the bridge/USK emulates essentially all of the behavior of a smart key to enable the MFB/bridge/ZeroKey to support Passive Entry, e.g., using the button on the outer door handle(s) or proximity to the outer door handles to unlock/lock the vehicle. This requires a large amount of data collection and storage and robust hardware for the bridge device placed, located, disposed or installed in a fixed location inside the vehicle, to a) sufficiently receive LF communication from the various coils located about the vehicle and b) respond over UHF, to each measurement request made by one or more coils, with the proper response(s) (e.g., RSSI values) needed to enable a proper passive entry request.

In a second alternative embodiment, to reduce the need for data collection, storage and hardware capabilities, a remote keyless entry "RKE" is used to indirectly (through bridge) provide/remove (e.g., unlock/lock) access to the vehicle. As described above, the system may leverage RKE to lock/unlock the vehicle, and this may further include the following operational and functional features or capabilities or requirements:

1. The bridge/ZeroKey will come integrated with an NFC reader that has an associated NFC coil antenna.
2. "Knock" feature—The bridge/ZeroKey will come integrated with an accelerometer 1215a/1215b (see FIG. 12) to enable "knock" access to the vehicle. Alternatively, a separate knock-sensing component may be located within the target vehicle remotely from the bridge, e.g., by the dashboard on the windshield, and wirelessly or wired connected to the bridge.
2a. "Tap" feature—As an alternative to the "knock" feature, the bridge/ZeroKey app may monitor the hand-held smart device's accelerometer to enable "tap" feature on the smart device to enable access to the vehicle. The following operational aspects described in connection with the accelerometer-based knock function may be similarly operated in connection with the smart device "tap" feature.
3. The bridge/ZeroKey will be installed either a) inside the vehicle on the vehicle windshield/window in a location easily accessible by the user (e.g., bottom driver's side) from the outside with the NFC reader, coil antenna, and accelerometer internal or proximate to the MFB enclosure or b) remote from the windshield/window with a wired or wireless connection to the accelerometer, NFC device and/or coil antenna installed inside the vehicle on the vehicle in a location easily accessible by the user (e.g., bottom driver's side windshield) from the outside.
4. The user will be provided an NFC tag issued ("issued tag") with or associated with the bridge that can be associated to and trusted by the bridge/ZeroKey. The bridge/ZeroKey will allow the user to associate the phone's NFC tag to the bridge/ZeroKey as well. This will provide the user the ability to use the issued tag or phone's NFC tag or other "trusted tag" to gain access to the vehicle. For example, when, through the glass/windshield, the user swipes a trusted NFC tag, the driver door will unlock. A second swipe within a pre-defined time period or interval, e.g., time 1 or "t1," can be used to unlock all doors.

5. By default, all automatic actions that follow may result in a notification to the user. The user may disable notifications within the hand-held smart device's settings.

6. By default, within the bridge-associated phone app, the "auto-unlock" of the driver door may be disabled. However, the app will allow the user to enable the "auto-unlock" feature, which will unlock the driver door when the user approaches the vehicle from any one of a set of allowable vectors (speed and direction). For example, the following detected events may trigger the auto-unlock feature via the bridge to permit entry or access to the vehicle. For example, when the bridge detects: 1) the user (or actually the hand-held smart device) transits or travels a predefined distance, e.g., distance 1 or "d1" (rate of change over the distance may also be a feature measured); 2) the transit occurs within a predetermined time period or interval, e.g., less than or equal to time period or interval time 2 or "t2," and 3) the user transitions from Zone 1A (Far) to Zone 2 in that same (t2) or a different predefined period of time. In addition, auto-unlock may also activate when the user stands still or remains within Zone 1 for a pre-defined period time 3 or "t3" (e.g., 3 seconds).

7. The bridge smart device or phone app may be configured with a default whereby the "auto-lock" of the driver door will be disabled. However, the app may allow the user to enable the "auto-lock" feature, which will lock all doors when the user moves away from the vehicle, following any one of a set of allowable vectors (e.g., speed, rate, and direction) and transits or travels a predefined distance, e.g., d2 distance, within a pre-defined or set period of time, e.g., time "t4," and transitions from Zone 1A to the outside of Zone 1A (Far) in that same period of time.

8. The software in the ZeroKey will store the last lock state that it placed the vehicle door(s) into or otherwise recognizes that state (i.e., all doors locked, driver door unlocked, all doors unlocked).

9. By default, within the bridge-associated phone app, the "knock-to-unlock" feature may be set to "disabled." However, the app may allow the user to enable the "knock-to-unlock" feature. If the last state is "all doors locked" and the user/hand-held smart device is detected to be within Zone1 or proximate to Zone 1, a double knock detected within a predefined time period, e.g., time "t5," will send a driver door unlock RKE signal to the vehicle.

10. If the "knock-to-unlock" feature is enabled and the user/hand-held smart device is detected to be within Zone1 or proximate to Zone 1, a triple knock within a predefined time period "t6" may send an "all doors unlocked" RKE signal to the vehicle.

11. By default, within the hand-held smart device app, the "knock-to-lock" feature will be disabled. However, the app will allow the user to enable the "knock-to-lock" feature. If the last state is "all doors unlocked" and the user/hand-held smart device is detected in Zone1 or proximate to Zone 1, a double knock detected within a predefined time period "t6" may send an all doors lock RKE signal to the vehicle.

12. By default, within the phone app, the "knock-to-pop" feature will be disabled. However, the app will allow the user to enable the "knock-to-pop" feature. If the user/hand-held smart device is detected to be within Zone1 or proximate to Zone 1 and a quadruple knock is detected within a predefined time period "t7," a single trunk/hatch RKE signal will be sent to the vehicle.

While the inventions of the USK and MFB inventive aspects have been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

The invention claimed is:

1. A Bridge adapted to be disposed in a target vehicle and to be wirelessly paired with a hand-held smart device operated by a user for controlling a set of features associated with the target vehicle, the Bridge comprising:

a transceiver adapted to perform ranging operations in cooperation with the wirelessly-paired hand-held smart device;

a micro-controller adapted to handle BLE operations and communications with BLE-enabled functions of the wirelessly-paired hand-held smart device;

a USK module comprised of a communications interface configured to communicate with one or more vehicle communications systems, the USK module further configured to perform vehicle-specific operations in connection with the transceiver or the micro-controller BLE-enabled functions or both the transceiver and the micro-controller BLE-enabled functions;

one or more memory components configured to store data and/or instructions related to one or more of pairing, behavior selecting, behaviors, bootloading, or calibrating processes;

wherein the Bridge is configured to:

receive, via a mobile application running on the hand-held smart device, a pairing process for pairing the Bridge with the target vehicle;

receive, from the mobile application, one or both of a) data representing a make model and year (MMY) of the target vehicle, and b) a VIN (vehicle identification number) of the target vehicle;

communicatively couple the USK module with one or more of the vehicle communications systems based in part on the MMY or VIN data; and based on user interaction with prompts presented on the mobile application, communicate with the vehicle communications system to send commands and respond to security access challenges.

2. The Bridge of claim 1 wherein the transceiver is an ultrawide band (UWB) micro-controller-based transceiver.

3. The Bridge of claim 1 wherein the set of features includes one or more of security feature, access feature, entry feature, trunk feature, door lock/unlock feature, engine start feature, alarm feature, light on/off feature, door open feature, operator recognition feature, convertible top feature, windows up/down feature, and operator approval feature.

4. The Bridge of claim 1 further comprising a user-to-user communication feature to enable a remote user to communicate with an other user operating the hand-held smart device to enable control of the target vehicle via the Bridge.

5. The Bridge of claim 1 further comprises a LF (low frequency) component adapted to communicate with the vehicle communications system, and wherein the USK module is configured to communicate with one or more vehicle communications systems, and wherein the one or more vehicle communications systems includes transponder, UHF or LF components including antennas and/or OBD interfaces.

6. The Bridge of claim 1 further comprising a Near Field Communications (NFC) reader that has an associated NFC coil antenna adapted to read a trusted NFC tag, wherein the NFC reader is located within the target vehicle either integral with the Bridge or separate from the Bridge, and wherein the trusted tag is read by the NFC reader to allow access to the target vehicle.

7. The Bridge of claim 1 wherein the USK module comprises a Bootloader Application stored in an internal memory.

8. The Bridge of claim 1 further comprising an expansion port for adapting the Bridge to perform enhanced functions and/or to alter firmware or behavior data and/or instructions.

9. The Bridge of claim 1 further wherein the USK module is configured to be removable from the Bridge for placing in a pairing pocket or other vehicle location for communicating with one or more of a vehicle system, a data link connector, or LF coils.

10. A method of controlling a set of features associated with a target vehicle, the method comprising the steps of:
    providing a Bridge disposed in a target vehicle;
    wirelessly pairing the Bridge with a hand-held smart device and operated by a user for controlling the set of features associated with the target vehicle;
    communicating, via a vehicle communications interface associated with the Bridge, with one or more vehicle communications systems;
    performing, via a transceiver associated with the Bridge, ranging operations in cooperation with the wirelessly-paired hand-held smart device;
    processing, by the Bridge, BLE operations and communications with BLE-enabled functions of the wirelessly-paired hand-held smart device;
    performing, by the Bridge, vehicle-specific operations in connection with the transceiver or the BLE-enabled functions or both the transceiver and the BLE-enabled functions;
    storing, by one or more memory components associated with the Bridge, data and/or instructions related to one or more of pairing, behavior selecting, behaviors, bootloading, or calibrating processes;

selecting, via a mobile application running on the hand-held smart device, a pairing process for pairing the Bridge with the target vehicle;
entering via the mobile application one or both of a) data representing a make model and year (MMY) of the target vehicle, and b) a VIN (vehicle identification number) of the target vehicle;
communicatively coupling the Bridge with a vehicle communications system based in part on the MMY or VIN data; and
following prompts presented on the mobile application to communicate with the vehicle communications system to send commands and respond to security access challenges.

11. The method of claim 10 wherein the transceiver is an ultrawide band (UWB) micro-controller-based transceiver.

12. The method of claim 10 wherein the set of features includes one or more of security feature, access feature, entry feature, trunk feature, door lock/unlock feature, engine start feature, alarm feature, light on/off feature, door open feature, convertible top feature, window open/close feature, operator recognition feature, and operator approval feature.

13. The method of claim 10 further comprising establishing a user-to-user communication connecting a remote user with an other user operating the hand-held smart device in close proximity to the target vehicle to enable control via the Bridge.

14. The method of claim 10 further comprising communicating via a LF (low frequency) component with the vehicle communications system, and wherein the vehicle communications interface is configured to communicate with one or more vehicle communications systems, and wherein the one or more vehicle communications systems includes UHF or LF components including antennas and/or OBD interfaces.

15. The method of claim 10 further comprising providing a Near Field Communications (NFC) reader that has an associated NFC coil antenna adapted to read a trusted NFC tag, and reading by the NFC reader a trusted tag to allow access to the target vehicle, wherein the NFC reader is located within the target vehicle either integral with the Bridge or separate from the Bridge.

16. The method of claim 10 further comprising operating the mobile application running on the hand-held smart device to wirelessly communicate with the Bridge and execute vehicle control features.

17. The method of claim 10 further comprising providing an expansion port for adapting the Bridge to perform enhanced functions and/or to alter firmware or behavior data and/or instructions.

18. The method of claim 10 further comprising providing a USK module to perform BLE operations and communications with BLE functions of the wirelessly-paired hand-held smart device, wherein the USK module is removable from the Bridge for disposing in a pairing pocket or other location for communicating with a vehicle system, e.g., data link connector, or via LF coils.

19. The method of claim 10 further comprising at least one of the following steps: (a) operating, using the hand-held smart device, a "tap" function to perform vehicle control functions via the Bridge; and (b) providing an accelerometer disposed within the target vehicle and operatively connected to the Bridge, and causing the accelerometer to perceive a "knock" action by a user to perform a vehicle control function.

20. A method of controlling a set of features associated with a target vehicle, the method comprising the steps of:

providing a Bridge disposed in the target vehicle;

wirelessly pairing the Bridge with a hand-held smart device and operated by a user for controlling a set of features associated with the target vehicle;

communicating, via a vehicle communications interface associated with the Bridge, with one or more vehicle communications systems;

performing, via a transceiver associated with the Bridge, ranging operations in cooperation with the wirelessly-paired hand-held smart device;

processing, by the Bridge, BLE operations and communications with BLE-enabled functions of the wirelessly-paired hand-held smart device;

performing, by the Bridge, vehicle-specific operations in connection with the transceiver or the BLE-enabled functions or both the transceiver and the BLE-enabled functions;

storing, by one or more memory components associated with the Bridge, data and/or instructions related to one or more of pairing, behavior selecting, behaviors, boot-loading, or calibrating processes;

prompting, by mobile application operating on the hand-held smart device, a user to position the wirelessly-paired hand-held smart device to a set of defined locations in and around the target vehicle;

at each defined location, generating a signal representing location data and communicating the location data to the Bridge; and generating, by an algorithm associated with the mobile application, a set of location vectors; and creating and storing a calibration profile for allowing the Bridge to locate the hand-held smart device in a three-dimensional space associated with the target vehicle.

21. The method of claim 20 wherein a vehicle control function is performed based on a sensed location of the hand-held smart device and based on the calibration profile.

22. The method of claim 10, wherein communicating with the vehicle communications system to send commands and respond to security access challenges further comprises one from a group consisting of:

causing, via the mobile application, the phone to communicate with the Bridge over BLE to command the Bridge to send RF packets as required by target vehicle to complete pairing process;

positioning the Bridge at a defined location within the target vehicle to facilitate wireless communication with immobilizer system;

plugging in an adapter cable into Bridge to fit immobilizer reader coil adapter into a defined location in the target vehicle; and placing the bridge or pairing component of the Bridge in or within a close proximity to a pairing or programming pocket or slot.

23. The method of claim 10, wherein communicatively coupling the Bridge with the vehicle communications system includes one from a group consisting of:

plugging in an OBD plug associated with the Bridge to an OBD port associated with the target vehicle;

placing a vehicle communications interface component of the Bridge into a pairing pocket of the target vehicle; and placing the Bridge near a pairing coil associated with the target vehicle.

* * * * *